(12) United States Patent
Convertino et al.

(10) Patent No.: US 11,341,187 B2
(45) Date of Patent: May 24, 2022

(54) METHOD, APPARATUS, AND COMPUTER-READABLE MEDIUM FOR MISSING DATA IDENTIFICATION

(71) Applicant: Informatica LLC, Redwood City, CA (US)

(72) Inventors: Gregorio Convertino, Sunnyvale, CA (US); Ranjeet Kumar Tayi, Hyderabad (IN); Swati Tomar, Hyderabad (IN); Manish Gupta, Hyderabad (IN); Chitresh Kakwani, Rajasthan (IN)

(73) Assignee: INFORMATICA LLC, Redwood City, CA (US)

( * ) Notice: Subject to any disclaimer, the term of this patent is extended or adjusted under 35 U.S.C. 154(b) by 461 days.

(21) Appl. No.: 15/901,255

(22) Filed: Feb. 21, 2018

(65) Prior Publication Data

US 2019/0258744 A1   Aug. 22, 2019

(51) Int. Cl.
*G06F 16/00* (2019.01)
*G06F 16/901* (2019.01)

(52) U.S. Cl.
CPC .................. *G06F 16/9017* (2019.01)

(58) Field of Classification Search
CPC .................. G06F 16/9017; G06F 16/215
See application file for complete search history.

(56) References Cited

U.S. PATENT DOCUMENTS

2011/0137900 A1* 6/2011 Chang ................ G06F 16/353
707/737

* cited by examiner

*Primary Examiner* — Neveen Abel Jalil
*Assistant Examiner* — Paul Kim
(74) *Attorney, Agent, or Firm* — Amardeep S. Grewal; Reed Smith LLP

(57) ABSTRACT

A system, method and computer-readable medium for missing data identification, including identifying columns in tables of a database, generating categorical columns of categorical data by transforming data values in the columns into categorical data values, generating a co-occurrence matrix corresponding to a pair of categorical columns in the categorical columns, determining an expected frequency of co-occurrence corresponding to each unique pair of categorical data values based at least in part on a marginal totals corresponding to categorical data values in the co-occurrence matrix, and identifying one or more locations of missing data based at least in part on the count of co-occurrence of each unique pair of categorical data values and the expected frequency of co-occurrence corresponding to each unique pair of categorical data values.

20 Claims, 59 Drawing Sheets

Fig. 2

Issuer Network (3)

Data Preview

Expression

Issuer Network (3)

Master Card
VISA
American Express

*Reverse Function for Generation :

Field Settings
○ Use As Is  ● Ranges

Master Card
VISA
American Express

Columns

[Analyse]

Column Settings

○ Credit card Acct (6)
○ Customer ID (6)
○ Account No.(109987)
○ Account Type (3)
○ Credit Limits (4)
● ▼ Issuer Network (3)
○ Credit card Type (31)
○ Currency (3)
○ Customer Details (2)
○ State (29)

Customized Columns

| Price | City | Item Identifier |
|---|---|---|
| 5 | Charleston | GR312313 |
| 31 | San Diego | RZ331210 |
| 36 | Los Angeles | RZ334210 |
| 44 | New York | RZ637710 |
| 120 | San Francisco | TZ321312 |
| 1 | Fort Wayne | GR214143 |
| 3 | Ann Arbor | GR121453 |

1401

| Price Category | City Category | Item Identifier Category |
|---|---|---|
| Low | East Coast | GR |
| Medium | West Coast | RZ |
| Medium | West Coast | RZ |
| Medium | East Coast | RZ |
| High | West Coast | TZ |
| Low | Midwest | GR |
| Low | Midwest | GR |

1402

| Price Category | City Category | Item Identifier Category |
|---|---|---|
| Low | East Coast | GR |
| Medium | West Coast | RZ |
| Medium | West Coast | RZ |
| Medium | East Coast | RZ |
| High | West Coast | TZ |
| Low | Midwest | GR |
| Low | Midwest | GR |

1600

City Category / Price Category

| | Low | Medium | High |
|---|---|---|---|
| East Coast | 1 | 1 | 0 |
| Midwest | 2 | 0 | 0 |
| West Coast | 0 | 2 | 1 |

|  | | Price Category | | |
|---|---|---|---|---|
| | | Low | Medium | High |
| City Category | East Coast | 1 | 1 | 0 |
| | Midwest | 2 | 0 | 0 |
| | West Coast | 0 | 2 | 1 |

Fig. 18A

|  | | Price Category | | | Totals |
|---|---|---|---|---|---|
| | | Low | Medium | High | |
| City Category | East Coast | 1 | 1 | 0 | 2 |
| | Midwest | 2 | 0 | 0 | 2 |
| | West Coast | 0 | 2 | 1 | 3 |
| | Totals | 3 | 3 | 1 | 7 |

Fig. 18B

|  |  | Price Category | | |
|---|---|---|---|---|
|  |  | Low | Medium | High |
| City Category | East Coast | 6 | 6 | 2 |
|  | Midwest | 6 | 6 | 2 |
|  | West Coast | 9 | 6 | 3 |

|  |  | Price Category | | |
|---|---|---|---|---|
|  |  | Low | Medium | High |
| City Category | East Coast | 6/7 = .86 | 6/7 = .86 | 2/7 = .28 |
|  | Midwest | 6/7 = .86 | 6/7 = .86 | 2/7 = .28 |
|  | West Coast | 9/7 = 1.29 | 9/7 = 1.29 | 3/7 = .43 |

|  |  | Price Category | | |
|---|---|---|---|---|
|  |  | Low | Medium | High |
| City Category | East Coast | 1 | 1 | 0 |
|  | Midwest | 2 | 0 | 0 |
|  | West Coast | 0 | 2 | 1 |

Observed Co-Occurrence — 2000

|  |  | Price Category | | |
|---|---|---|---|---|
|  |  | Low | Medium | High |
| City Category | East Coast | 6/7 = .86 | 6/7 = .86 | 2/7 = .28 |
|  | Midwest | 6/7 = .86 | 6/7 = .86 | 2/7 = .28 |
|  | West Coast | 9/7 = 1.29 | 9/7 = 1.29 | 3/7 = .43 |

Expected Co-Occurrence — 2001

|  |  | Price Category | | |
|---|---|---|---|---|
|  |  | Low | Medium | High |
| City Category | East Coast | .14 | .14 | -.28 |
|  | Midwest | 1.14 | -.86 | -.28 |
|  | West Coast | -1.29 | .71 | .57 |

— 2002

Difference = Observed Co-Occurrence – Expected Co-Occurrence

Fig. 20A

|  | Price Category | | |
|---|---|---|---|
|  | Low | Medium | High |
| City Category East Coast | .14/.86 | .14/.86 | -.28/.28 |
| Midwest | 1.14/.86 | -.86/.86 | -.28/.28 |
| West Coast | -1.29/1.29 | .71/1.29 | .57/.43 |

↘ 2003

Ratio of Difference to Expected Co-Occurrence

|  | Price Category | | |
|---|---|---|---|
|  | Low | Medium | High |
| City Category East Coast | 16 % | 16 % | -100 % |
| Midwest | 133 % | -100 % | -100 % |
| West Coast | -100 % | 55 % | 132 % |

↘ 2004

Percentage of Expected Co-Occurrence Observed

|  | Price Category | | |
|---|---|---|---|
|  | Low | Medium | High |
| City Category East Coast |  |  | X |
| Midwest |  | X | X |
| West Coast | X |  |  |

↘ 2005

Missing Data Locations

Fig. 20B

|  | Territories | | tot. |
|---|---|---|---|
| Card | East Coast | West Coast | |
| NewCard | 0 | 180 | *180* |
| Amex | 5 | 279 | *284* |
| Mastercard | 196 | 510 | *706* |
| Visa | 223 | 862 | *1085* |
| *tot.* | *424* | *1831* | *2255* |

Fig. 21A

|  | Territories | | tot. |
|---|---|---|---|
| Card | East coast | West coast | |
| NewCard | *34* | *146* | *180* |
| Amex | *53* | *231* | *284* |
| Mastercard | *133* | *573* | *706* |
| Visa | *204* | *881* | *1085* |
| *tot.* | *424* | *1831* | *2255* |

Fig. 21B

|  | Territories | |
|---|---|---|
| Card | East coast | West coast |
| NewCard | -34 | 34 |
| Amex | -48 | 48 |
| Mastercard | 63 | -63 |
| Visa | 19 | -19 |

Fig. 21C

|  | Gender | |
|---|---|---|
| Card | East coast | West coast |
| NewCard | -100% | 23% |
| Amex | -91% | 21% |
| Mastercard | 48% | -11% |
| Visa | 9% | -2% |

METHOD, APPARATUS, AND COMPUTER-READABLE MEDIUM FOR MISSING DATA IDENTIFICATION

BACKGROUND

Test data refers to data used to carry out testing of a system, process, or component. Test data is utilized in a variety of different testing environments and scenarios, such as for functional testing, performance testing, and service virtualization testing.

In functional testing, a subset of production data is extracted to act as input to data-driven testing processes and/or stored in test databases to future use. Functional testing refers to the process of verifying that a piece of software is conforms to end-user requirements, business goals, or technical specifications. Software is tested by providing it with some related input so that the output can be evaluated to see how it conforms, relates or varies compared to its base requirements. Moreover, functional testing also checks the software for usability, such as by ensuring that the navigational functions are working as required.

In performance testing, metrics such as stability, load, benchmark, and other types of sustained tests require data for hundreds or even thousands of records to execute performance tests over several hours. This requires a large volume of test data that must be provided as input to the performance tests.

Another example of testing that relies on test data is service virtualization. Virtualized components require realistic test data to simulate the behavior of the live service or software they are emulating. Similar to functional testing, service virtualization requires extraction of the appropriate test data from production databases.

All of these methods of testing are dependent on the quality, consistency, and volume of test data available to the testing system. However, it is not feasible or realistic to generate all combinations of data values as test data for input into testing processes.

As a result, test data that is provided as input to testing processes will typically have several gaps in the data sets and/or insufficient data values to reliably test all permutations of data sets. In other words, the data set will have locations where the density of data values is much lower than the density of data values in other locations. This means that any tests conducted using that test data will be compromised by the missing data in the test data set.

Currently, the only way to address this problem is for test data management professionals to review data fields pertinent to a test plan and manually identify locations where data values are missing. Additionally, test data management professionals must also find some way to fill any gaps that they find, either through compilation of new data or manual creation of data entries.

Needless to say this process is ineffective for identifying locations of missing data since it relies on manual review of test data sets and subjective decision making processes unique to each test data management professional. There is no guarantee that a test data management professional will be able to identify locations of missing data based upon a manual review of data in the test data set.

This process is also inefficient in terms of labor and time costs. Given the size of test data sets, particularly in enterprise environments, it is not physically possible for test data management professionals to review all of the test data for gaps within a reasonable amount of time.

Furthermore, even if a test data management professional were to identify a location where there appears to be missing data, there is no way for the test data management professional to accurately quantify the amount of missing information and no standardized way for the data management professional to accurately fill the gap in missing information without compromising the consistency of the test data set overall.

Consequently, improvements are needed in systems for missing data identification and missing data generation.

BRIEF DESCRIPTION OF THE DRAWINGS

FIG. 2 illustrates an interface for receiving a selection of one or more connections to databases or data stores according to an exemplary embodiment.

FIG. 10 illustrates an interface for assigning a limited set of unique values to categorical data values according to an exemplary embodiment.

FIGS. 11A-11B illustrate an example of converting string data values to categorical data values using one or more transformation rules according to an exemplary embodiment.

FIG. 16 illustrates an example of generating a co-occurrence matrix for a pair of categorical columns according to an exemplary embodiment.

FIG. 18A illustrates an example of a co-occurrence matrix including unique pairs of categorical data values according to an exemplary embodiment.

FIG. 18B illustrates an example of a co-occurrence matrix including a first and second set of marginal totals according to an exemplary embodiment.

FIG. 18C illustrates a table showing marginal products corresponding to each unique pair of categorical data values according to an exemplary embodiment.

FIG. 18D illustrates an expected frequency of co-occurrence matrix corresponding to each unique pair of categorical data values according to an exemplary embodiment.

FIG. 20A illustrates an example of the process of determining a difference between the count of co-occurrence of each unique pair of categorical data values and the expected frequency of co-occurrence corresponding to that unique pair of categorical data values according to an exemplary embodiment.

FIG. 20B illustrates an example of designating location of missing data according to an exemplary embodiment.

FIGS. 21A-21D illustrate another example of the missing data identification process according to an exemplary embodiment.

FIG. 23D illustrates an interface used for selecting subset criteria according to an exemplary embodiment.

DETAILED DESCRIPTION

Figure 1:
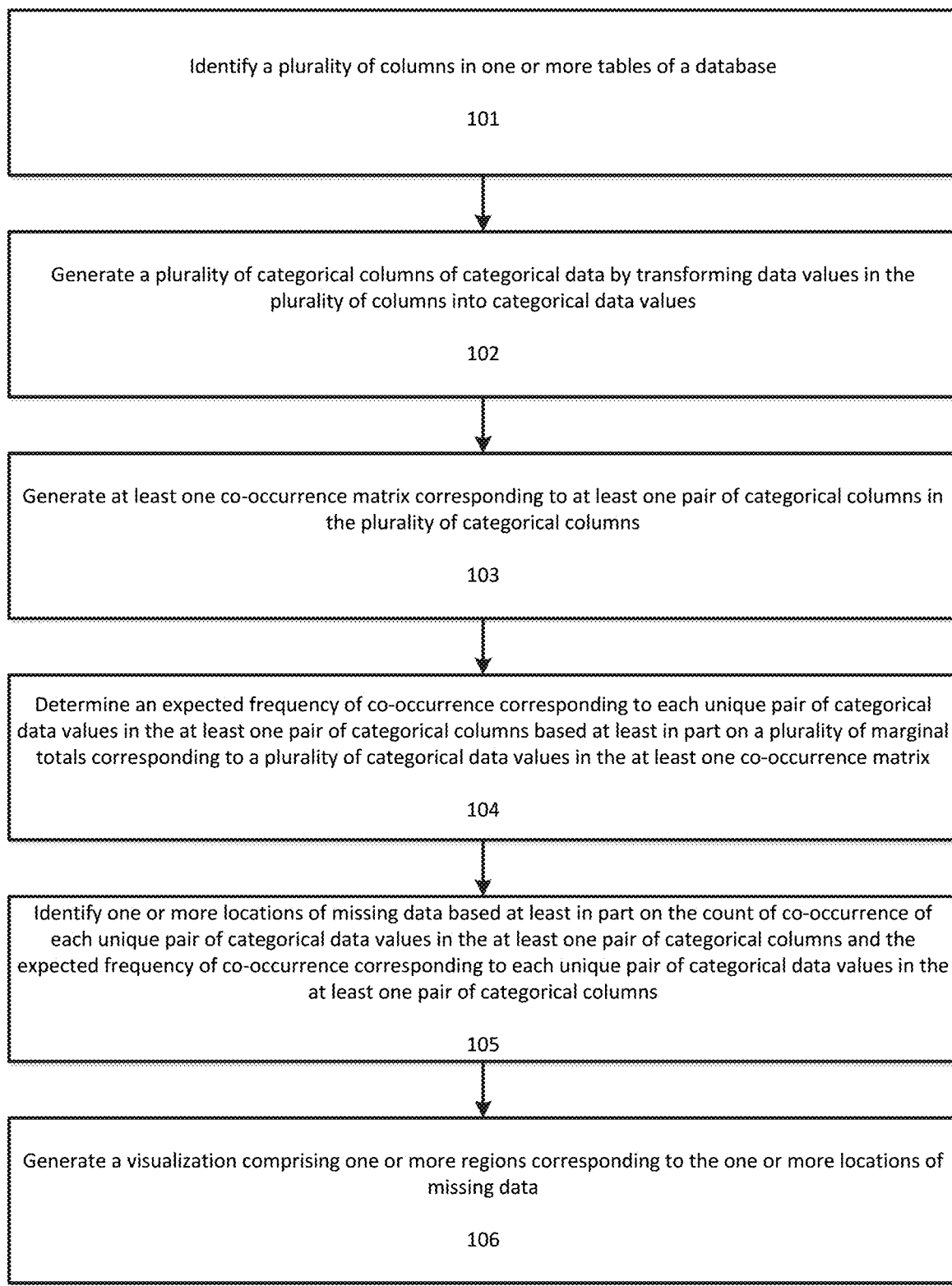
FIG. 1 illustrates a flowchart for missing data identification according to an exemplary embodiment.

While methods, apparatuses, and computer-readable media are described herein by way of examples and embodiments, those skilled in the art recognize that methods, apparatuses, and computer-readable media for missing data identification and missing data generation are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium that solve the problem of missing data identification and missing data generation. The systems and methods disclosed herein allow for the identification of missing data for relevant variables (columns) and/or intervals of data in one or more tables of a database or other information source. The systems and methods disclosed herein also allow for the generation of data corresponding to the missing data.

The disclosed systems and methods can be utilized for identification of missing data in test data sets and also for generation of the missing data in test data sets. The present application discloses techniques and systems which parse and analyze data sets to accurately identify missing data, quantify the degree of missing data, and also fill gaps corresponding to the data through generation of new data that is proportional to the missing data identified and consistent with the remaining information in the data set (the new data per attribute is generated based on the marginal totals per attribute, or column profiles, from the entire dataset or external reference tables containing marginal totals for the population of reference; e.g., reference tables obtained from US census data for generating missing data about US credit card customer attributes).

While the disclosed systems and methods are described in the context of test data and test data management, there are many applications of the technology outside the fields of test data management and testing as well.

The missing data identification and missing data generation methods described herein can be performed as part of a "white space analysis" by sales and marketing analysts on a sales database and used to find untapped markets.

The missing data identification and missing data generation methods described herein can be performed by epidemiologists and geneticists analyzing epidemiological data, for example, to identify attributes of people that characterize populations that do not have diseases. This would include, for example, finding missing data corresponding to disease variables (columns) of data and identifying which other variables are associated with the missing data.

The missing data identification and missing data generation methods described herein cane be used by human resources personnel analyzing employee data to identify certain types of employees to hire. For example, the identified missing data can correspond to attributes or characteristics in the employee population and can be used as an input to hiring or interview decisions to increase diversity in the employee population. These attributes and characteristics can include demographic attributes, as well as types of employees, skill sets, or certifications.

FIG. 1 illustrates a flowchart for missing data identification according to an exemplary embodiment. At step 101 a plurality of columns in one or more tables of a database are identified.

Figure 2:
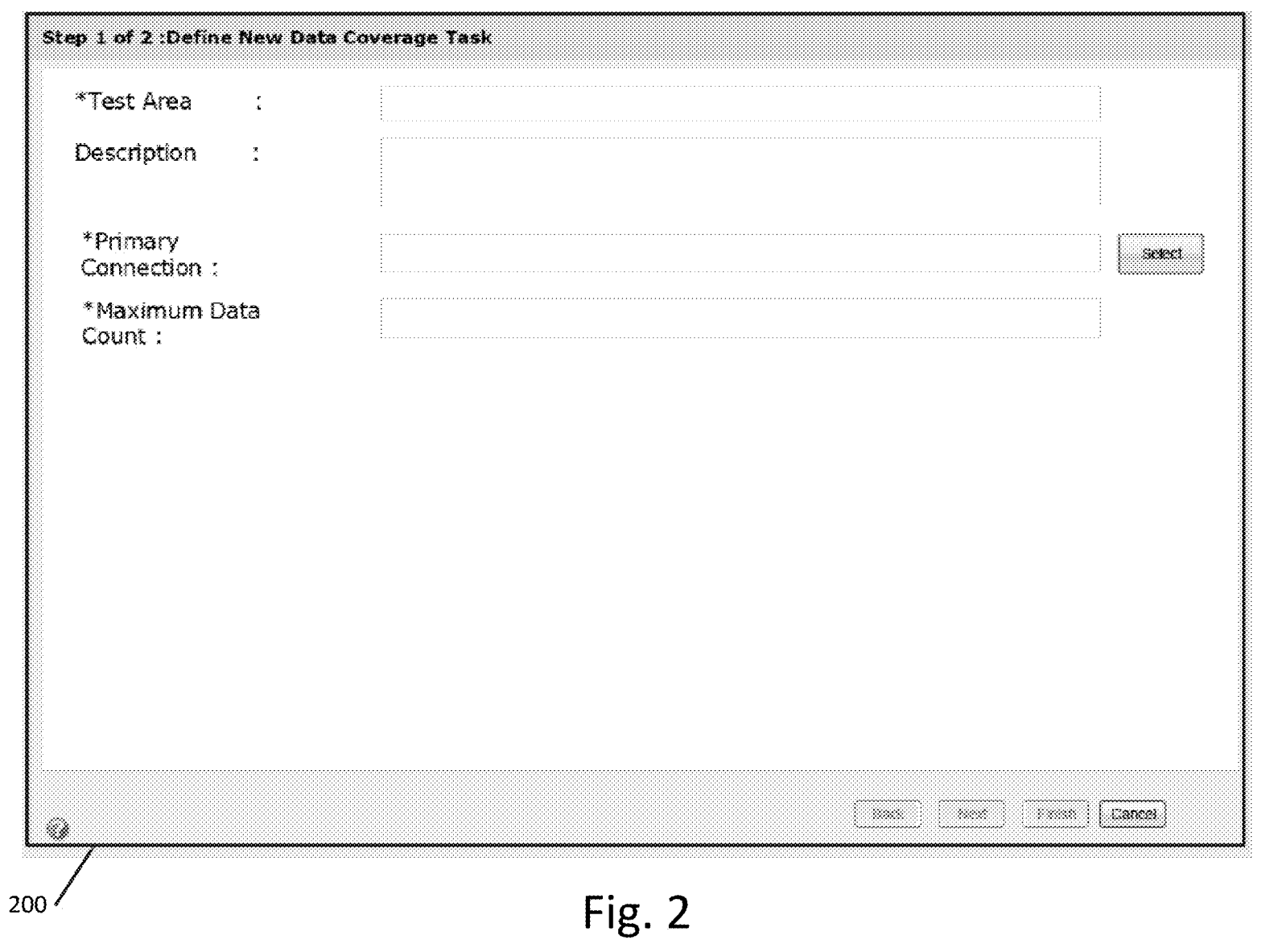

Either prior to step 101, or as part of step 101, a selection of one or more connection(s) to databases or data stores can be received from a user. FIG. 2 illustrates an interface 200 for receiving a selection of one or more connections to databases or data stores according to an exemplary embodiment. As shown in the interface 200, as user can enter a test area, description, primary connection, and maximum data count associated with the connection.

A connection is any kind of technology connection to a data store to access data stored on the data store. A data store is a repository of data such as a database, which contains one or more data assets, such as tables. A data asset is a collection data values organized by variables (such as table columns) and records (such as table rows). Each record is a tuple of values with one value per variable in the data asset. Additionally, a variable can be an attribute or column in a table.

The connection information can specify one or more connection parameters. For example, the user can enter an address associated with a data store that allows the system to access the data store and retrieve information stored on the data store.

Figure 3:
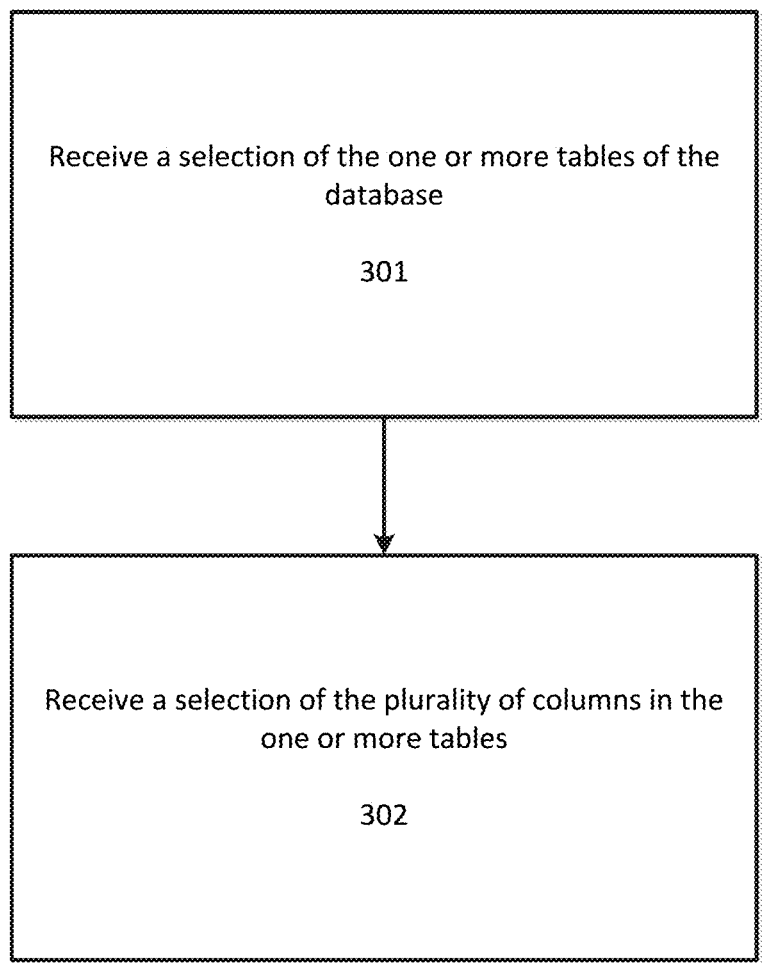
FIG. 3 illustrates a flowchart for identifying a plurality of columns in one or more tables of a database according to an exemplary embodiment.

FIG. 3 illustrates a flowchart for identifying a plurality of columns in one or more tables of a database according to an exemplary embodiment. At step 301 a selection of the one or more tables of the database is received. This step can be performed for each of the databases that the user connects to in the interface shown in FIG. 2.

Figure 4A:
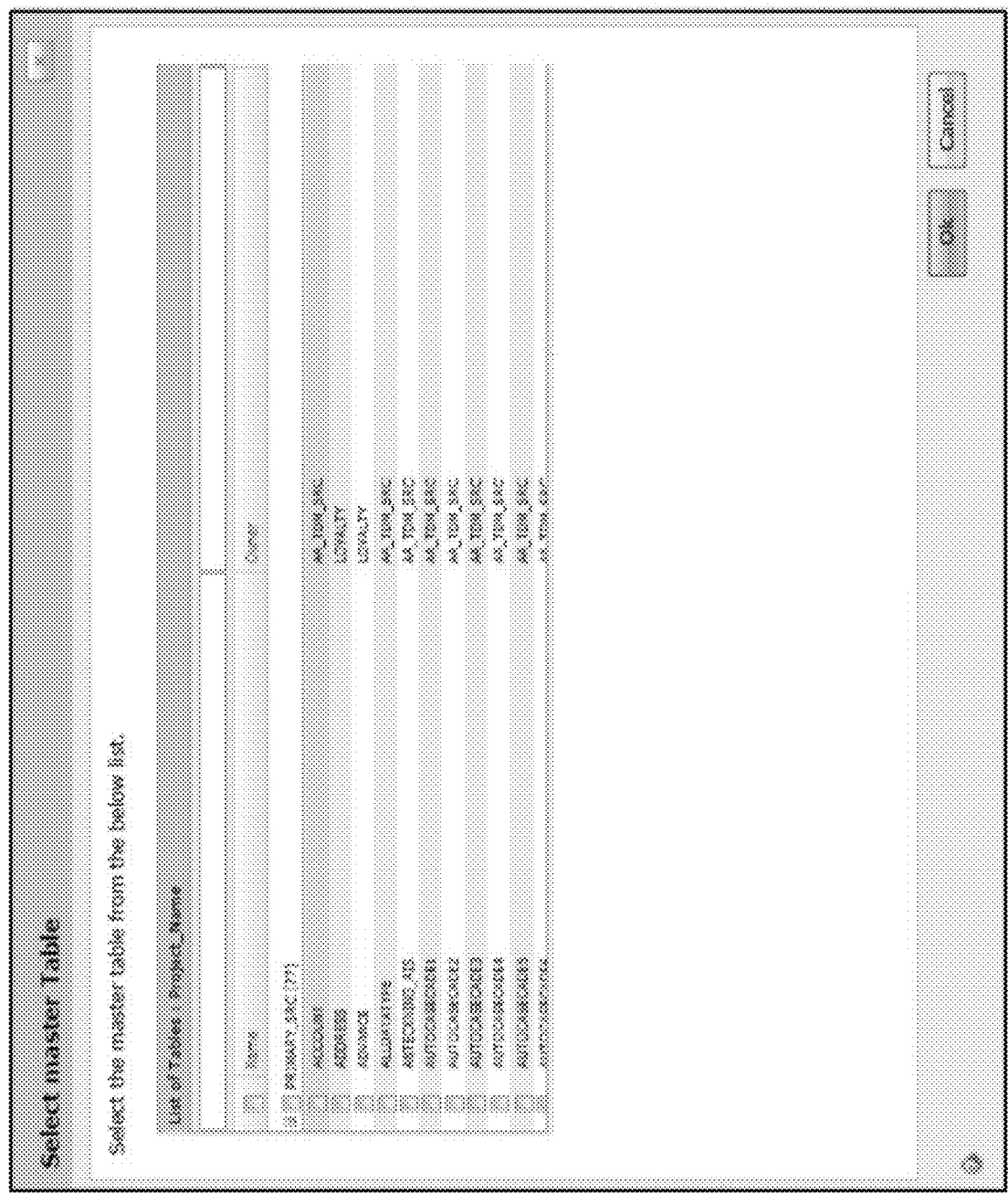
FIG. 4A illustrates an interface for receiving a selection of a master table according to an exemplary embodiment.

FIG. 4A illustrates an interface 400 for receiving a selection of a master table according to an exemplary embodiment. As shown in interface 400, the user first selects a master table from the list of tables in the database. This master table is the first table selected and will be the first table from which data is extracted. The user can start by selecting a single table and then can continue adding tables related to it. If the same table is selected multiple times, the user can specify an alias for the repeated table.

Optionally, the step of identifying a plurality of columns in one or more tables of a database can include automatically identifying the columns based upon the selection of one or more tables by the user. For example, the system can automatically identify all columns in the tables selected by the user as the relevant columns for missing data analysis. Or the system can automatically identify all columns common to two or more tables selected by the user. For example, each column that is a primary key in a first selected table and a foreign key in a second selected table can be identified for missing data analysis.

Figure 4B:
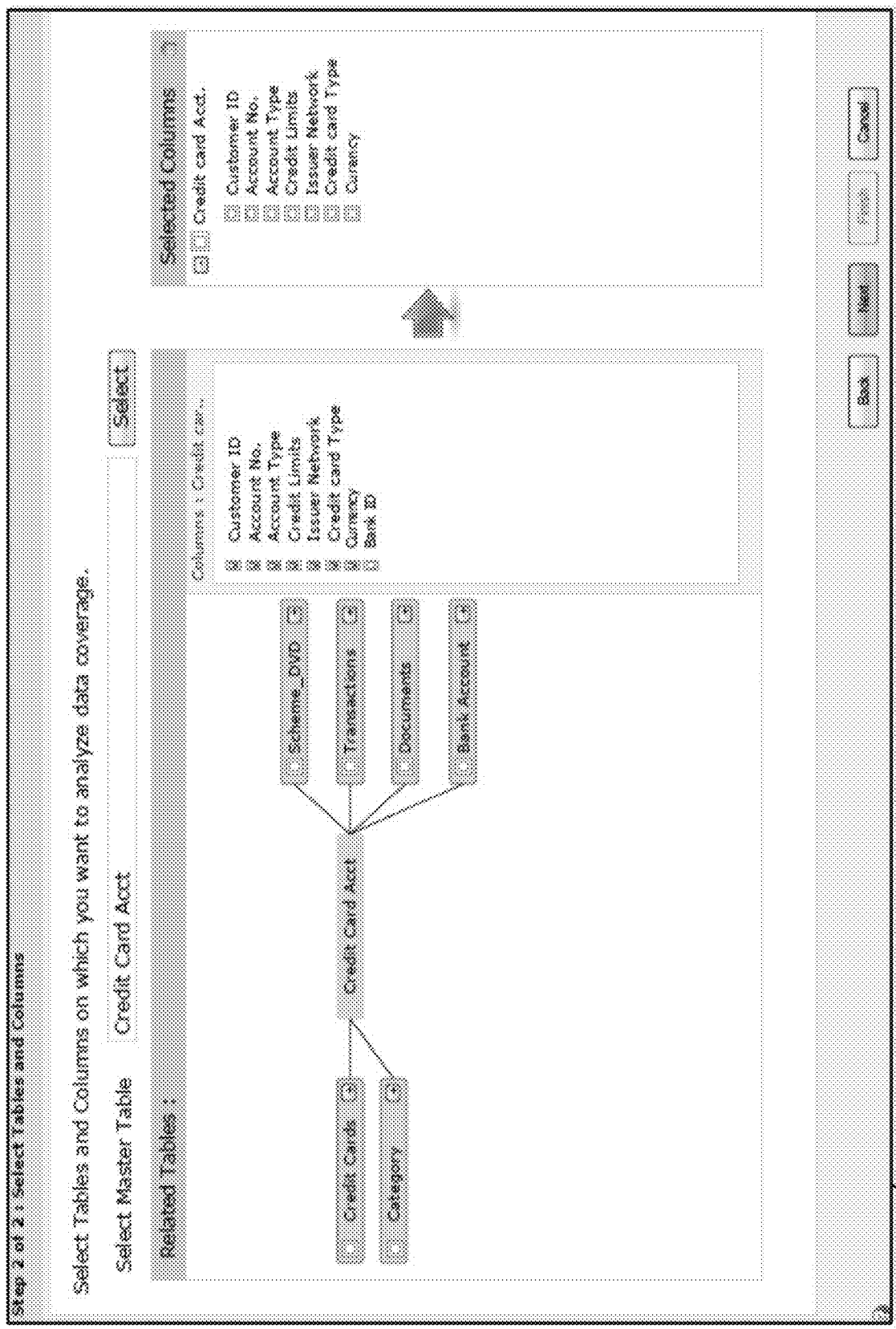
FIG. 4B illustrates an interface for selecting column according to an exemplary embodiment.

Returning to FIG. 3, at step 302 a selection of the plurality of columns in the one or more tables is received. FIG. 4B illustrates an interface 401 for selecting column according to an exemplary embodiment. As shown in the interface 401 of FIG. 4B, the user has selected the Credit Card Acct table and has the option of selecting which columns in the Credit Card Acct table they would like to include. In this case, the user has selected all of the columns except for the Bank ID column, including the Customer ID column, the Account No. column, the Account Type column, the Credit Limits column, the Issuer Network column, the Credit Card Type column, and the Currency column.

The ability to select a subset of variables (columns or fields) in a particular data store allows the user to assess coverage (missing data distribution) for a specific subset of data. Optionally, the user can also filter the data, including only specified ranges of values in one or more variables (columns). For example, the user can specify a range of values for the Credit Limits column so that only data corresponding to a certain range of Credit Limits is extracted and analyzed for missing data.

Figure 4C:
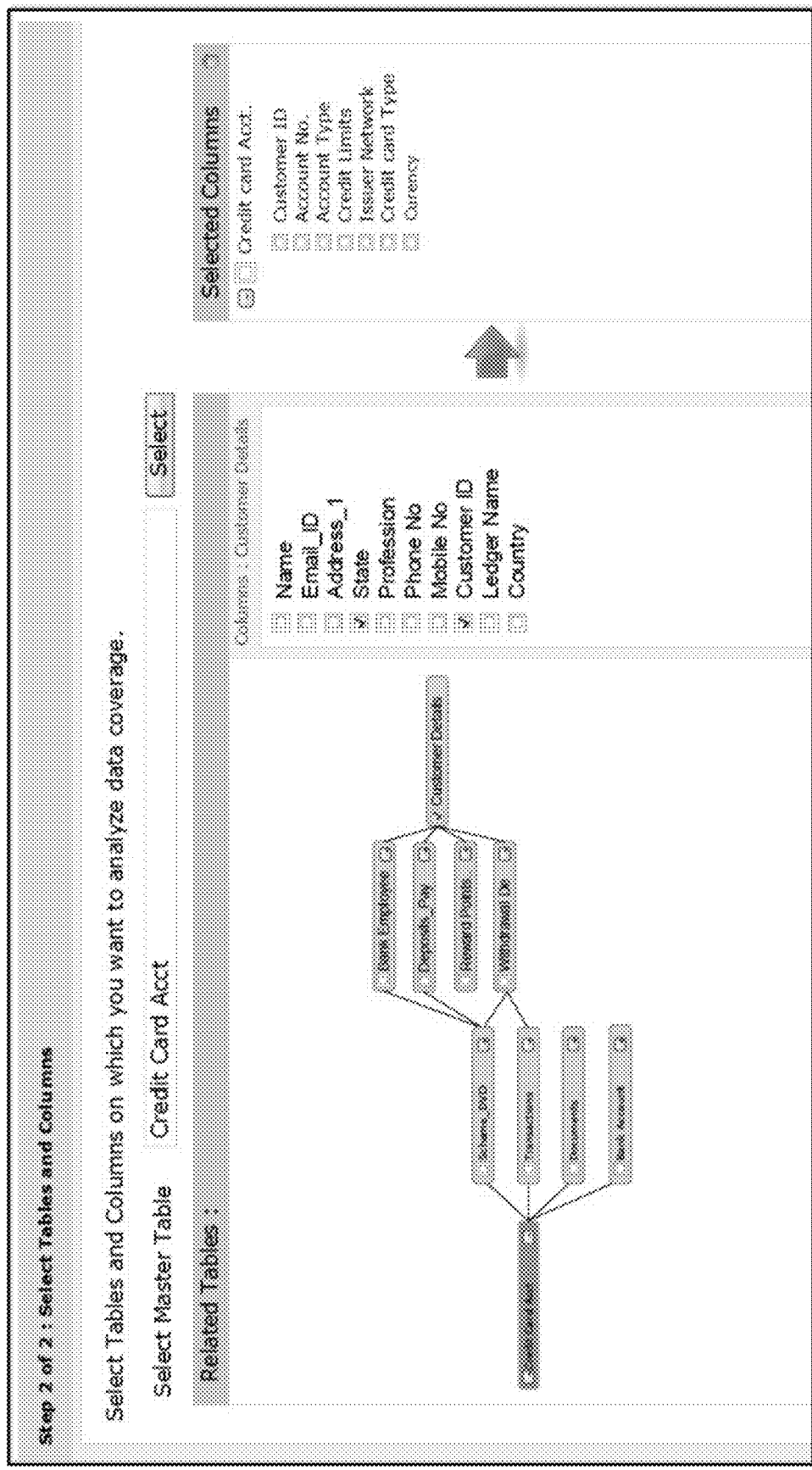
FIG. 4C illustrates an interface for selecting additional tables and additional columns according to an exemplary embodiment.

The user can repeat steps 301 and 302 for multiple tables and multiple columns. FIG. 4C illustrates an interface 402 for selecting additional tables and additional columns according to an exemplary embodiment. In this case, the user has selected the Credit Card Acct table and the related Customer Details table. Additionally, as shown in interface 402, the user has selected two columns in the Customer Details table for inclusion in the missing data analysis (the State column and the Customer ID column). Of course, this process can be repeated for any number of tables and columns.

If the selected data (one or more tables) exists across multiple data stores then the user can optionally aggregate them in a single data store. For example, the user can select multiple tables (e.g., if dimensional modeling for data warehousing is used in the database then multiple related tables are included in the final aggregated data store). Specifically, user starts by selecting one table and then selects additional tables directly related to it and then, in turn, the tables directly related to the ones previously selected. Each table selected gets an alias, which is the same as the table name by default. During the selection of tables, if the user selects the same table multiple times along different relationship paths, he/she can specify an alias for that table that is different from the aliases previously used for the other occurrences of the same table or a new alias can automatically be generated and assigned.

Figure 5:
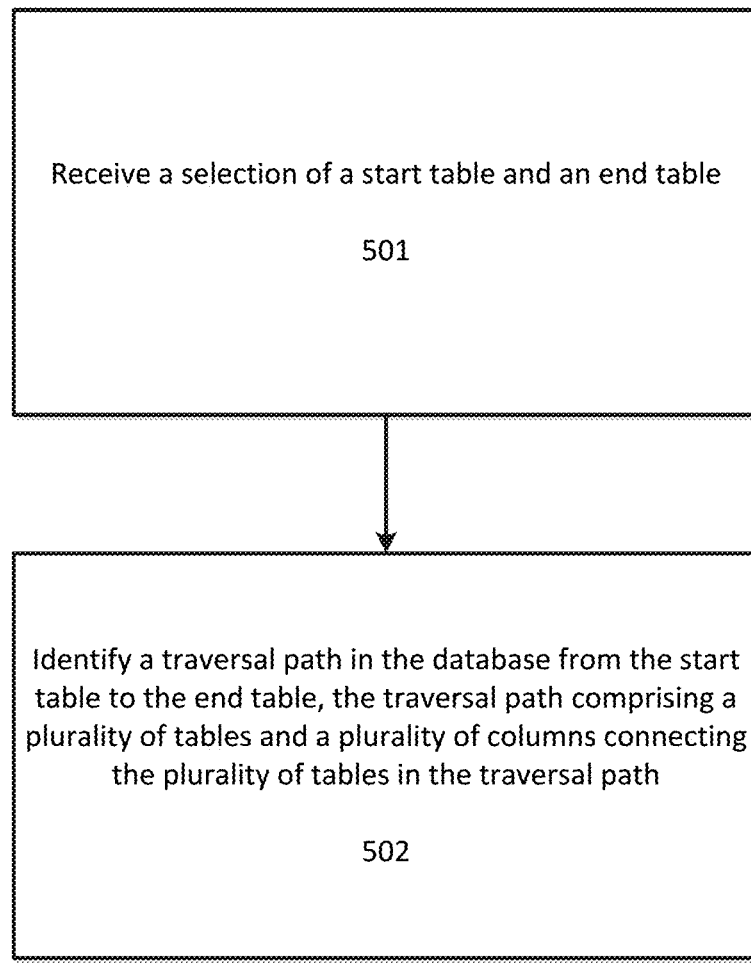
FIG. 5 illustrates another flowchart for identifying a plurality of columns in one or more tables, given a traversal path in the database from a start table to an end table, according to an exemplary embodiment.

FIG. 5 illustrates another flowchart for identifying a plurality of columns in one or more tables of a database according to an exemplary embodiment. At step 501 a selection of a start table and an end table is received. At step 502 a traversal path is identified in the database from the start table to the end table. As discussed below, the traversal path can include a plurality of tables and a plurality of columns connecting the plurality of tables in the traversal path.

Figure 6:
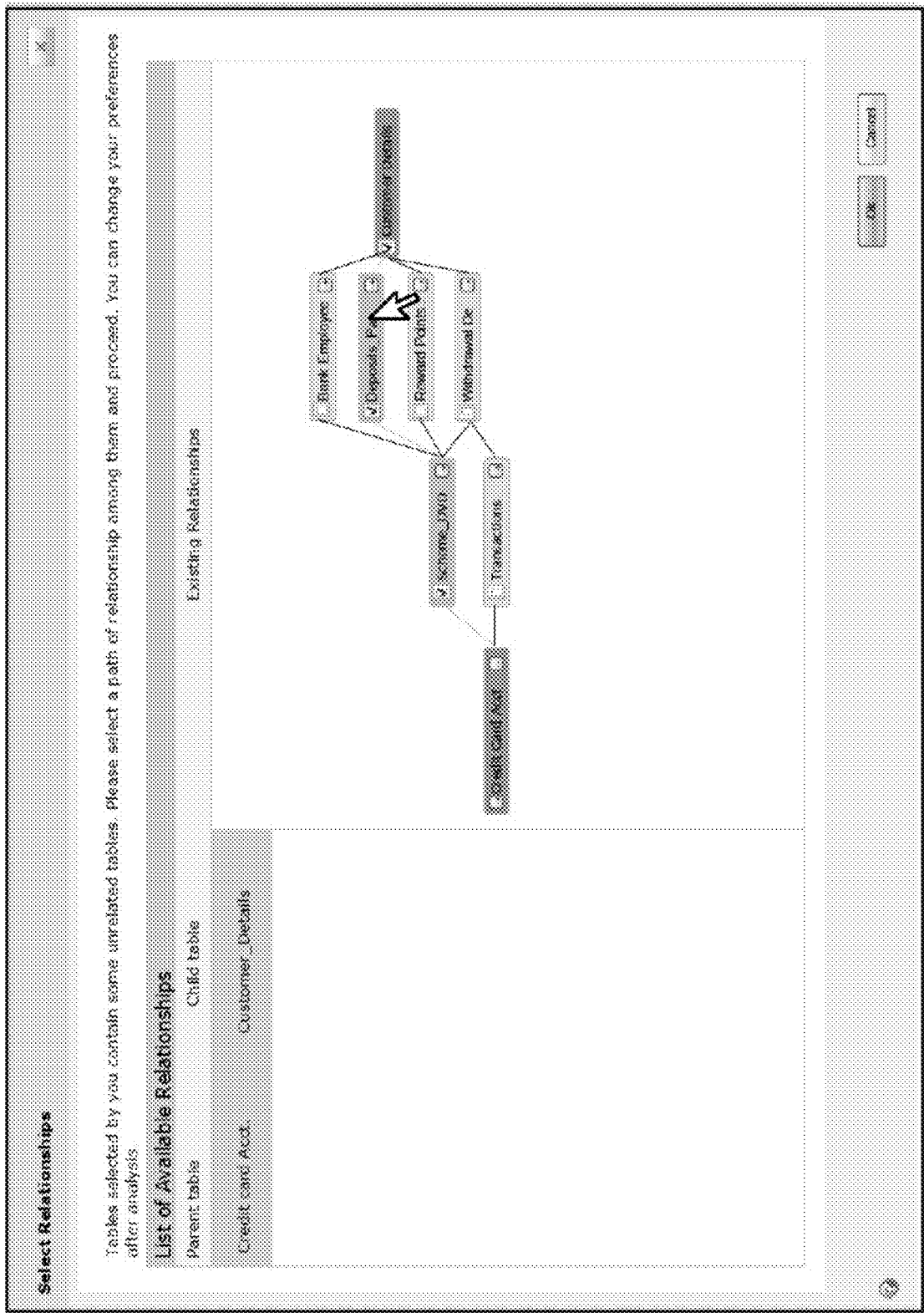
FIG. 6 illustrates an interface for receiving a selection of a start table and an end table and identifying a traversal path according to an exemplary embodiment.

FIG. 6 illustrates an interface 600 for receiving a selection of a start table and an end table and identifying a traversal path according to an exemplary embodiment. As shown in interface 600, the user has selected the Credit Card Acct table as a start table and the Customer Details table as an end table. Additionally, a traversal path from the Credit Card Acct table to the Customer Details table has been identified and is shown in interface 600 using shaded identifiers. In this case, the traversal path includes the following tables: Credit Card Acct→Scheme_DVD→Deposits Pay→Customer Details.

As shown by the connecting lines between the tables in FIG. 6, there are multiple possible traversal paths. For example, one possible traversal path includes the Transactions Table. The identification of a traversal path from the possible traversal paths can be based on one or more criteria. The criteria can include which path adds the most variables (columns) to the data set, which path adds the most data records to the data set, and/or which path is the shortest path.

For example, a criteria optimizes obtaining the most data for the test set can select a traversal path as follows:

(1) computing the Cartesian product using joins across multiple possible traversal paths;
(2) converting data values to categorical values for columns of interest (this conversion process is discuss in more detail below);
(3) computing a count for each set of categorical values;
(4) summing values for each combination in step 3; and
(5) ordering possible paths based on totals in step 4 and identifying the path with the highest total value as the selected traversal path.

The above steps will result in selection of a traversal path that provides the most information that can be used for testing. Of course, different criteria can be used to identify a traversal path. The system can be set to automatically default to identifying the shortest path. Additionally, the user can modify the identified traversal path, such as through the interface 600 in FIG. 6.

As discussed above, the user can select an initial table in the data store and can then select related tables, if desired. This selection occurs in an incremental manner, i.e., the user who has selected a table then selects another table to which the selected table has a direct relationship to (e.g., primary key-foreign key relationship between two tables). When the user selects tables in this manner, the traversal path can be identified incrementally as the user makes selections. Alternatively or additionally, the user can also select a start table and an end table and the system can identify a traversal path from the start table to the end table.

During this table selection process, the system records the user selections in a tree of tables where the starting table is the root and the edges represent relationships between those tables. If the user happens to select a table multiple times from different relationship paths, then its occurrences appear as different nodes in this tree and the user can provide a unique alias to refer to each of these nodes or a unique alias can be automatically assigned to each instance of the table.

Figure 7:
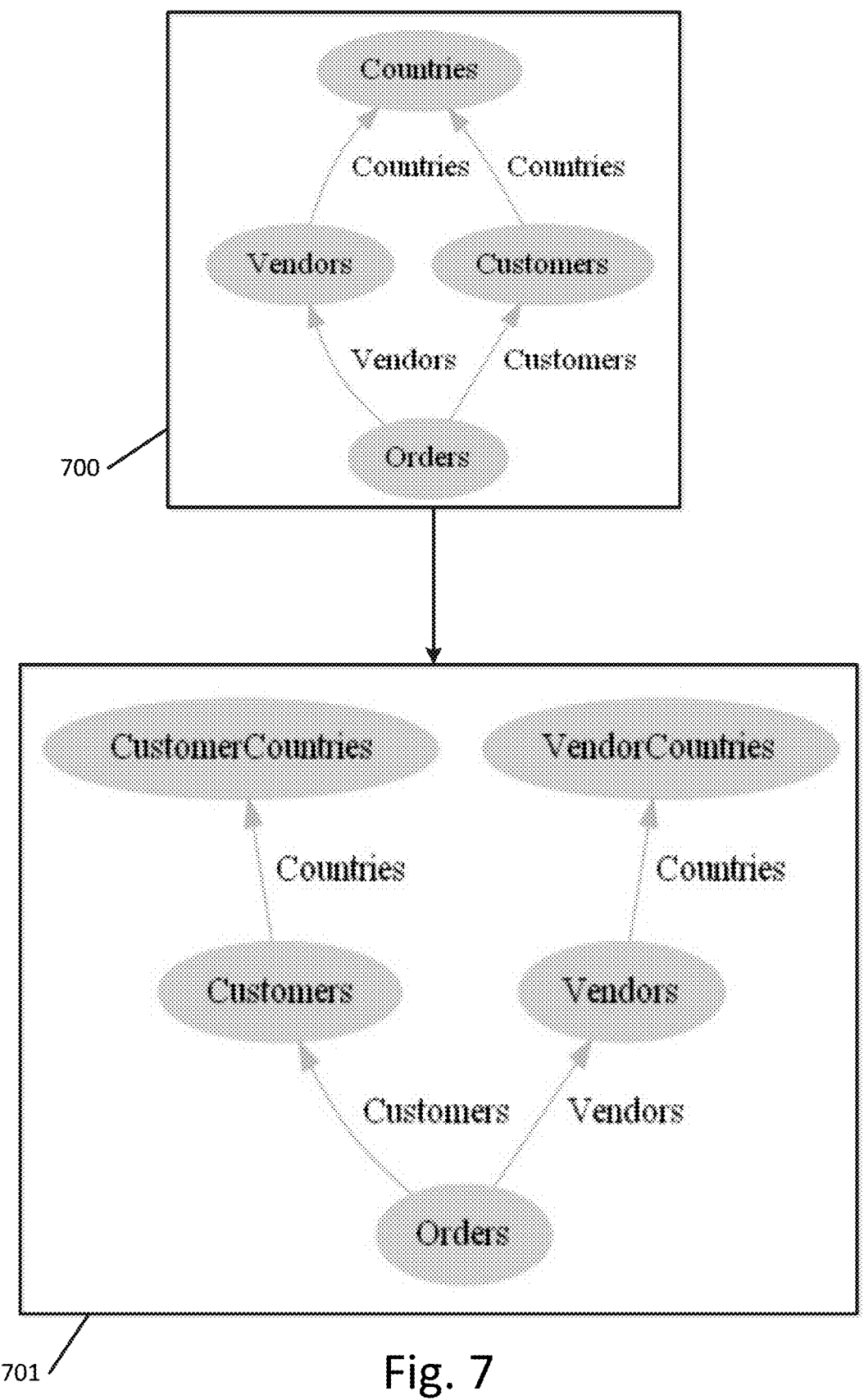
FIG. 7 illustrates a physical schema and the corresponding tree that is formed after the user has selected a number of tables according to an exemplary embodiment.

FIG. 7 illustrates a physical schema 700 and the corresponding tree 701 that is formed after the user has selected a number of tables according to an exemplary embodiment. In this case, the user has selected the following sequence of tables starting from the Orders table: Orders, Vendors, Customers, and Countries. Note that since Countries appears in each of the two relationship paths, it has been given two aliases in the tree diagram 701: CustomerCounties and VendorCountries.

As shown in FIG. 7, the system can store a tree corresponding to one or more traversal paths through the plurality of tables. The tree comprises a root node corresponding to a first table in the plurality of tables, one or more child nodes corresponding to one or more child tables in the plurality of tables, and one or more edges corresponding to one or more relationships between the plurality of tables. In the case of tree 701, the edges correspond to the columns which link a pair of nodes and form the relationship between the nodes (the primary key-foreign key relationship).

Returning to FIG. 1, at step 102 a plurality of categorical columns of categorical data are generated by transforming data values in the plurality of columns into categorical data values.

Figure 8A:
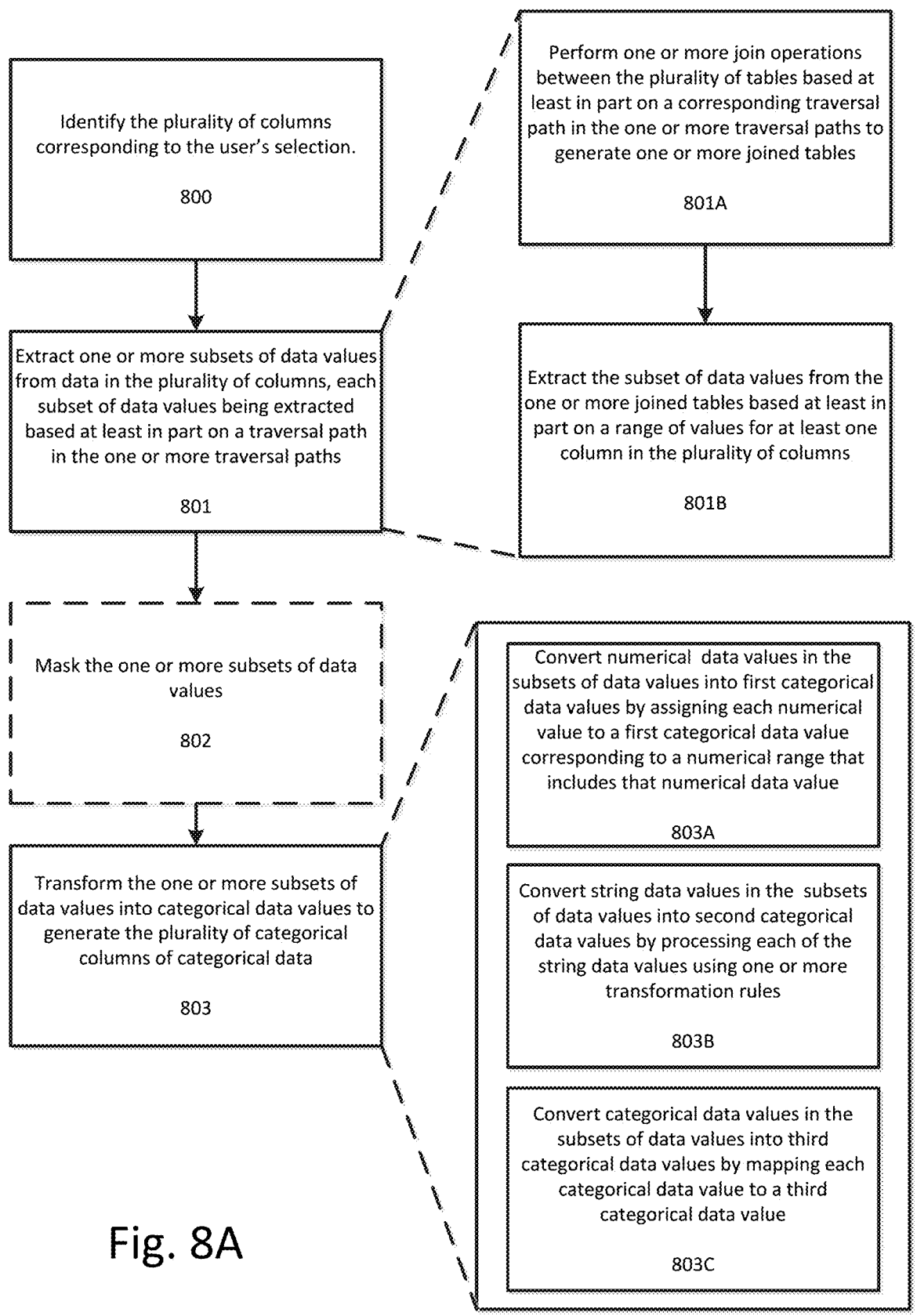
FIG. 8A illustrates a flowchart for generating a plurality of categorical columns of categorical data by transforming data values in the plurality of columns into categorical data values according to an exemplary embodiment.

FIG. 8A illustrates a flowchart for generating a plurality of categorical columns of categorical data by transforming data values in the plurality of columns into categorical data values according to an exemplary embodiment.

At step 800 the plurality of columns corresponding to the user's previous selections are identified. This step can include looking up the column names selected by the user and retrieving the data in the plurality of columns.

At step 801 one or more subsets of data values are extracted from the data in the plurality of columns, with each subset of data values being extracted based at least in part on a traversal path in the one or more traversal paths. For example, given the tree 701 in FIG. 7, two subsets of data values would be extracted from the plurality of columns of schema 700. These subsets would be based on the two traversal paths shown in tree 701. The first subset would be extracted based on the traversal path Orders→Customers→Countries (alias: CustomerCountries) and the second subset would be extracted based on the traversal path Orders-→Vendors→Countries (alias: VendorCountries).

Performing step 801 can include performing steps 801A and 801B for every subset of data values extracted. In other words, steps 801A and 802B can be repeated for each subset of data values (and each corresponding traversal path).

At step 801A one or more join operations are performed between the plurality of tables based at least in part on the corresponding traversal path (for the subset) in the one or more traversal paths to generate one or more joined tables. For example, for the second subset discussed above, the Order table would first be joined with the Vendor table to create a first joined table and then that first joined table would itself be joined with the Country table. When the Order table is joined with the Vendor table, the Vendor column can be used as the join criteria since the Vendor column corresponds to the relationship between the tables as indicated in the traversal path shown in tree 701 in FIG. 7.

At step 801B the subset of data values are extracted from the one or more joined tables based at least in part on a range of values for at least one column in the plurality of columns. For example, if a user has specified a range of values in the selection steps discussed earlier, then that the specified range can be used to filter the relevant column (variable) and select the data in the other selected columns that corresponds to the filtered data value.

If the user has not specified any range of values or any filter criteria other than a selection of columns, then this step can alternatively include extracting the subset of data values from the one or more joined tables based solely on the selected columns, without any filtering performed based upon a range of selected values.

At optional step 802, the one or more extracted subsets of data values can be masked. The determination regarding whether to mask a particular extracted subset can be based at least in part on an assessment of data types (variable types) corresponding to the data values in the subset, types or identifiers associated with the tables that have been selected by the user, identifiers or types of data stores that are being read, and one or more security policies or rules. For example, the system can detect that the data store that holds the selected database tables is a sensitive data store and consequently mask the extracted subset based on the sensitive status of the data store. In another example, the system can detect that the column domain is "Social Security Number" and mask the extracted data to protect personal information during processing. The masking can take a variety of forms. For example, a format preserving mask can be used to maintain the illusion that the extracted data values have not been masked.

At step 803 the one or more subsets of data values are transformed into categorical data values to generate the plurality of categorical columns of categorical data. Each subset of data values can include one or more columns (or portions of columns) of data values. Additionally, each of these columns can be of various data types. For example, a column can correspond to a continuous/numerical variable, a string variable, and/or a categorical variable. A continuous or numerical variable is a variable with numerical values (e.g., credit card balance amount in dollars). A categorical variable is a variable with a finite set of discrete values, ordered or unordered (e.g., a small set of credit card networks such as Amex, Mastercard, and VISA; intervals of continuous variable such as high, medium, and low, and/or amounts of credit card balance in dollar ranges). Regardless of the type of the variable, this step maps each of the columns in each of the subsets of data values to a categorical column of categorical data values.

The transformation of data values to categorical data values in step 803 can include a variety of sub-steps, such as one or more of steps 803A, 803B, or 803C. In the simplest case, when the extracted data values already comprise categorical data values, this transformation can include receive an input from a user indicating they would like to utilize the pre-existing categorical data values.

The system can receive one or more matrices with N variables resulting from the steps above (e.g., one or more tables). The system can then check each variable (column) j of the N variables (where $1 \leq j \leq N$, with j indicating the order number) and perform one or more of steps 803A, 803B, 803C and/or one or more other steps depending on the type associated with each variable. In presence of non-structured data, the system can allow the user to identify patterns in the raw data and leverage these to define the values of the categorical variable. The present system can also utilize data profiling to identify patterns in the data: e.g., string pattern (e.g., "@domain." in an email address column), set of unique values (e.g., cities in address column), ranges (e.g., quartiles; below vs. above median).

At step 803A one or more numerical data values in the one or more subsets of data values are converted into one or more first categorical data values by assigning each numerical value to a first categorical data value corresponding to a numerical range that includes that numerical data value.

A more advanced use of data profiling can leverage the analysis of value frequencies along the continuous of values in a column in order to segment the continuum into categories (or intervals). When we can assume that the frequencies are representative of the total population, for example, a bi-modal distribution of frequencies can be segmented into two categories, with each category capturing one peak in frequency distributions, and a uni-modal distribution can be segmented into three categories, before mode, mode, after mode. When we cannot assume that the frequencies are representative of the total population and data may be missing, then the columns profile of the data set can be compared to the profile from reference tables about the population and the distribution can be segmented into the of categories that helps to optimally capture intervals of missing data. For example, for a given column, if the frequency distribution from a reference table (e.g., true frequency distribution of US people by income) is unimodal and the current data in the system is bimodal (e.g., test data management sample for credit card holders), then the system can segment the continuous variable into three categories (based on frequency distribution from the above-mentioned reference table) with the intermediate category optimally covering the interval with missing data to be generated.

Figure 8B:
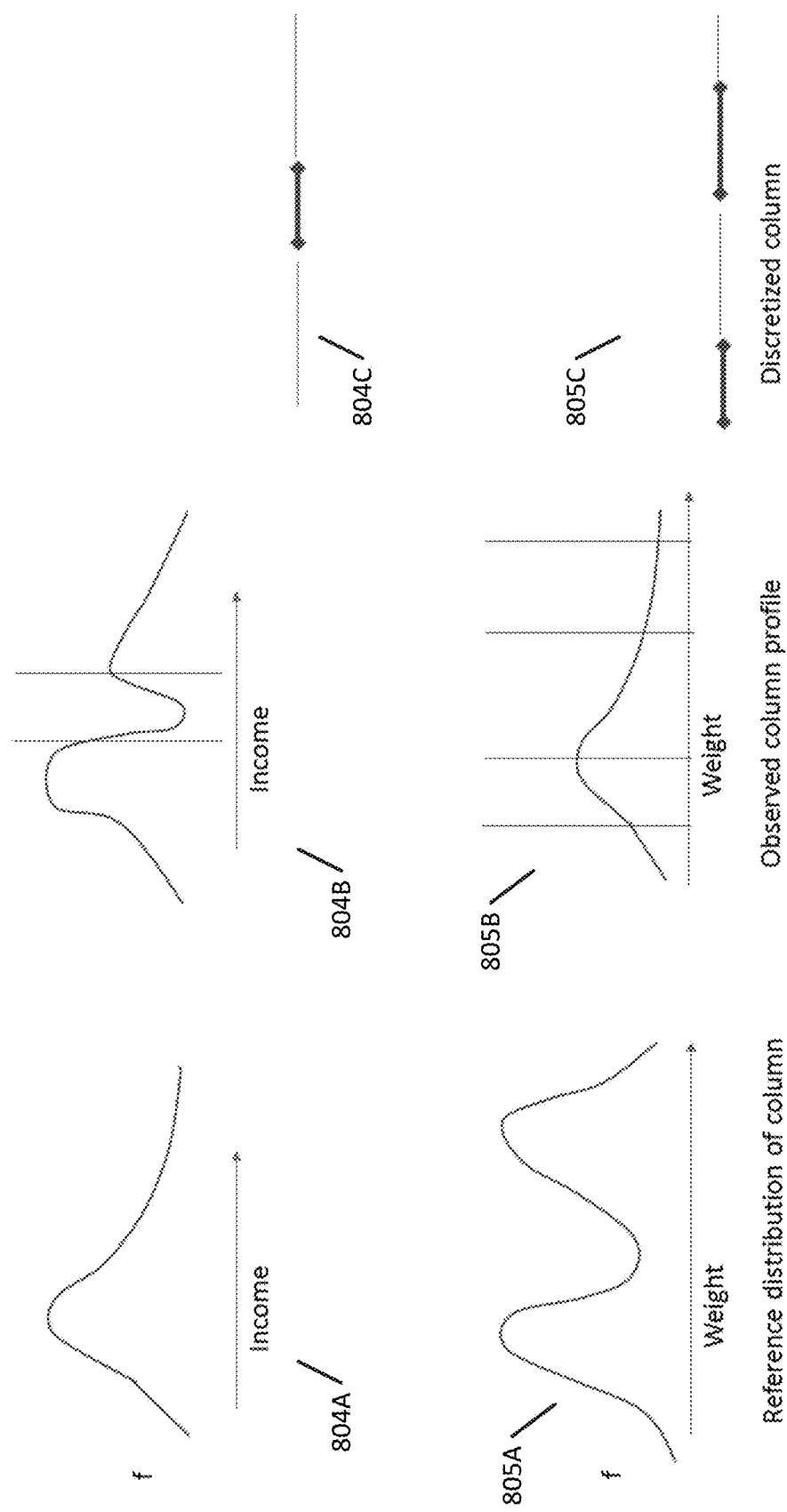
FIG. 8B illustrates example of how the above-mentioned data profiling can be used to determine categories according to an exemplary embodiment.

FIG. 8B illustrates example of how the above-mentioned data profiling can be used to determine categories according to an exemplary embodiment. Unimodal reference distribution 804A can be used to determine that there is likely missing data in a particular range of actual distribution 804B and used to define categories as shown in 804C. Similarly, bimodal reference distribution 805A can be used to determine that there is likely missing data in two ranges of actual distribution 805B and used to define categories as shown in 805C.

Figure 9:
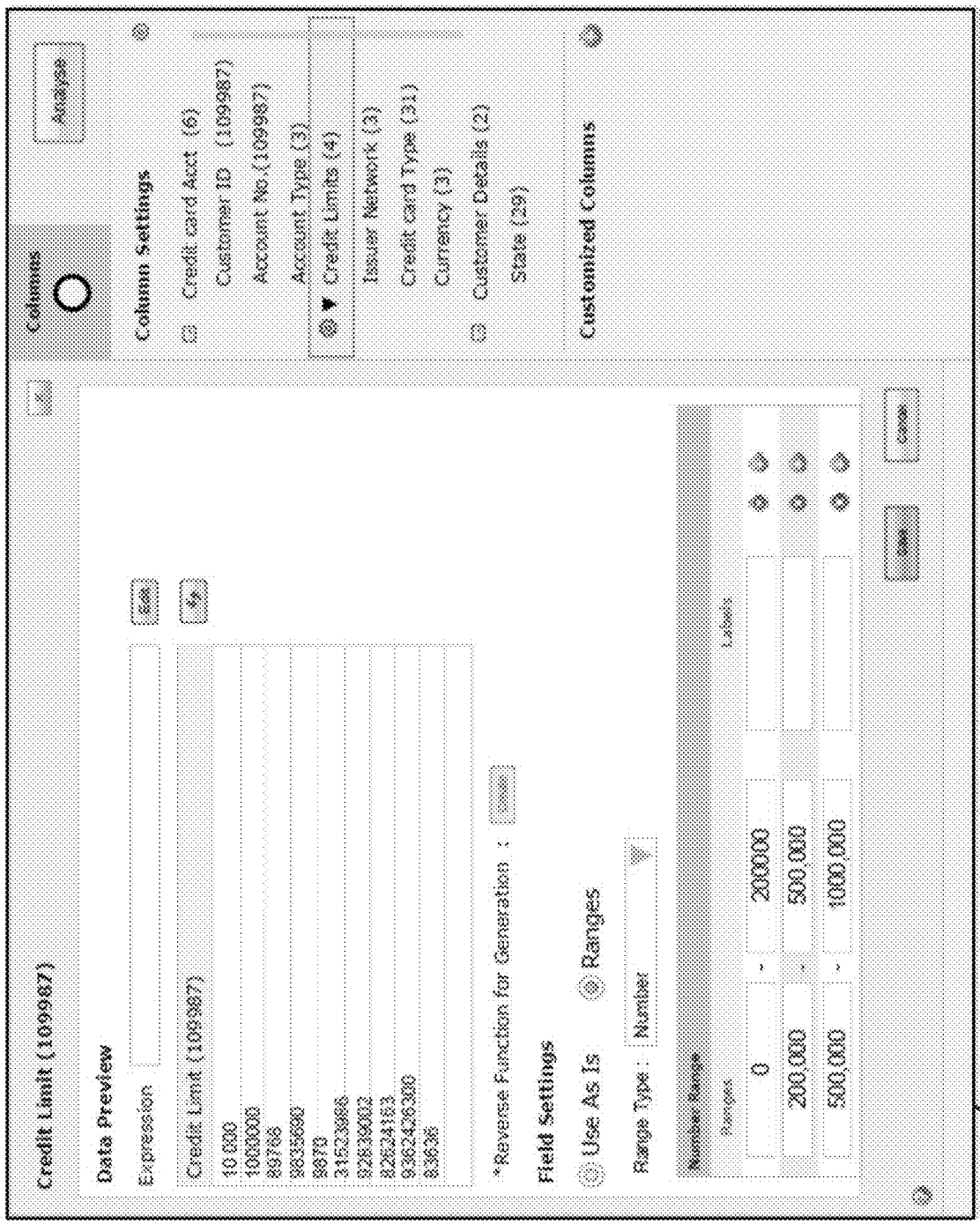
FIG. 9 illustrates an interface for assigning numerical values to categorical data values according to an exemplary embodiment.

FIG. 9 illustrates an interface 900 for assigning numerical values to categorical data values according to an exemplary embodiment. As shown in FIG. 9, a number of numerical ranges are defined for the Credit Limit variable (column), with each numerical range corresponding to a categorical data value in a plurality of categorical data values, and each data value in each cell is mapped to a categorical data values based on the numerical value of that data value and the corresponding numerical range. As shown in FIG. 9, the user can define both the ranges to use for each categorical data value and the label that gets assigned to the corresponding to categorical data value. For example, the Range 0-200,000 can be set to the categorical data value "Low." The interface 900 also displays data profiling information such as the observed values of credit limits in the column to assist the user in defining the ranges or intervals and labels for each range or interval.

As shown in FIG. 9, when a variable (column) is detected as being continuous or numerical, then the system can transform it into categorical data value by bucketing the values of the variable into a set of categories. The set of categories can be determined by the user, manually as in FIG. 9 (e.g., the user may define the ranges of values that correspond to each of the categories "Low", "Medium", and "High" for credit limits), or the system (e.g., the system may define categories in four quartiles, Q1-Q4), automatically. The user can also leverage one or more automatic binning options (e.g., binning values into 4 quartiles).

In the case of a variable with a limited set of unique values, the unique values that are repeated can be listed by the system in the profiling information. The user can then either use the values as provided or can create a custom values for the derived categorical variable.

FIG. 10 illustrates an interface 1000 for assigning a limited set of unique values to categorical data values according to an exemplary embodiment. As shown in FIG. 10, the data values corresponding to the variable "Issuer Network" include three unique values: "Master Card," "VISA," and "American Express." In this case, the user has elected to use the data values "AS-IS" since they already correspond to categorical data values.

Returning to FIG. 8, at step 803B one or more string data values in the one or more subsets of data values are converted into one or more second categorical data values by processing each of the string data values using one or more transformation rules.

Figure 11A:
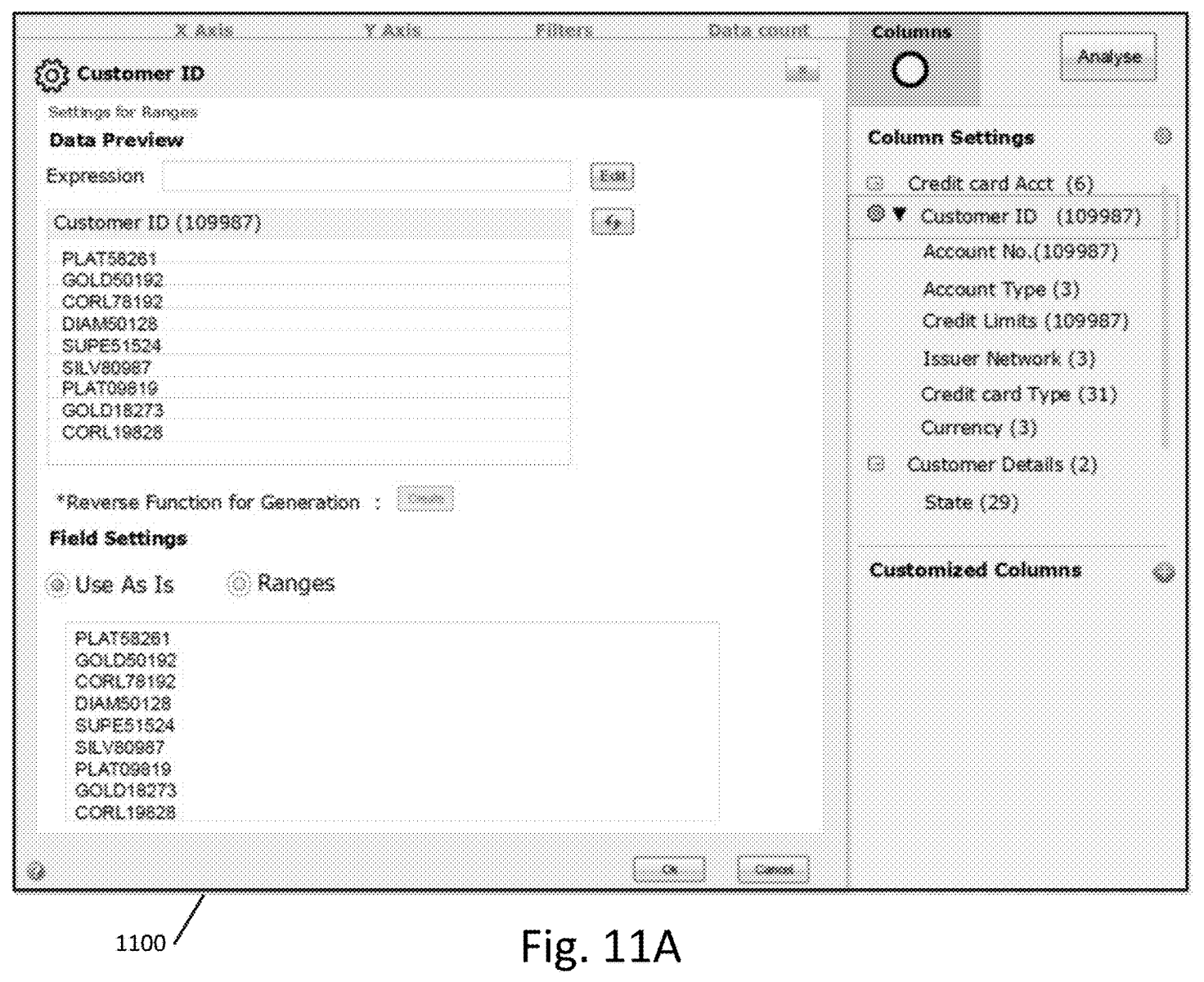
Figure 11B:
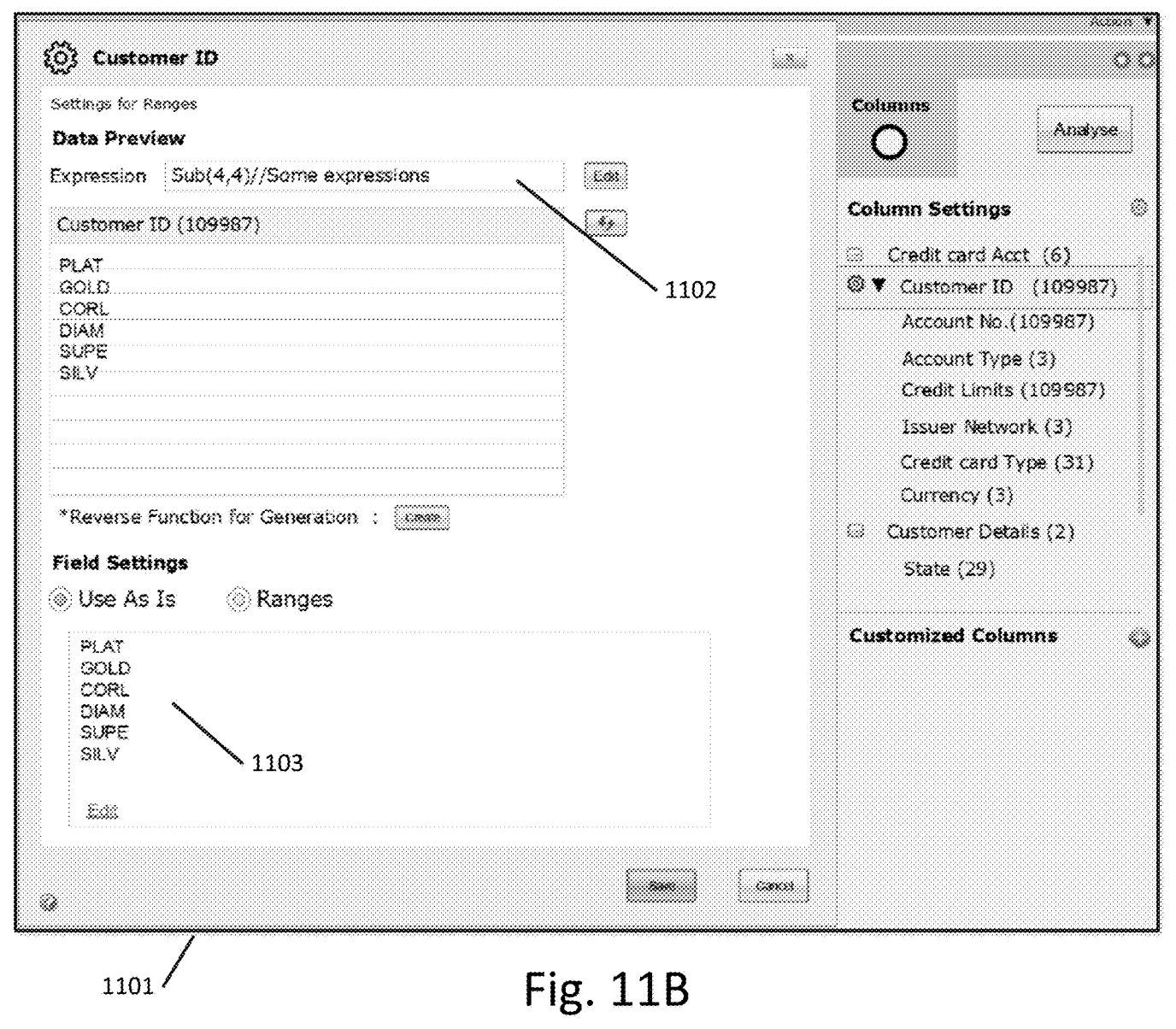

FIGS. 11A-11B illustrate an example of converting string data values to categorical data values using one or more transformation rules according to an exemplary embodiment.

The interface 1100 in FIG. 11A displays the patterns common to values of unstructured data corresponding to a Customer ID variable. Users can leverage these identified patterns to categorize the values of the unstructured data. For example, the Customer IDs shown in interface 1100 of FIG. 11A all have repeating patterns in the first four positions. In particular, the first 4 digits are letters with a few unique values.

As shown in interface 1101 of FIG. 11B, the user has entered a transformation rule in the form of expression 1102. This transformation rule is applied to each of the string data values in the Customer ID column and results in the concatenation of each of the Customer IDs to the first four characters of the Customer ID. The resulting concatenated Customer IDs 1103 are categorical data values since each concatenated Customer ID corresponds to a unique pattern in a set of unique patterns.

In some cases, the categorical variables can be obtained after an expression is applied. For example, the required variable may be a department, which can be obtained by extracting the first 4 characters of the employee identifier, as a substring. Another example is the transformation of a variable such as revenue by converting all the currencies into the USD currency by dividing it by the exchange rate and then categorizing the resulting USD amounts in a few intervals or categories.

Returning to FIG. 8, at step 803C one or more categorical data values in the one or more subsets of data values are converted into one or more third categorical data values by mapping each categorical data value to a third categorical data value.

Figure 12:
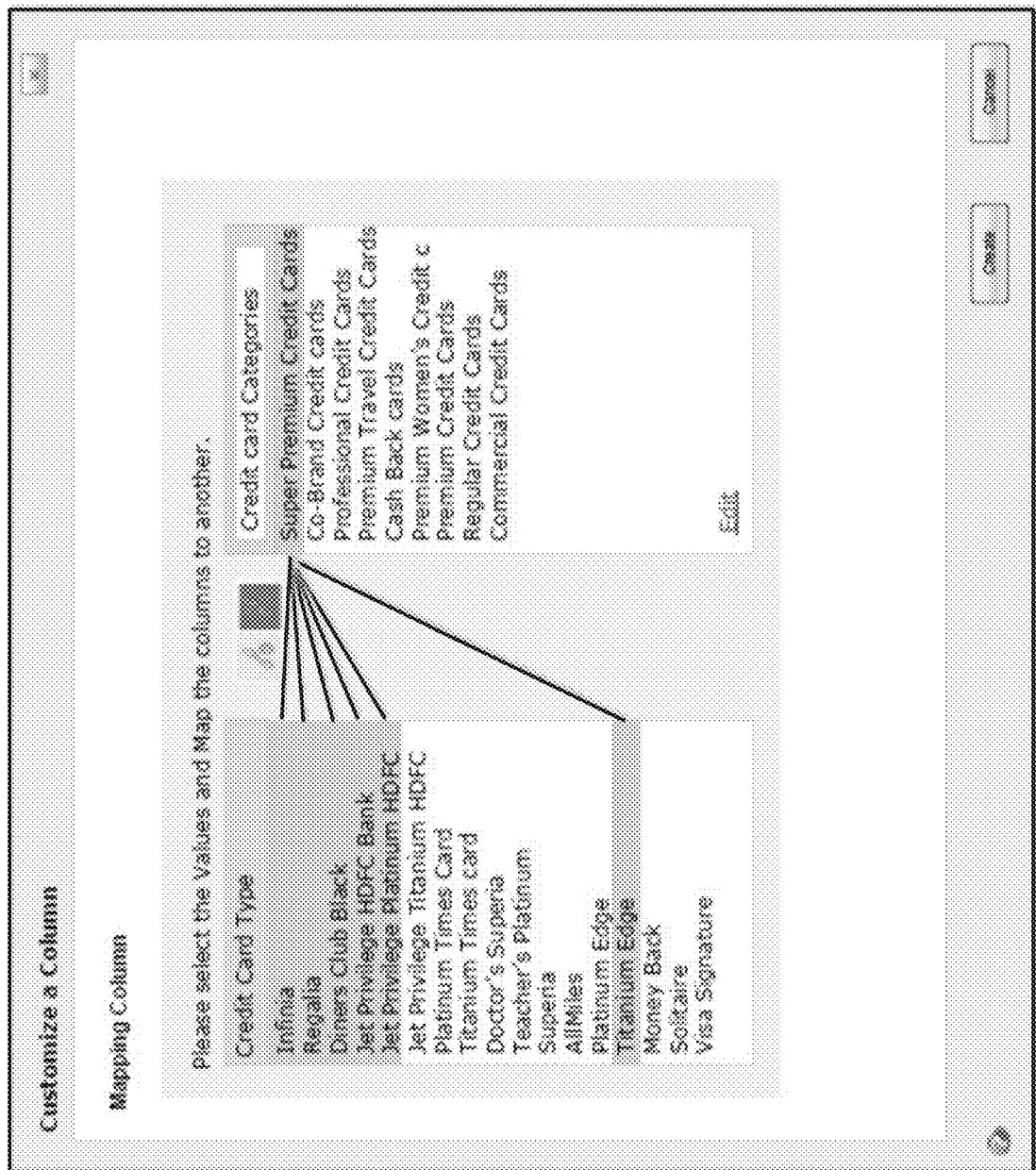
FIG. 12 illustrates an interface for mapping categorical data values to different categorical data values according to an exemplary embodiment.

FIG. 12 illustrates an interface 1200 for mapping categorical data values to different categorical data values according to an exemplary embodiment. As shown in FIG. 12, the user can create a custom set of categorical data values starting from an existing set of categorical data values. In this case, the user has mapped a variable corresponding to unique credit card types to a new variable corresponding to credit card categories. The credit card categories variable has fewer total values, meaning that multiple values from the credit card types category are mapped to a single credit card categories value. Both categorical variables can be stored and made available to the user. The user can also use the customization interface 1200 shown in FIG. 12 to remove or edit values in the variables. For example, the user can remove values in the credit card type variables or the credit card categories variable.

Figure 13A:
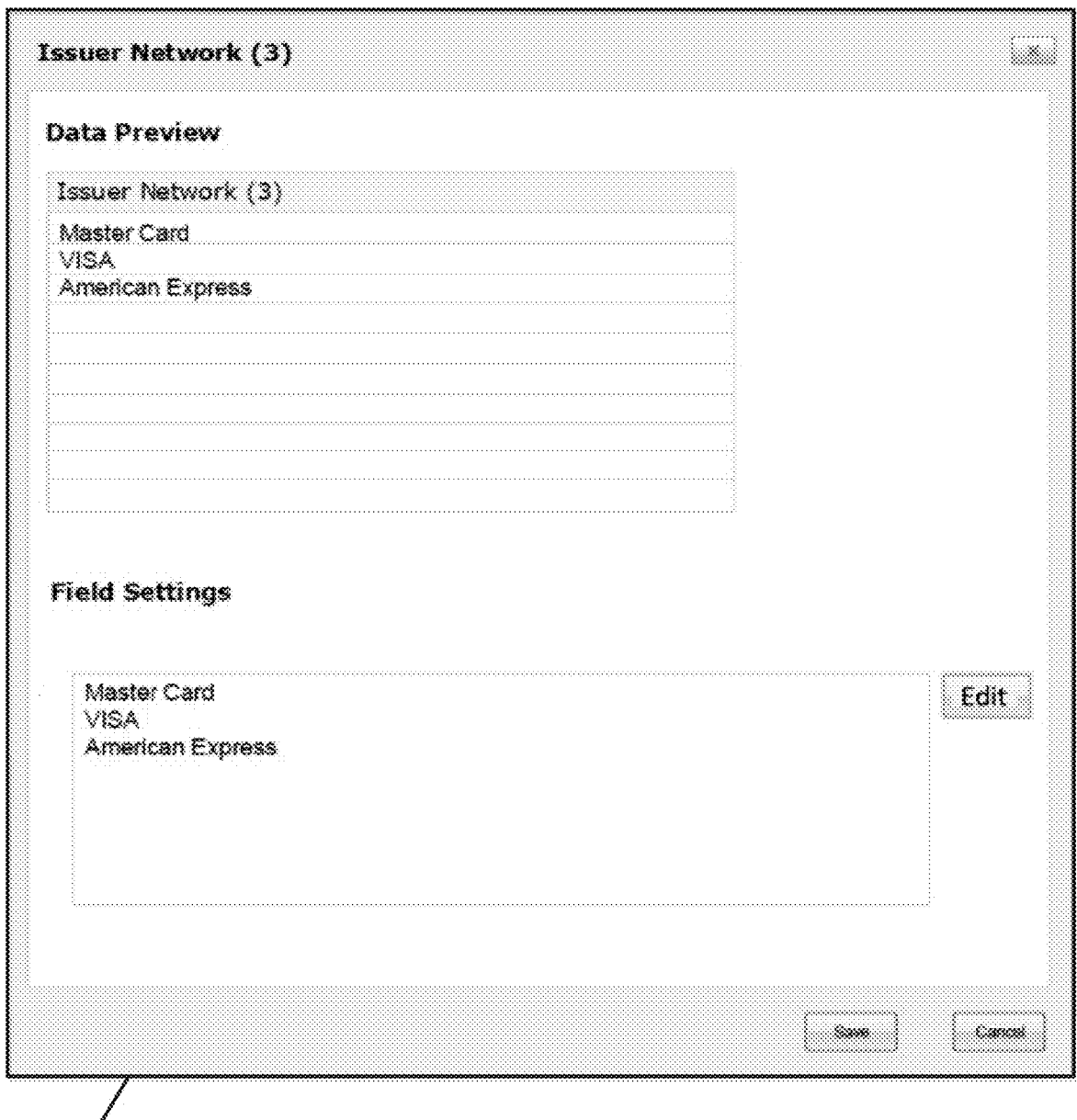
FIGS. 13A-13B illustrate interfaces for adding values to a categorical variable according to an exemplary embodiment.
Figure 13B:
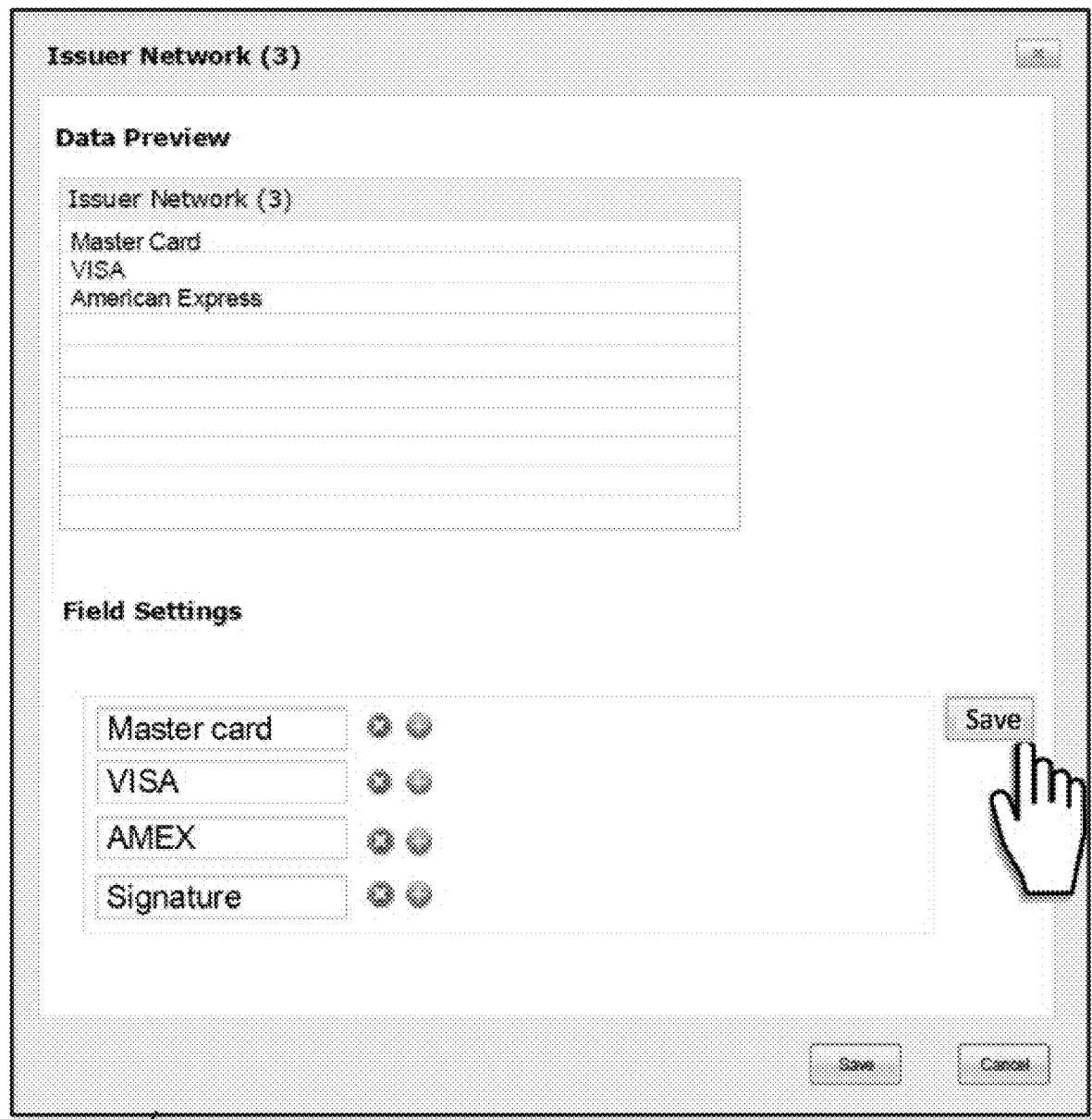

Additionally, the user can add use the customization interface to add values to a particular categorical variable or modify existing values. FIGS. 13A-13B illustrate interfaces for adding values to a categorical variable according to an exemplary embodiment. As shown in interface 1300 of FIG. 13A, the Issuer Network variable has three categorical data values: Master Card, VISA, and American Express. As shown in interface 1301 of FIG. 13B, the user has added an additional categorical data value of "Signature." Additionally, the user has abbreviated the value "American Express" to "AMEX."

Figure 14:
FIG. 14 illustrates an example of a plurality of categorical columns of categorical data generated by transforming data values in a plurality of columns into categorical data values according to an exemplary embodiment.

FIG. 14 illustrates an example of a plurality of categorical columns of categorical data generated by transforming data values in a plurality of columns into categorical data values according to an exemplary embodiment.

As shown in table 1401, the plurality of columns include a Price column, a City column, and an Item Identifier column, each with corresponding data values. As shown in table 1402, the plurality of categorical columns include a Price Category column, a City Category column, and an Item Identifier Category column. Each of the categorical columns in the plurality of categorical columns can be generated from a corresponding column in the plurality of columns using one or more of the above-described techniques. For example, the City Category column is generated by mapping each unique City name to a corresponding city category, such as "East Coast," "Midwest," and "West Coast."

Returning to FIG. 1, at step 103 at least one co-occurrence matrix corresponding to at least one pair of categorical columns in the plurality of categorical columns is generated. The at least one co-occurrence matrix comprises a count of co-occurrence of each unique pair of categorical data values in the at least one pair of categorical columns.

This step can include generating a co-occurrence matrix corresponding to each pair of categorical columns in the plurality of categorical columns. For example, given 3 the categorical columns Price Category, City Category, and Item Identifier Category, three co-occurrence matrices can be generated: one for Price Category—City Category, one for City Category—Item Identifier Category, and one for Price Category—Item Identifier Category.

Alternatively, this step can include generating a co-occurrence matrix corresponding to each pair of adjacent categorical columns in the plurality of categorical columns. For example, if the three categorical columns discussed above are in the following order: (1) Price Category, (2) City Category, and (3) Item Identifier Category, then this step can include generating two co-occurrence matrices: one for Price Category-City Category and one for City Category-Item Identifier Category.

Of course, many variations are possible and these examples are not intended to be limiting. While generating a co-occurrence matrix only for adjacent categorical columns can reduce overhead and increase processing time, generating a co-occurrence matrix for every pair of categorical columns can provide more accurate estimates of expected values and missing data.

Figure 15:
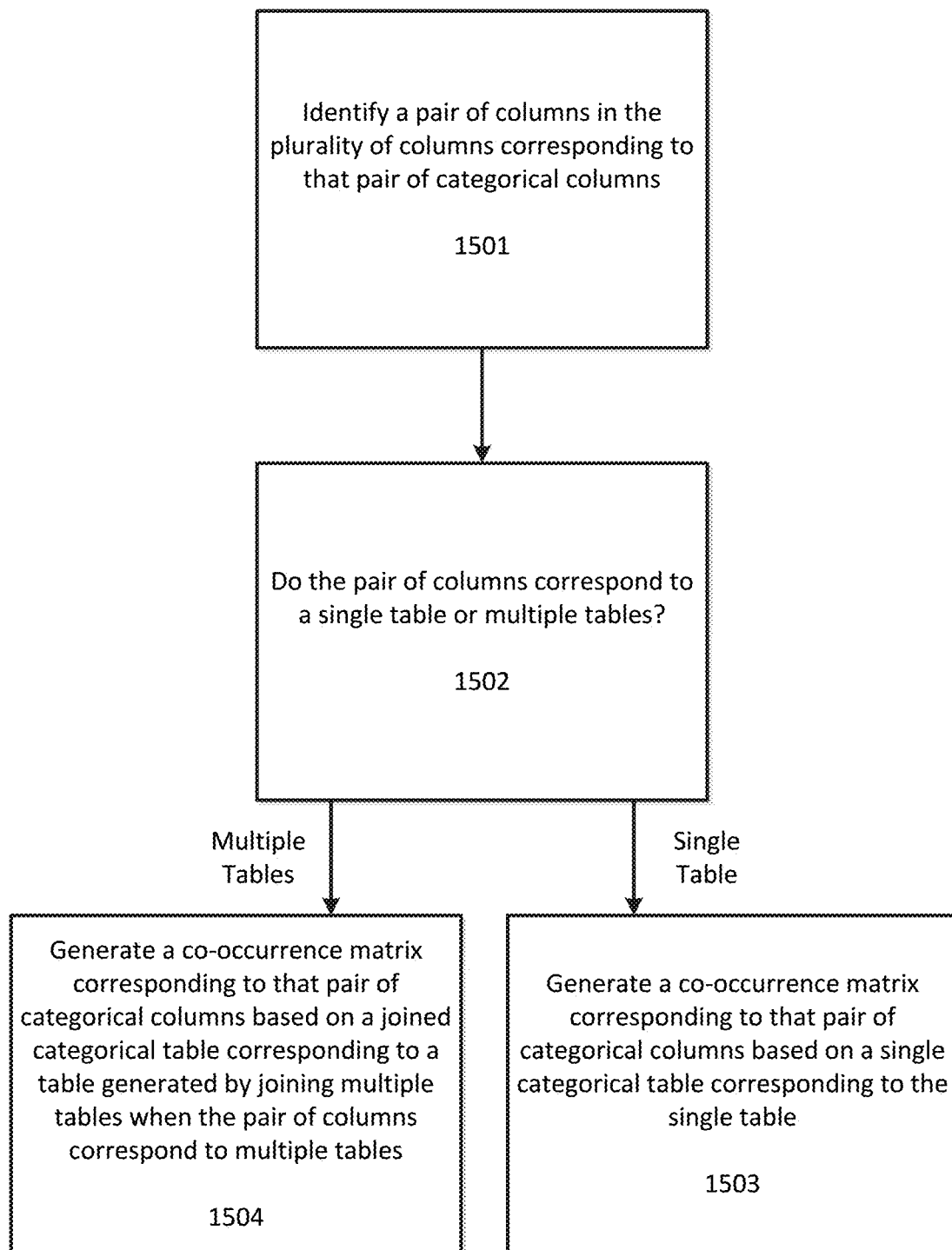
FIG. 15 illustrates a flowchart for generating a co-occurrence matrix corresponding to a pair of categorical columns in the plurality of categorical columns according to an exemplary embodiment.

FIG. 15 illustrates a flowchart for generating a co-occurrence matrix corresponding to a pair of categorical columns in the plurality of categorical columns according to an exemplary embodiment. The process shown in FIG. 15 can be repeated for each pair of categorical columns if a co-occurrence matrix is generated for more than one pair of categorical columns.

At step 1501 a pair of columns in the plurality of columns corresponding to that pair of categorical columns are identified. For example, if the pair of categorical columns included the City Category column and the Item Identifier Category column, then this step would include identifying the corresponding City column and Item Identifier column in the plurality of columns. This identification can be performed using a lookup table or other data structure that stores the correspondence between the plurality of categorical columns that are generated and the plurality of columns selected identified in the data store. Each categorical column can be mapped to a corresponding column in the plurality of columns identified in the data store. Even if the categorical column is identical to an identified column (the identified column is used "as-is"), a correspondence can be maintained between the two instances of the column.

At step 1502 a determination is made regarding whether the pair of columns correspond to a single table in the one or more tables of the data store or whether the pair of columns correspond to more than one table of the data store. This can be determined by, for example, consulting the tree schema structure storing data traversal paths or consulting one or more other reference data structures.

If the pair of columns correspond to a single table (meaning they are found in a single table in the underlying data store), then a co-occurrence matrix corresponding to that pair of categorical columns is generated based on a single categorical table corresponding to the single table at step 1503. In this case, the number of distinct combinations of values in the pair of columns can be obtained by grouping the records in the table based on the values in those columns and counting the number of rows in each group. If a filter is specified on another column in the same table, then the records are filtered based on the filter criterion before the grouping operation. If the variables are defined as categories of values in columns, the counts for values that fall in the same category are added to obtain the number of distinct combinations of each category.

If the pair of columns correspond to multiple tables (meaning they are found distributed across more than one table in the underlying data store and not in a single table), then a co-occurrence matrix corresponding to that pair of categorical columns is generated based on a joined categorical table corresponding to a table generated by joining the multiple tables at step 1504. When variables come from columns in different tables in the tree schema, the related tables on the path between those tables are joined to obtain a de-normalized view of the tables in the tree. The unique aliases ensure that if columns from the same physical table appear multiple times in this de-normalized view, then they do so under different aliases. This de-normalized view usually corresponds to an entity that is modeled using the database schema. The number of distinct combinations of values in any pair of columns can now be obtained in a similar fashion as done for the single table case when the pair of columns correspond to more than one table.

FIG. 16 illustrates an example of generating a co-occurrence matrix for a pair of categorical columns according to an exemplary embodiment. Table 1600 is a table of categorical columns corresponding to table 1402 shown in FIG. 14. Box 1601 illustrates a co-occurrence matrix computed between the Price Category column and the City Category column based on the categorical data values shown in table 1600. For example, as shown in box 1601, the Price Category of "Medium" occurs twice in the same row as the City Category "West Coast." The co-occurrence matrix is generated by tracking frequency of co-occurrence of two or more unique data values corresponding to two or more columns (categories) in a single row. Of course, it is understood that co-occurrence matrices can be generated for larger groupings of variables beyond pairs, such as three variables, four variables, etc.

Returning to FIG. 1, at step 104 an expected frequency of co-occurrence corresponding to each unique pair of categorical data values in the at least one pair of categorical columns is determined based at least in part on a plurality of marginal totals corresponding to a plurality of categorical data values in the at least one co-occurrence matrix.

Figure 17:
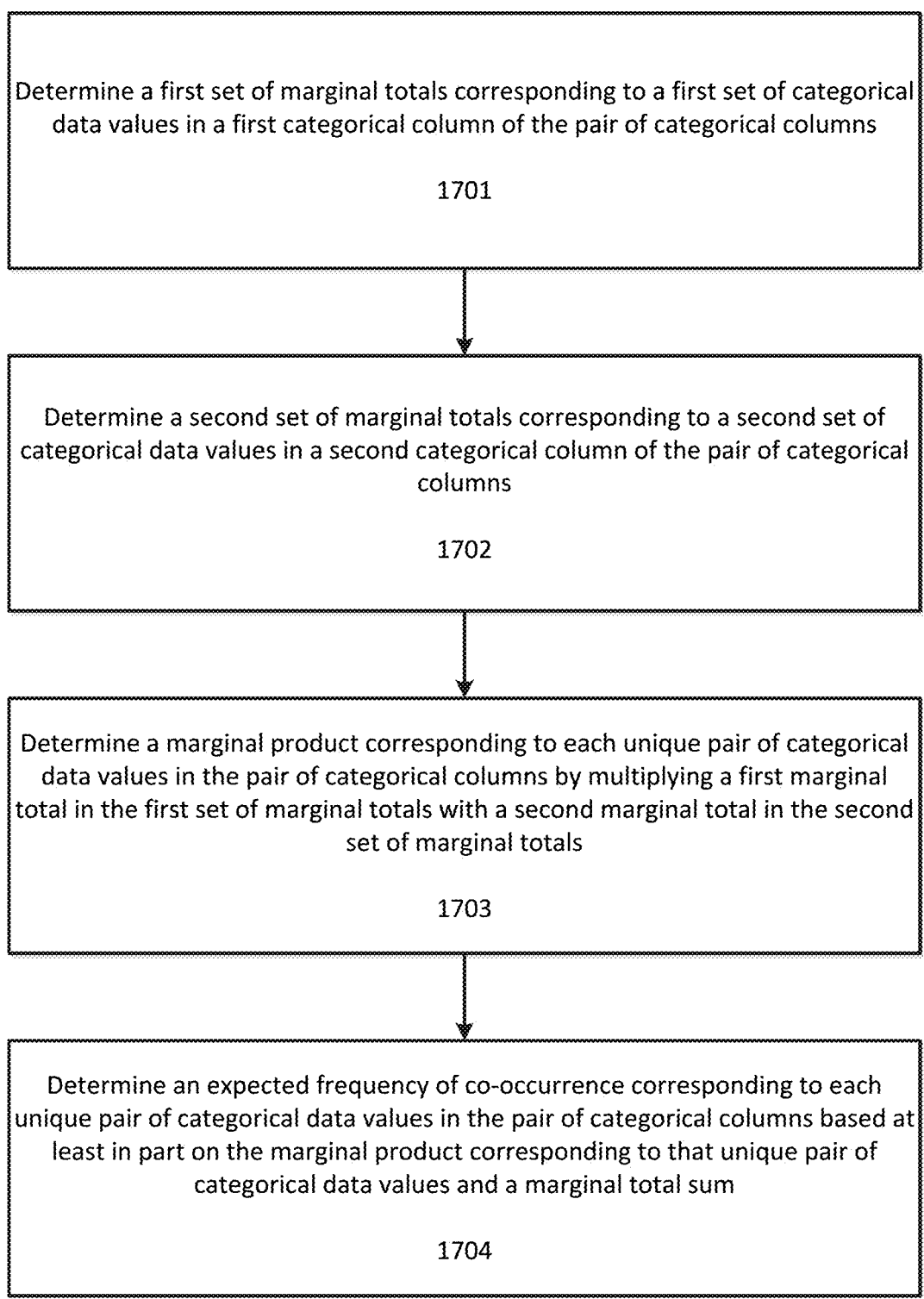
FIG. 17 illustrates a flowchart for determining an expected frequency of co-occurrence corresponding to each unique pair of categorical data values in a pair of categorical columns based at least in part on a plurality of marginal totals corresponding to a plurality of categorical data values in the at least one co-occurrence matrix according to an exemplary embodiment.

FIG. 17 illustrates a flowchart for determining an expected frequency of co-occurrence corresponding to each unique pair of categorical data values in a pair of categorical columns based at least in part on a plurality of marginal totals corresponding to a plurality of categorical data values in the at least one co-occurrence matrix according to an exemplary embodiment.

At step 1701 a first set of marginal totals corresponding to a first set of categorical data values in a first categorical column of the pair of categorical columns are determined. At step 1702 a second set of marginal totals corresponding to a second set of categorical data values in a second categorical column of the pair of categorical columns are determined.

FIG. 18A illustrates an example of a co-occurrence matrix 1801 including unique pairs of categorical data values according to an exemplary embodiment. Each cell of co-occurrence matrix corresponds to a unique pair of categorical data values in a pair of categorical columns. For example, cell 1801A corresponds to the unique pair of categorical values {Medium, West Coast} in the pair of categorical columns {Price Category, City Category}. Similarly, cell 1801B corresponds to the unique pair of categorical values {Low, East Coast} in the pair of categorical columns {Price Category, City Category}.

FIG. 18B illustrates an example of a co-occurrence matrix 1802 including a first and second set of marginal totals according to an exemplary embodiment. The row of totals 1802A corresponds to a first set of marginal totals {3, 3, 1} corresponding to a first set of categorical data values (Low, Medium, High) in a first categorical column {Price Category}. Similarly, the column of totals 1802B corresponds to a second set of marginal totals {2, 2, 3} corresponding to a second set of categorical data values {East Coast, Midwest, West Coast} in a second categorical column {City Category}.

Returning to FIG. 17, at step 1703 a marginal product corresponding to each unique pair of categorical data values in the pair of categorical columns is determined by multiplying a first marginal total in the first set of marginal totals with a second marginal total in the second set of marginal totals;

FIG. 18C illustrates an a table of marginal products 1803 based on the marginal totals shown in FIG. 18B. Each marginal product corresponds to a product of a first marginal total in the first set of marginal totals and a second marginal total in the second set of marginal totals. For example, the marginal product corresponding the categorical data value pair (Low, East Coast) is the product of the marginal total for the Low column (which is "3" as shown in FIG. 18B) and the marginal total for the East Coast row (which is "2" as shown in FIG. 18B), resulting in a product of 3×2=6.

Returning to FIG. 17, at step 1704 an expected frequency of co-occurrence corresponding to each unique pair of categorical data values in the pair of categorical columns is determined based at least in part on the marginal product corresponding to that unique pair of categorical data values and a marginal total sum. The marginal total sum comprises a sum of either the first set of marginal totals or the second set of marginal totals. For example, as shown in FIG. 18B, the sum of the first set of marginal totals (row 1802A) will always be equal to the sum of the second set of marginal totals (column 1802B).

FIG. 18D illustrates an expected frequency of co-occurrence matrix 1804 corresponding to each unique pair of categorical data values according to an exemplary embodiment. Each expected frequency of co-occurrence corresponding to each unique pair of categorical data values is determined by dividing the marginal product corresponding to that unique pair of categorical data values by the marginal total sum.

For example, for the unique pair of categorical data values {Low, East Coast}, the expected frequency of co-occurrence is determined by dividing the marginal product for that unique pair (which is "6"—as shown in FIG. 18C) by the marginal total sum (which is "7" as shown in FIG. 18B). The expected frequency of co-occurrence is therefore ((3×2)/7) =6/7=0.86. This quantities being multiplied are shown with dashed arrows between FIG. 18C and FIG. 18D.

Returning to FIG. 1, at step 105 one or more locations of missing data are identified based at least in part on the count of co-occurrence of each unique pair of categorical data values in the at least one pair of categorical columns and the expected frequency of co-occurrence corresponding to each unique pair of categorical data values in the at least one pair of categorical columns.

Figure 19:
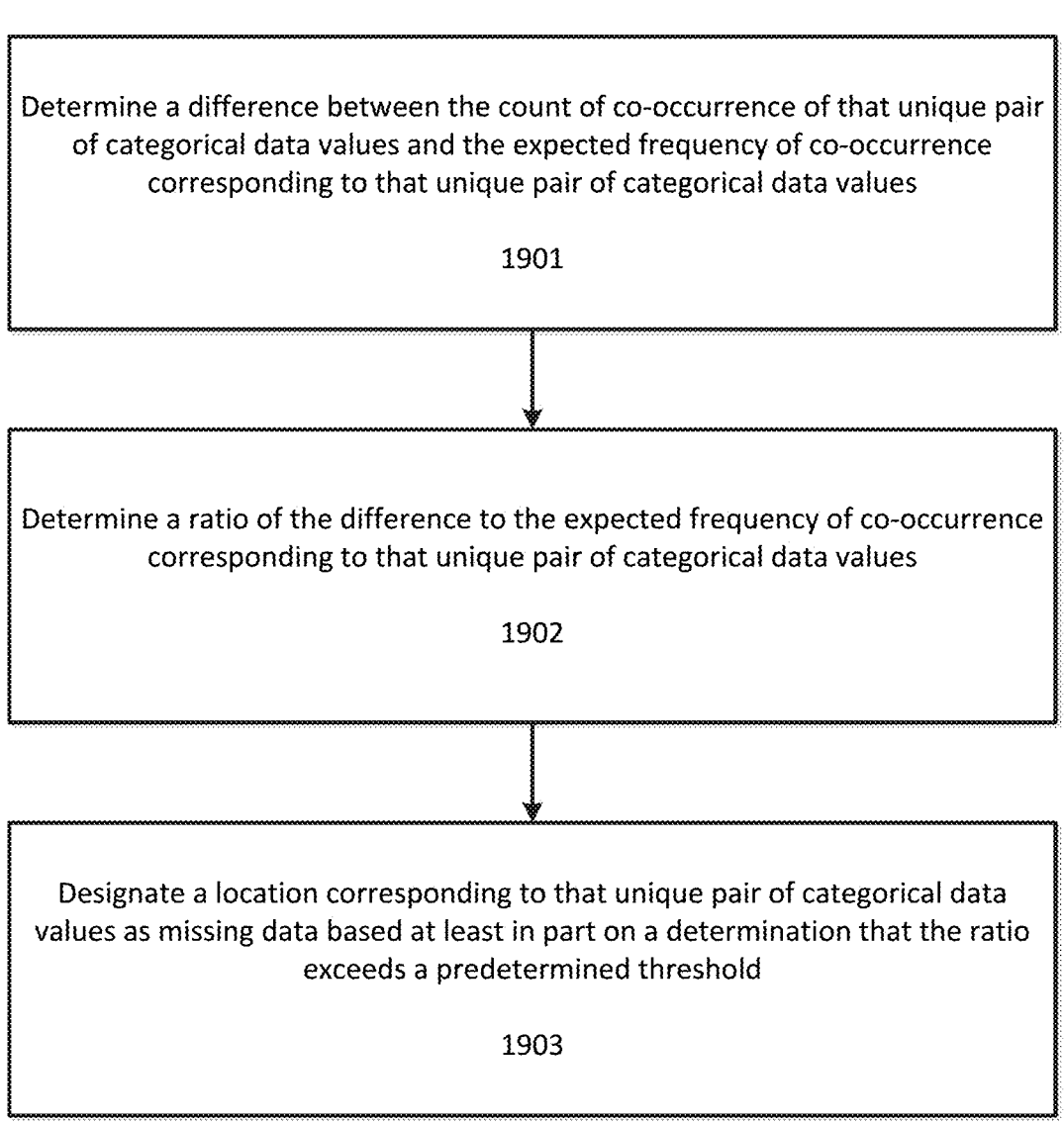
FIG. 19 illustrates a flowchart for identifying one or more locations of missing data based at least in part on the count of co-occurrence of each unique pair of categorical data values in a pair of categorical columns and the expected frequency of co-occurrence corresponding to each unique pair of categorical data values in the pair of categorical columns according to an exemplary embodiment.

FIG. 19 illustrates a flowchart for identifying one or more locations of missing data based at least in part on the count of co-occurrence of each unique pair of categorical data values in a pair of categorical columns and the expected frequency of co-occurrence corresponding to each unique pair of categorical data values in the pair of categorical columns according to an exemplary embodiment. The process performed in FIG. 19 can be repeated for each unique pair of categorical data values in the pair of categorical columns and used to determine whether that a location corresponding to that unique pair of categorical data values has missing data.

At step 1901 a difference between the count of co-occurrence of each unique pair of categorical data values and the expected frequency of co-occurrence corresponding to that unique pair of categorical data values is determined.

FIG. 20A illustrates an example of the process of determining a difference between the count of co-occurrence of each unique pair of categorical data values and the expected frequency of co-occurrence corresponding to that unique pair of categorical data values according to an exemplary embodiment. Matrix 2000 shows the observed counts of co-occurrence for each unique pair of categorical data values between categories {Price Category, City Category}. Matrix 2001 shows the expected frequency of co-occurrence for each unique pair of categorical data values between categories {Price Category, City Category}. The expected frequency of co-occurrence can be determined as discussed above with reference to the previous figures.

Matrix 2002 shows the difference between the observed counts of co-occurrence for each unique pair of categorical data values and the expected frequency of co-occurrence for each unique pair of categorical data values. As shown in FIG. 20A, this difference is calculated by subtracting the observed counts of co-occurrence from the expected frequency of co-occurrence.

Returning to FIG. 19, at step 1902 a ratio of the difference to the expected frequency of co-occurrence corresponding to that unique pair of categorical data values can be determined. This step is a normalization step that can be optional. For example, the user can choose to use the difference between the observed and expected frequency in subsequent steps and can omit the step of determining a ratio. In that case, the user would utilize the absolute value of the difference for each pair rather than the ratio which provides a relative measure. This ratio effectively indicates what percentage of expected co-occurrence was actually observed. For example, if the observed frequency for a unique pair of values was 3 and the expected frequency of co-occurrence for that unique pair of values was 6, then the difference between the observed and expected would be 3−6=−3. The ratio of the difference to the expected frequency would then be −3/6=−0.5=−50%. This means that the co-occurrence actually observed was 50% less than what was expected. Conversely, a ratio of 0.5, or 50%, indicates that the co-occurrence actually observed was 50% greater than what was expected. A ratio of 0 indicates that co-occurrence actually observed matched the expected frequency of co-occurrence.

At step 1903 a location corresponding to each unique pair of categorical data values is designated as missing data based at least in part on a determination that the ratio (which can be expressed as a percentage) corresponding to that unique pair of categorical data values exceeds a predetermined threshold. The location can be a logical address corresponding to an intersection between the unique pair of categorical data values in a table that stores intersections between all pairs of categorical data values in a pair of categorical columns. In the above example, if the predetermined threshold was set at −30%, then the location corresponding to the unique pair of values would be designated as missing data since the calculated ratio was −50% and −50% exceeds −30%. Note that in this context, "exceeds" means "is less than" since missing data is expressed as a negative percentage. If missing data is expressed by a positive percentage value, then exceeds would mean "is greater than." Optionally, this step can be performed using the difference values determined in step 1901 rather than the ratios determined in step 1902. In this case, the predetermined threshold can be set to a specific number.

FIG. 20B illustrates an example of designating location of missing data according to an exemplary embodiment. Matrix 2003 illustrates the ratios of the difference (between expected and observed co-occurrence) to the expected co-occurrence for each unique pair of categorical data values. Matrix 2004 illustrates these same ratios as a percentage. Matrix 2005 indicates which locations corresponding to unique pairs of categorical data values have missing data. For the purpose of this example, the threshold was assumed to be a value greater than −100%, for example, −50% or −35%. Of course, any threshold can be utilized and these examples are not meant to be limiting. The threshold can be set by an administrator, such as a test data manager. Additionally, multiple thresholds can be set and be used to indicate different degrees of missing data a particular location. For example, multiple thresholds can corresponding to missing data categories {severely missing data, some missing data, no missing data, excess data}.

FIGS. 21A-21D illustrate another example of the missing data identification process according to an exemplary embodiment. FIG. 21A illustrates a Card by Territory contingency table including observed frequencies of co-occurrence. Card and Territory here can represent two adjacent variables in an ordered list of variables. As shown in FIG. 21A, the marginal totals for the four Card categories are 180, 284, 706, and 1085 and those for the two Territories categories are 424 and 1831.

FIG. 21B illustrates the Card by Territory contingency table including expected frequencies. The expected frequency for each cell i-j=(row i total*column j total)/total of totals. For example, in the data the NewCard category is expected to co-occur with the East Coast category with a frequency of (180*424)/2255=34 (rounded value).

FIG. 21C illustrates the difference between the values in FIG. 21A and those in FIG. 21B. This value is given by observed frequency of co-occurrence—expected frequency of co-occurrence. FIG. 21D illustrates the ratios of the difference (between expected and observed co-occurrence) to the expected co-occurrence for each unique pair of categorical data values. These values indicate the percentage of expected frequency observed in each cell. For example, for cell {East Coast, New Card}, the expected frequency was 34 but the actual observed frequency was 0, indicating that observed co-occurrence was 100% less than what was expected. One or more thresholds can then be applied to these percentage values to designate locations that are missing data.

Returning to FIG. 1, at step 106 a visualization comprising one or more regions corresponding to the one or more locations of missing data is generated. This visualization can take a variety of forms, as is discussed in greater detail below.

The step of generating a visualization comprising one or more regions corresponding to the one or more locations of missing data can include the steps of generating a grid comprising a plurality of regions, with each region in the plurality of regions corresponding to a unique group of categorical data values in two or more categorical columns and modifying a visual attribute of the one or more regions that correspond to the one or more locations of missing data to be distinct from other regions in the plurality of regions.

Figure 22:
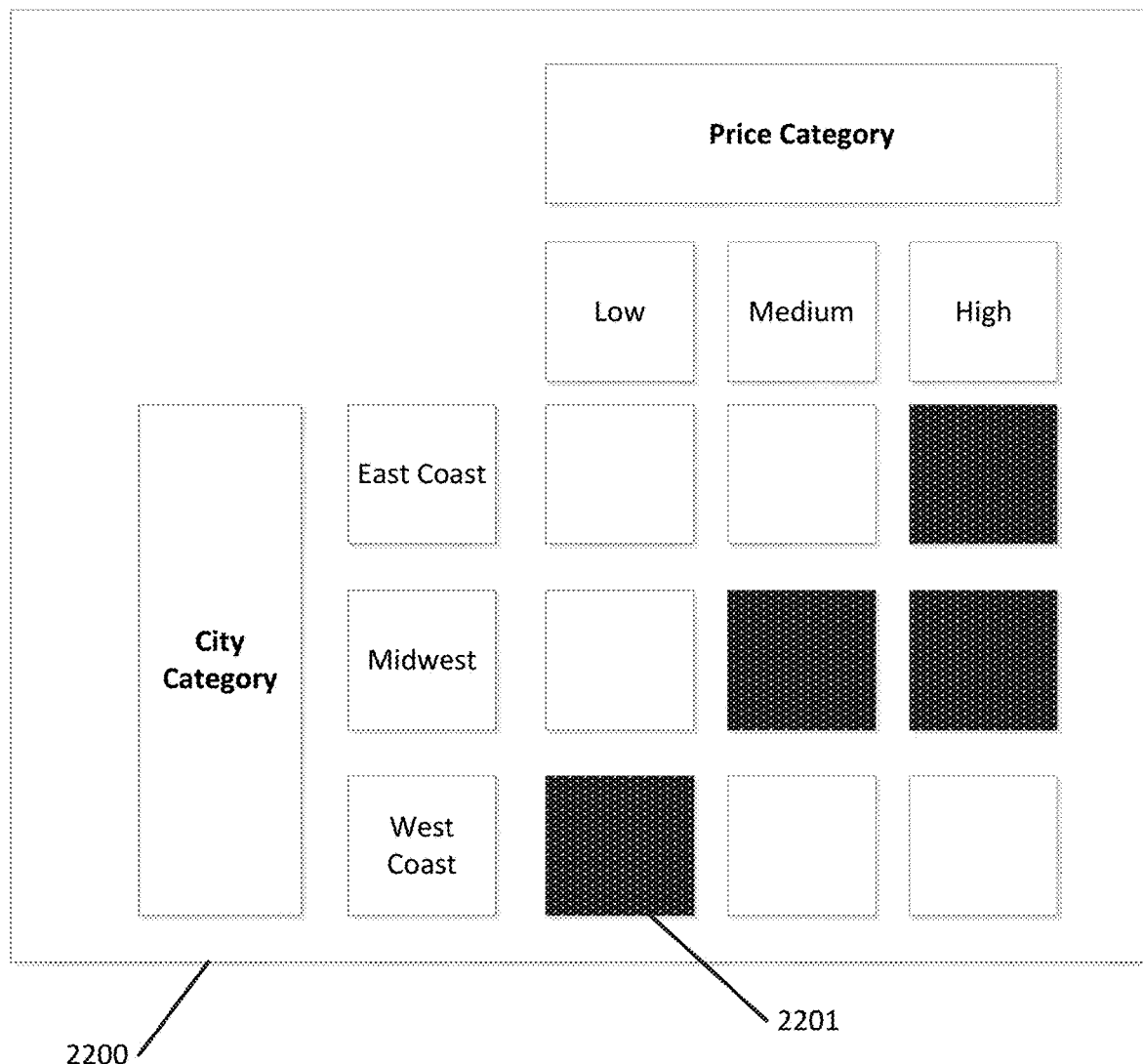
FIG. 22 illustrates an example of a grid visualization generated based on the missing locations identified in FIG. 20B according to an exemplary embodiment.

FIG. 22 illustrates an example of a grid 2200 visualization generated based on the missing locations identified in FIG. 20B. As shown in the grid visualization, there are nine regions, with each region corresponding to a unique combination of a Price Category and a City Category. Regions corresponding to locations that were designated as missing data in FIG. 20B have distinctive visual attributes. In this case, the regions corresponding to missing data locations are shaded black whereas locations of sufficient data are not shaded (white). For example, region 2201 corresponds to a location representing unique combination {Low, West Coast}. The black shading of this region indicates that this intersection of values is missing data. As used herein, missing data does not necessarily mean there is no data (although that can be the case), but just that the amount of data that is present is less than expected.

Figure 23A:
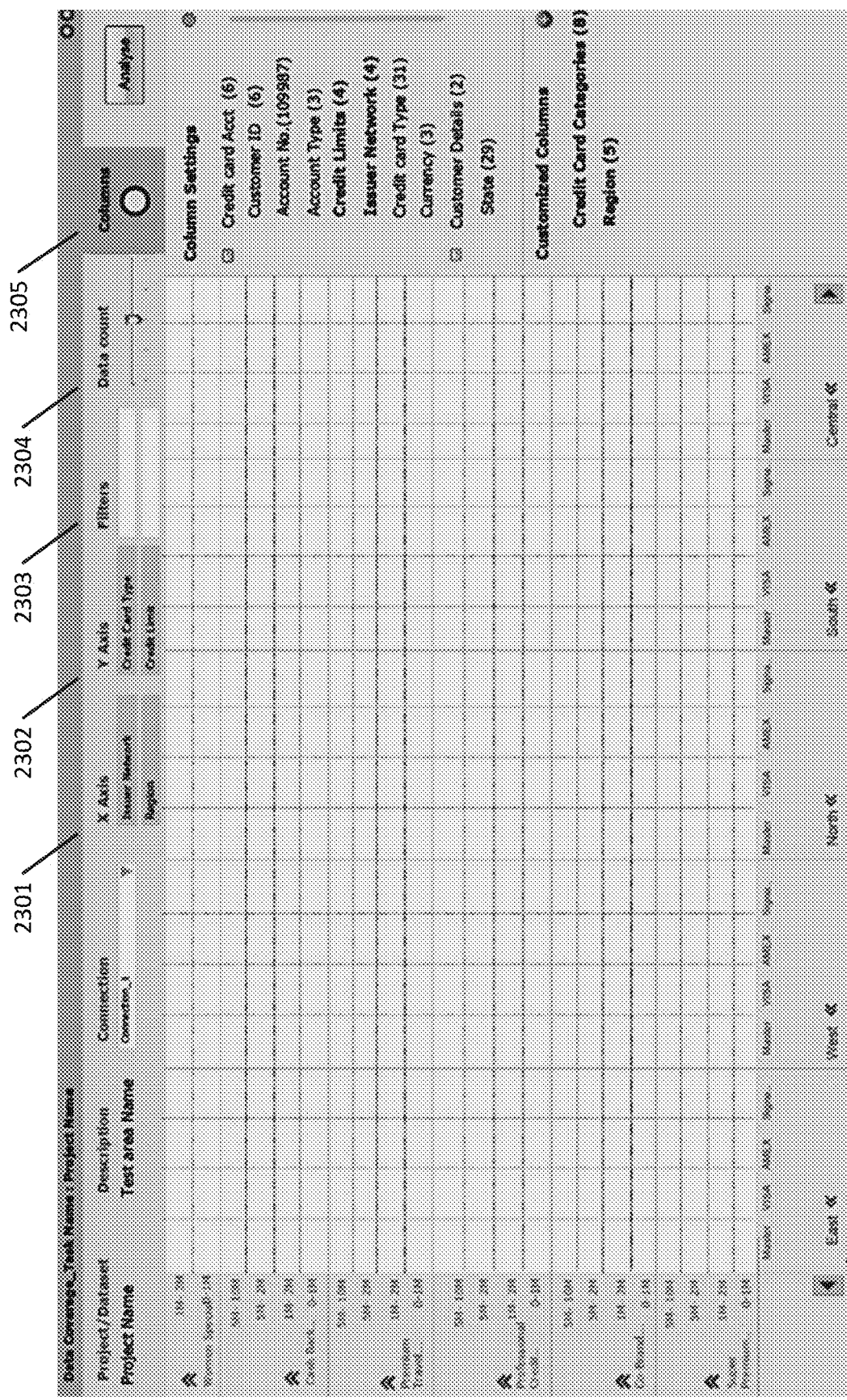
FIG. 23A illustrates an interactive grid interface without the plurality of regions according to an exemplary embodiment.

FIG. 23A illustrates an interactive grid interface 2300 without the plurality of regions. As shown in FIG. 23A, the interactive visualization includes sets of nested variables, which can be assigned to the x-axis and/or y-axis using controls 2301 and/or 2302. In this case, region is assigned to the x-axis and issuer network is nested under region. Additionally, credit limit is assigned to the y-axis and nested under credit card type. The user can drag and drop the variables/columns to the X and Y coordinates, select the appropriate variables from a drop-down list, and/or use some other input mechanism. As discussed earlier, the user can create new variables based on existing variable: e.g., the user may generate a categorical variable from a numerical variable such as the variable credit limit classes (low, medium, high) generated from a credit limit variable ($).

While the grid interface 2300 shows two variables plotted on each axis, the actual number can be adjusted to be more or less, depending on user requirements and/or processing power available. For example, a single variable can be plotted on each axis or three variables can be nested on each axis.

Control 2303 allows the user to select filters, such as a range of particular data values in a particular column. Control 2304 allows users to dynamically adjust the threshold for designating missing data by moving the slider left to right. As will be discussed further below, users can also utilize control 2304 to set multiple thresholds with corresponding indicia of missing data levels in the visualization. Additionally, control 2305 lists the columns identified in the data store, as well as user created columns or customized columns.

Figure 23B:
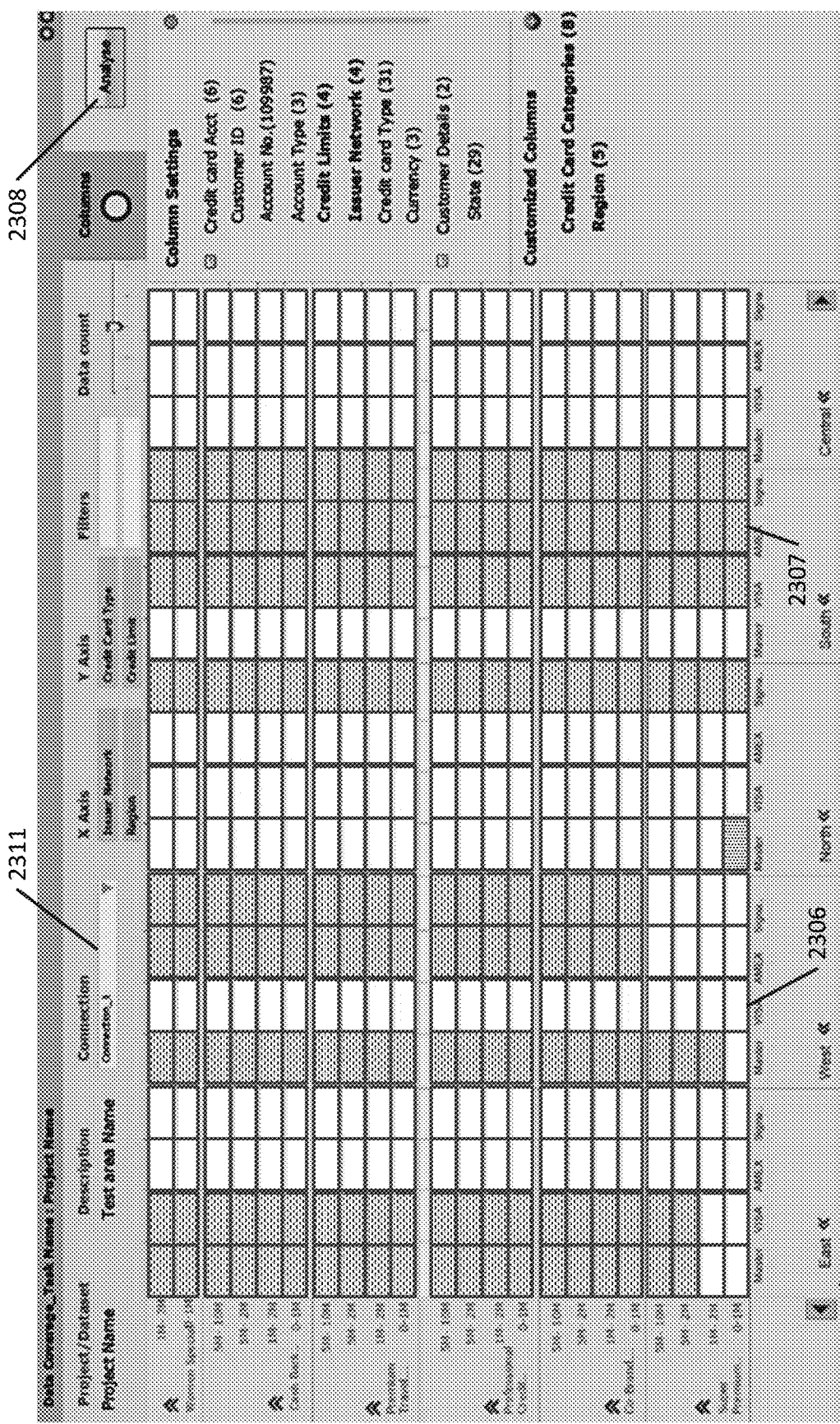
FIG. 23B illustrates the interactive grid interface with the plurality of regions corresponding to unique groups of categorical data values according to an exemplary embodiment.

FIG. 23B illustrates the interactive grid interface 2300 with the plurality of regions corresponding to unique groups of categorical data values. As shown in FIG. 23B, each of the regions corresponds to a unique combination of Issuer Network, Region, Credit Card Type, and Credit Limit. Each region is also shaded or non-shaded, indicating whether there is missing data corresponding to that location.

For example, region 2307 corresponds to the unique combination of categorical values {South, AMEX, Super Premium, 0-1 M} and is shaded, indicating there is missing data at that location. By contrast, region 2306 corresponds to the unique combination of categorical values {West, VISA, Super Premium, 0-1 M} and is not shaded, indicating there is sufficient data at that location.

When a user clicks on 'Analyze' button 2308, after taking user inputs, the system can analyze the data counts present in the data store for selected combinations. The analysis can include data coverage analysis which analyzes data counts in more than one connection at a time with the selected conditions, the selected tables, selected columns, and selected relationships to see whether results are similar in other data stores. Users can adjust connection settings using connection dropdown 2011.

The interface 2300 allows users to visualize gaps in the data and adjust the minimum data count threshold to get an understanding of the magnitude of the gaps. Adjusting the threshold results in recalculating whether there is missing data at each of the locations. Shaded or color-coded cells can be used to indicate missing data. Additionally, summary statistics can be provided for the entire grid. Details can also be provided for individual cells As discussed in greater detail with reference to FIGS. 31-37, the user also has the ability to use the interface to generate missing data, either from scratch or by using existing regions that do not have missing data.

Figure 23C:
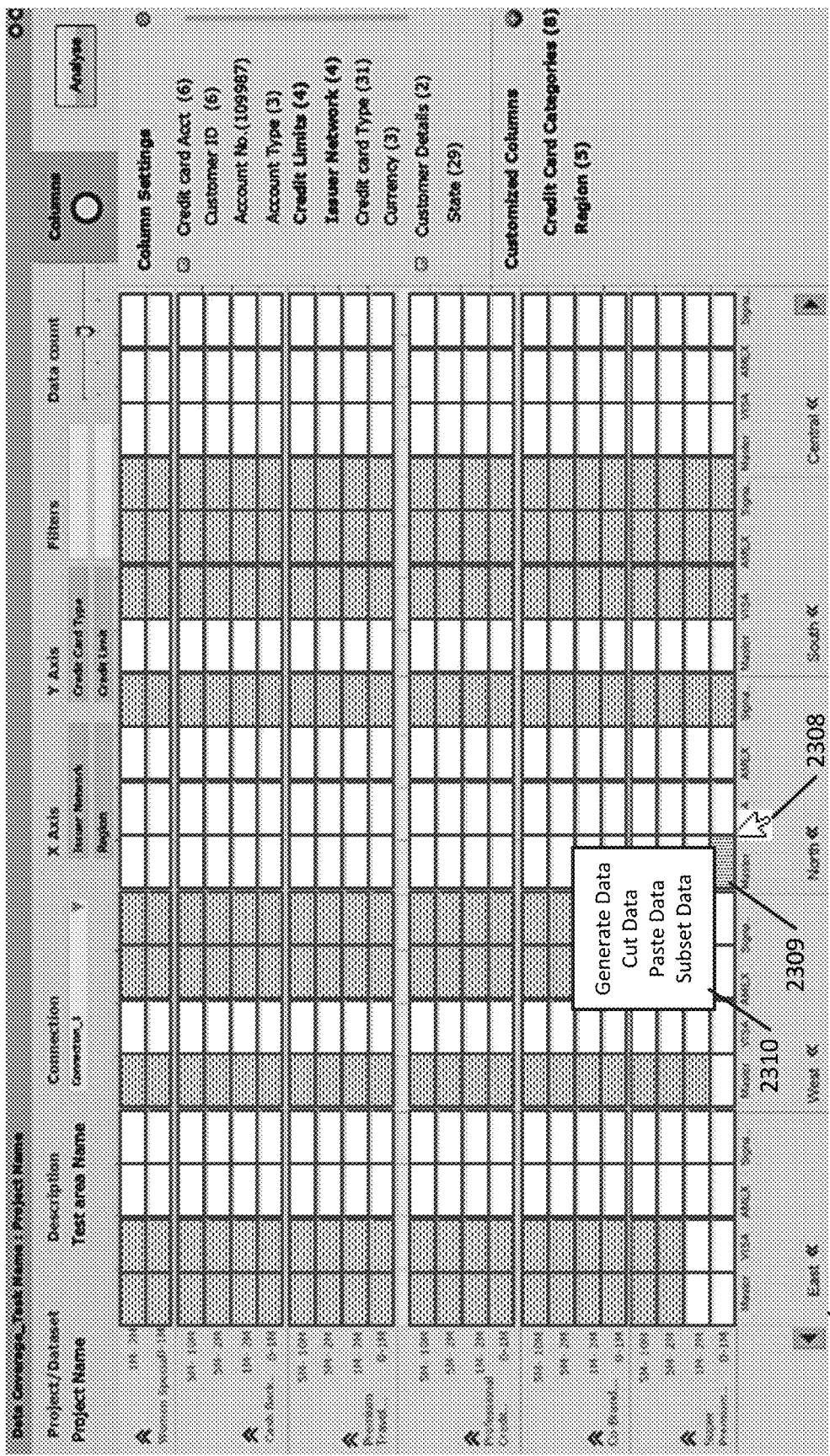
FIG. 23C illustrates options available upon selection of a region in the interactive grid interface according to an exemplary embodiment.

FIG. 23C illustrates an options menu 2310 that is available when a user selects a particular cell or region. In this case, the user has moved the pointer 2308 over region 2309 and selected the region 2309 (either by clicking or hovering) and the resulting menu 2310 is displayed which lists actions that can be performed on that cell. These actions include cutting data corresponding to that region, pasting data corresponding to that region, generating data for that region, and subsetting data in that region.

Figure 23D:
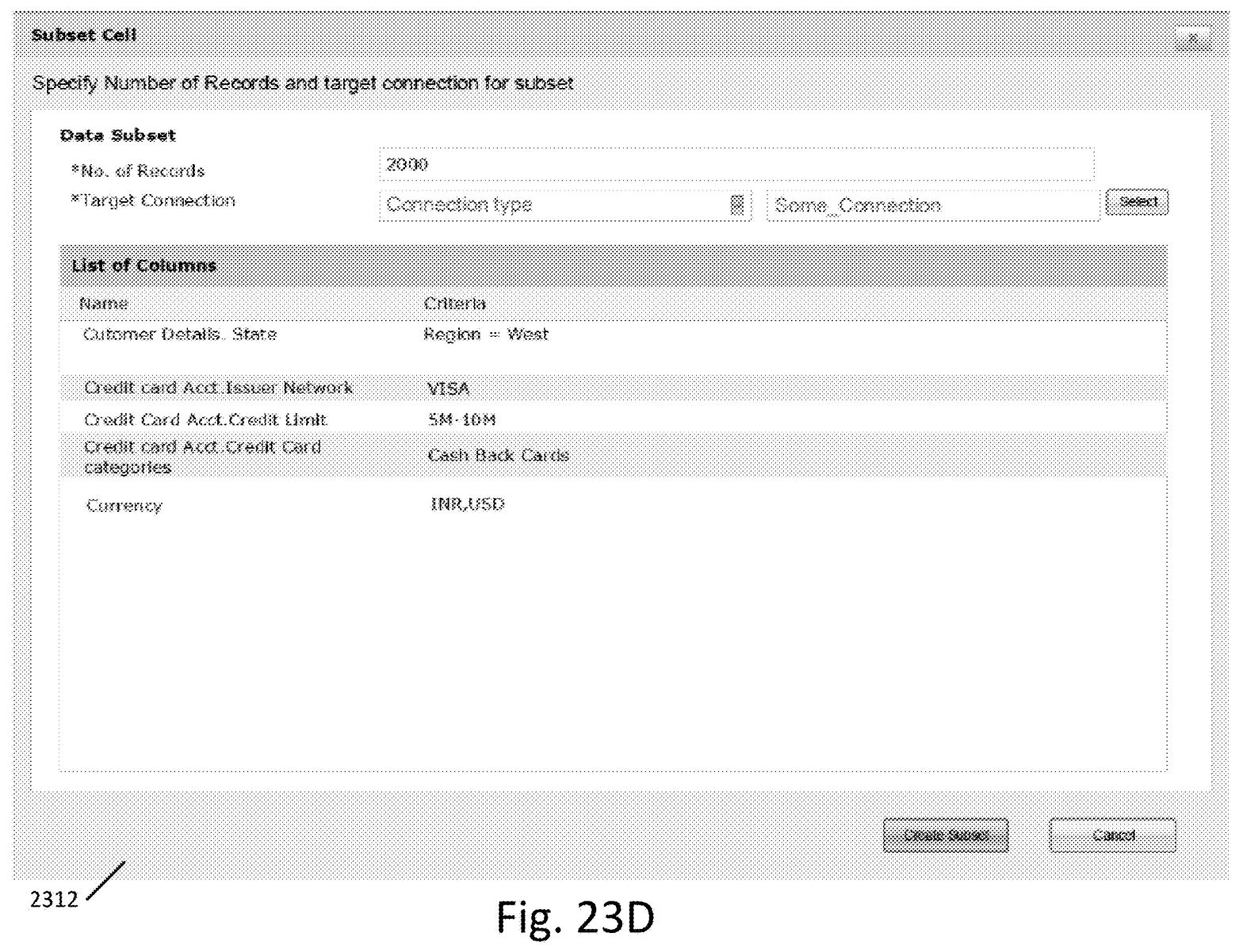

Cutting/pasting and generating data for the region are discussed in further detail with respect to the sections on data generation. With regard to subsetting, the user can create a subset of one or more cells by selecting a subset action on it. Once the user selects a subset option, then the user can select or edit subset criteria and can enter the number of records they would like as a subset. This will extract the appropriate subset from the underlying tables corresponding to the selected regions. FIG. 23D illustrates an interface 2312 used for selecting subset criteria according to an exemplary embodiment.

In addition to the shown functions, users can also mark cells as valid or invalid. For example, a user can mark a cell corresponding to the date Feb. 31, 2017 as invalid since no such date could exist.

Figure 24A:
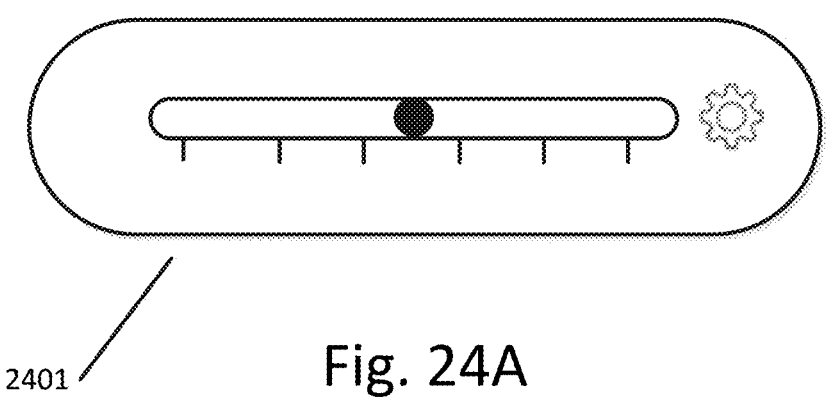
FIGS. 24A-24B illustrate threshold adjustment interfaces according to an exemplary embodiment.

FIG. 24A illustrates a threshold adjustment interface 2401 according to an exemplary embodiment that allows the user to set a threshold for missing data. The slider of the interface 2401 can be used to set the threshold beyond which a particular cell is indicated as having missing or insufficient data. For example, if the user sets the slider to the middle of the bar, as shown in FIG. 24A, then a cell can be marked as having missing data if the percentage of expected co-occurrence is less than −50% (e.g., −60%, −70%).

Figure 24B:
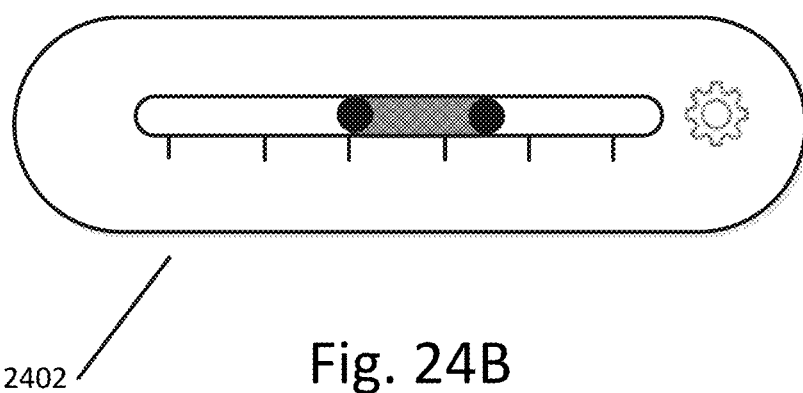

FIG. 24B illustrates another threshold adjustment interface 2402 according to an exemplary embodiment that allows the user to set a minimum threshold and a maximum threshold for missing data. This can be used to set the following threshold categories: (1) missing data, (2) sufficient data, and (3) more than sufficient data. For example, the missing data can correspond to any cell having a percentage of expected co-occurrence less than the minimum threshold (e.g., −30%), the sufficient data can correspond to any cell having a percentage of expected co-occurrence between the minimum threshold and a maximum threshold (e.g., 30%), and the more than sufficient data can correspond to any cell having a percentage of expected co-occurrence greater than the maximum threshold. In a visualization interface, the threshold category for each cell can be indicated using different colors, shadings, shapes, etc. For example, a cell can shaded red for missing data, grey for sufficient data, and green for more than sufficient data. Of course, a simpler threshold can be used with only two categories (sufficient data/insufficient data), as shown in FIG. 24A.

Figure 25:
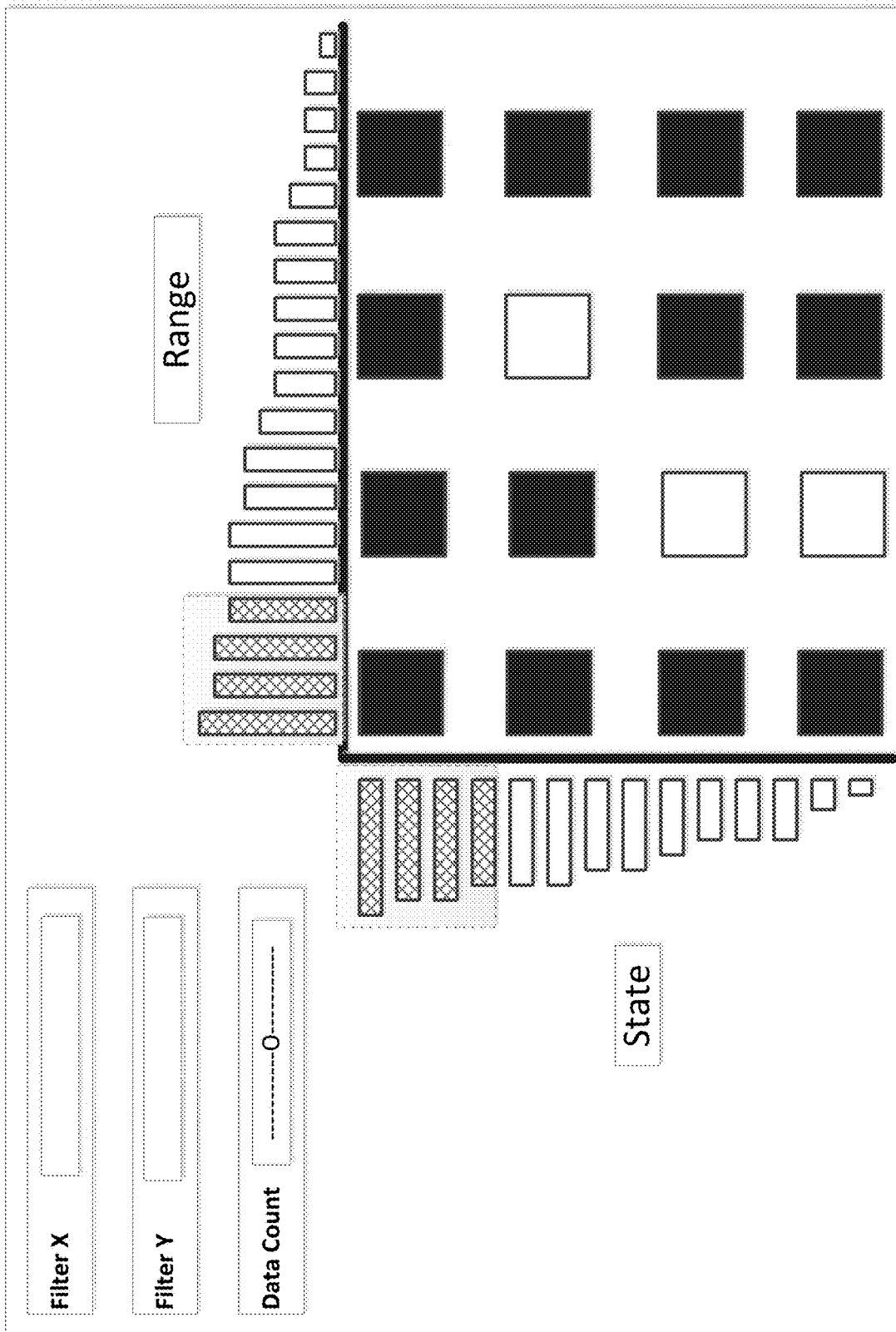
FIG. 25 illustrates a grid user interface for zooming according to an exemplary embodiment.

FIG. 25 illustrates a grid user interface 2500 for zooming according to an exemplary embodiment. The interface 2500 includes a capability for zooming. FIG. 25 shows the grid view for two variables: State (Y axis) and Range (X axis). The figure represents the state of the grid after the user has zoomed into a subset of 4 states along the Y axis and a subset of 4 ranges. Each bar in the bar charts along the two axes represent total number of records (or observed frequency) with the corresponding value.

Figure 26:
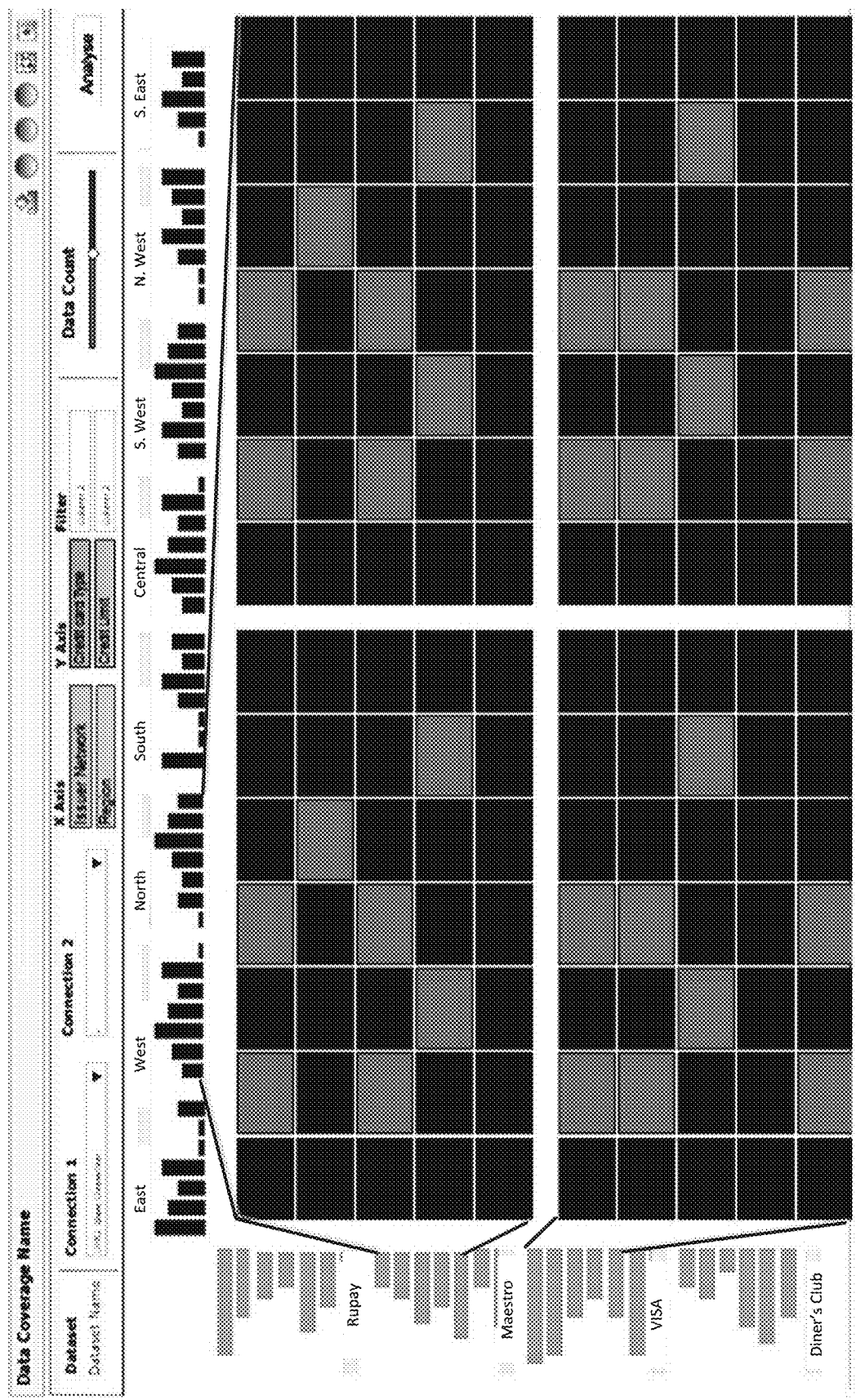
FIG. 26 illustrates a grid interface for four variables and zooming according to an exemplary embodiment.

FIG. 26 illustrates a grid interface 2600 for four variables and zooming according to an exemplary embodiment. FIG. 26 shows the grid view for four variables: Credit Card Type and Credit Limit (Y axis) and Issue Network and Region (X axis). The figure represents the state of the grid after the user has zoomed into a subset of Credit Card Types along the Y axis and a subset of Issue Networks. Each bar in the bar charts along the two axes represents total number of records (or observed frequency) with the corresponding value.

As discussed earlier, there are multiple different visualizations that can be used and multiple different ways of generating a visualization comprising one or more regions corresponding to the one or more locations of missing data.

In another example, generating a visualization comprising one or more regions corresponding to the one or more locations of missing data can include generating two or more parallel axes corresponding to two or more categorical columns, with each parallel axis being divided into a plurality of lines corresponding to a plurality of categorical data values in a corresponding categorical column and a length of each line corresponding to a quantity associated with each categorical data value and generating the one or more regions corresponding to the one or more locations of missing data as one or more parallelograms linking the two or more parallel axes, wherein each region links a first line in a first parallel axis with a second line in a second parallel axis and wherein an area of each region corresponds to a quantity of missing data associated with a unique group of categorical data values corresponding to that region.

Figure 27A:
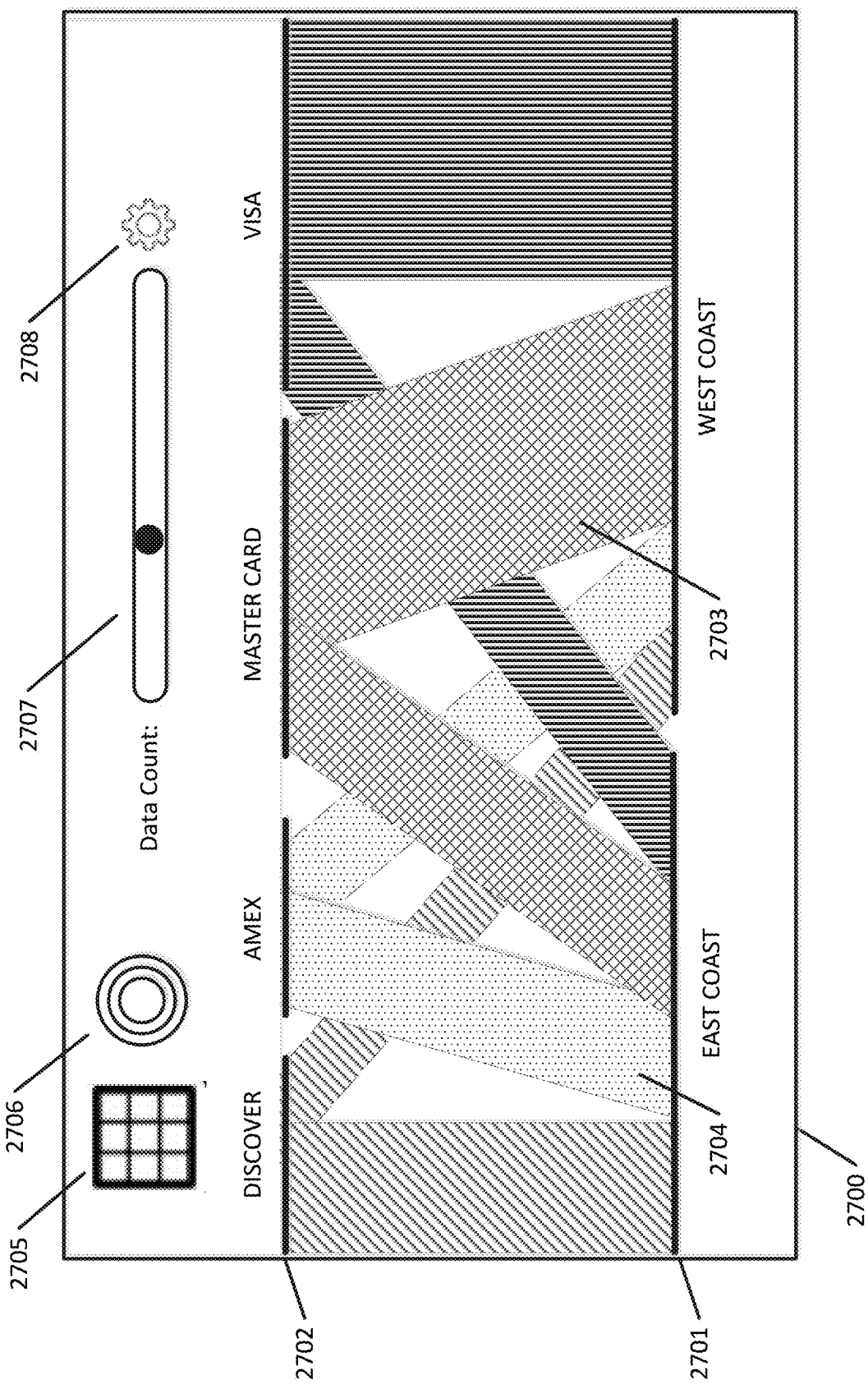
FIG. 27A illustrates an interface including the inverted parallel set visualization.

An example of this visualization, referred to as the inverted parallel set visualization, is shown in FIG. 27A. FIG. 27A illustrates an interface 2700 including the inverted parallel set visualization. As shown in the figure, there are two parallel axes, axis 2701 corresponds to a Coast categorical column and axis 2702 corresponds to a Card Issuer Network categorical column. Additionally, each axis includes a plurality of lines corresponding to the plurality categorical data values in the respective categorical column. For example, axis 2702 is divided into four lines corresponding to categorical data values {Discover, AMEX, Master Card, VISA}. The length of the lines corresponds to a quantity associated with the corresponding categorical data value. For example, the length of the line corresponding to VISA indicates there is more missing data associated with VISA than with AMEX.

Unlike the grid interface, the inverted parallel set visualization displays only those regions for which data is missing. As shown in FIG. 27A, regions corresponding to locations of missing data are shown as parallelograms linking the two or more parallel axes, wherein each region links a first line in a first parallel axis with a second line in a second parallel axis and wherein an area of each region corresponds to a quantity of missing data associated with a unique group of categorical data values corresponding to that region. For example, region 2703 is a parallelogram linking the Master Card line in axis 2702 with the West Coast line in axis 2701. The area of this region 2703 indicates the amount of missing data for the unique group of categorical data values {Master Card, West Coast}.

Additionally, each of the regions shown in FIG. 27A are divided into visual groups corresponding to the categories in the top axis, in this case, axis 2702. Therefore, all of the Discover related regions share a visual element (the diagonal line shading), all of the AMEX related regions share a visual element (the dot shading), all of the Master Card related regions share a visual element (the cross-hatching shading), and all of the VISA regions share a visual element (the vertical line shading). Of course, different visual elements (such as colors, transparency, etc.) can be used for regions in the same first axis group. All of the regions in common groups while share a visual element, even at deeper elements of the inverted parallel set visualization. For example, if an inverted parallel set visualization has a third parallel axis, then all regions between the second and the third axis would also use the same visual conventions assigned to the regions between the first and the second axis. In this case, any missing data between the categories of the second axis and categories of the third axis would also be visually marked to indicate whether it also corresponds to Discover, Amex, Master Card, or VISA.

FIG. 27A illustrates some additional features. Icon 2705 allows a user to switch to a grid visualization. Icon 2706 allows a user to switch to a radar visualization, discussed further below. Icon 2707 indicates the one or more threshold (s) associated with visualization of missing data and icon 2708 allows for adjustment of the threshold and settings.

Figure 27B:
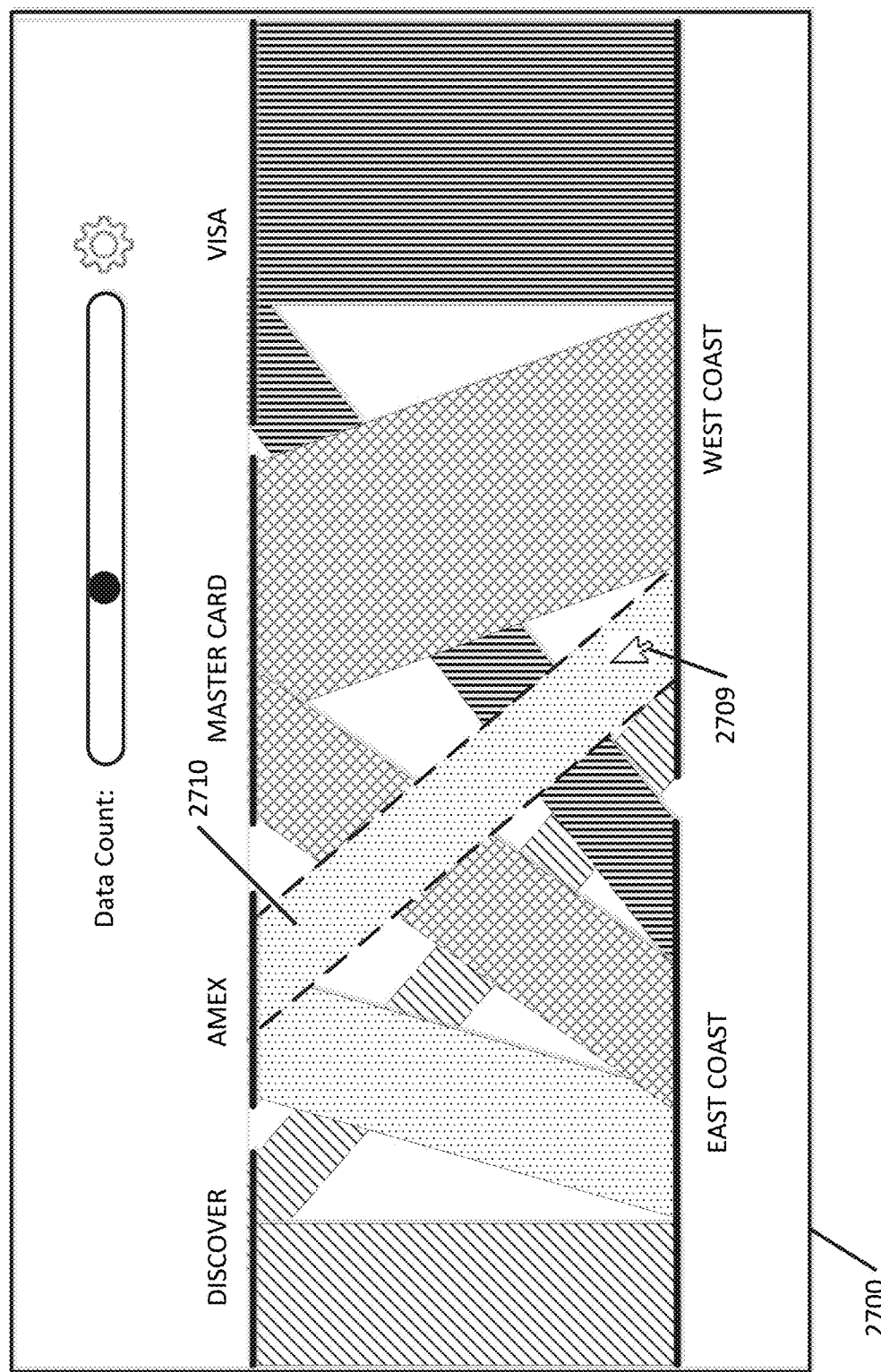
FIG. 27B illustrates the selection of a region by a user who has moved the mouse pointer 2709 over the region and selected it.

FIG. 27B illustrates the selection of a region 2710 by a user who has moved the mouse pointer 2709 over the region and selected it. The selected region is shown in dashed lines.

Figure 27C:
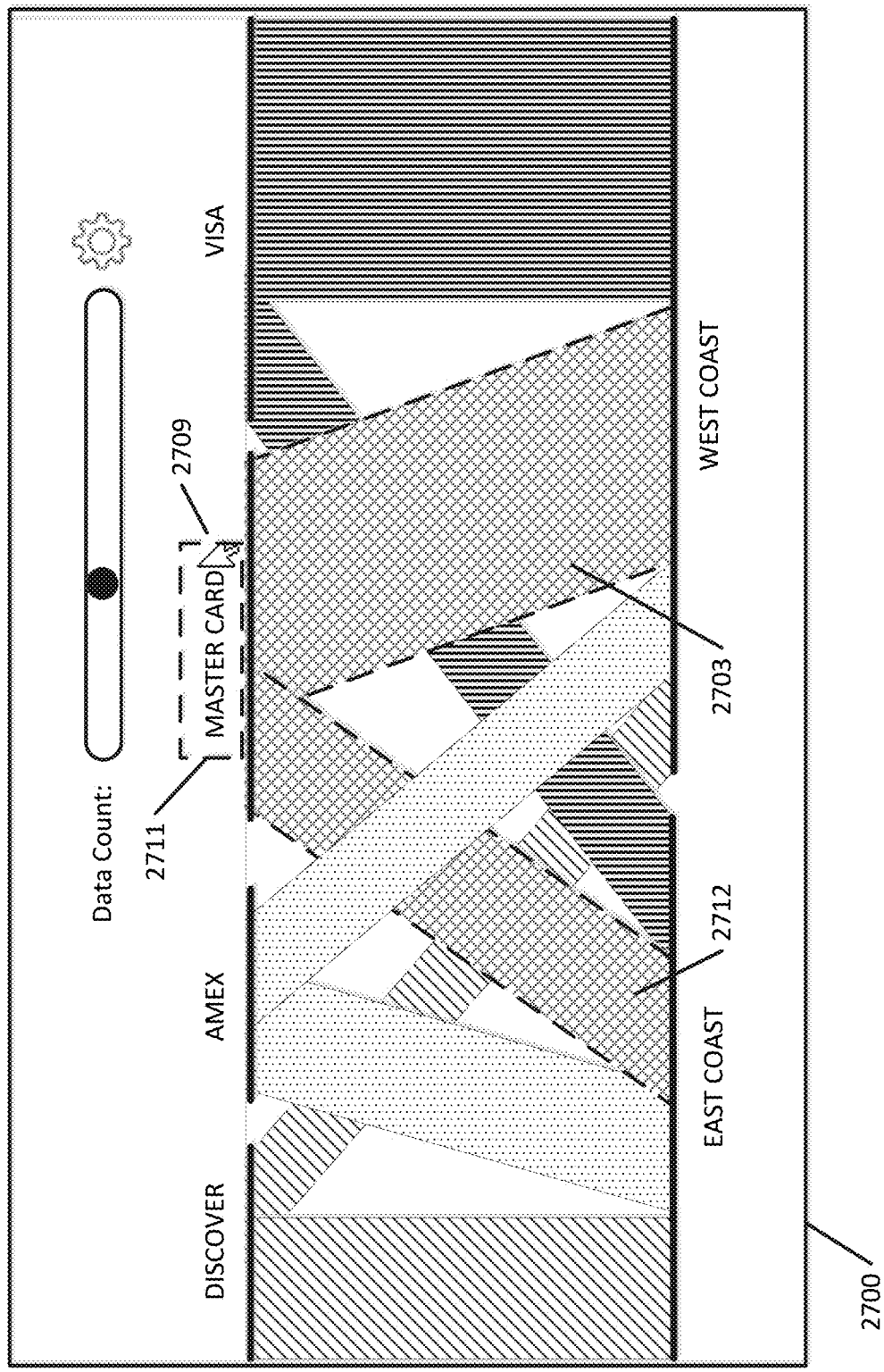
FIG. 27C illustrates the selection of multiple regions through the selection of a categorical data value corresponding to Master Card.

FIG. 27C illustrates the selection of multiple regions, 2703 and 2712, through the selection of a categorical data value, 2711, corresponding to Master Card. User has moved mouse pointer 2709 over the categorical data value 2711 and selected it, resulting in selection of regions 2703 and 2712, which correspond to Master Card. The selected regions are shown in dashed lines.

Figure 28A:
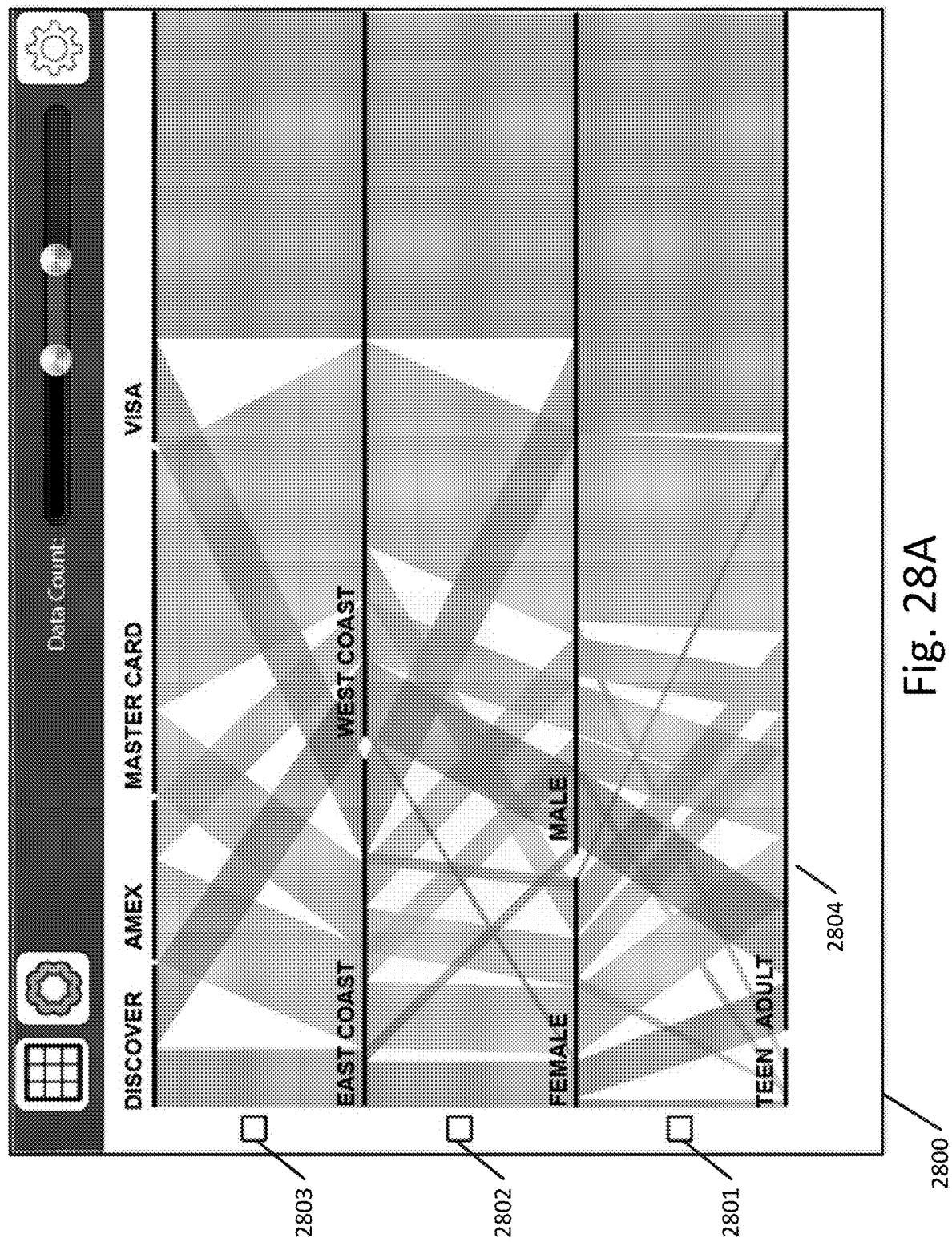
FIG. 28A illustrates an interface showing another example of the inverted parallel set visualization with more than two axes according to an exemplary embodiment.

FIG. 28A illustrates an interface 2800 showing another example of the inverted parallel set visualization 2804 with more than two axes according to an exemplary embodiment. As shown in FIG. 28A, two thresholds are used to set a range of expected co-occurrence percentages as corresponding to missing data. Also shown are check boxes 2801, 2802, and 2803, which allow users to select pairs of axis, such as for comparison or for grid view.

Figure 28B:
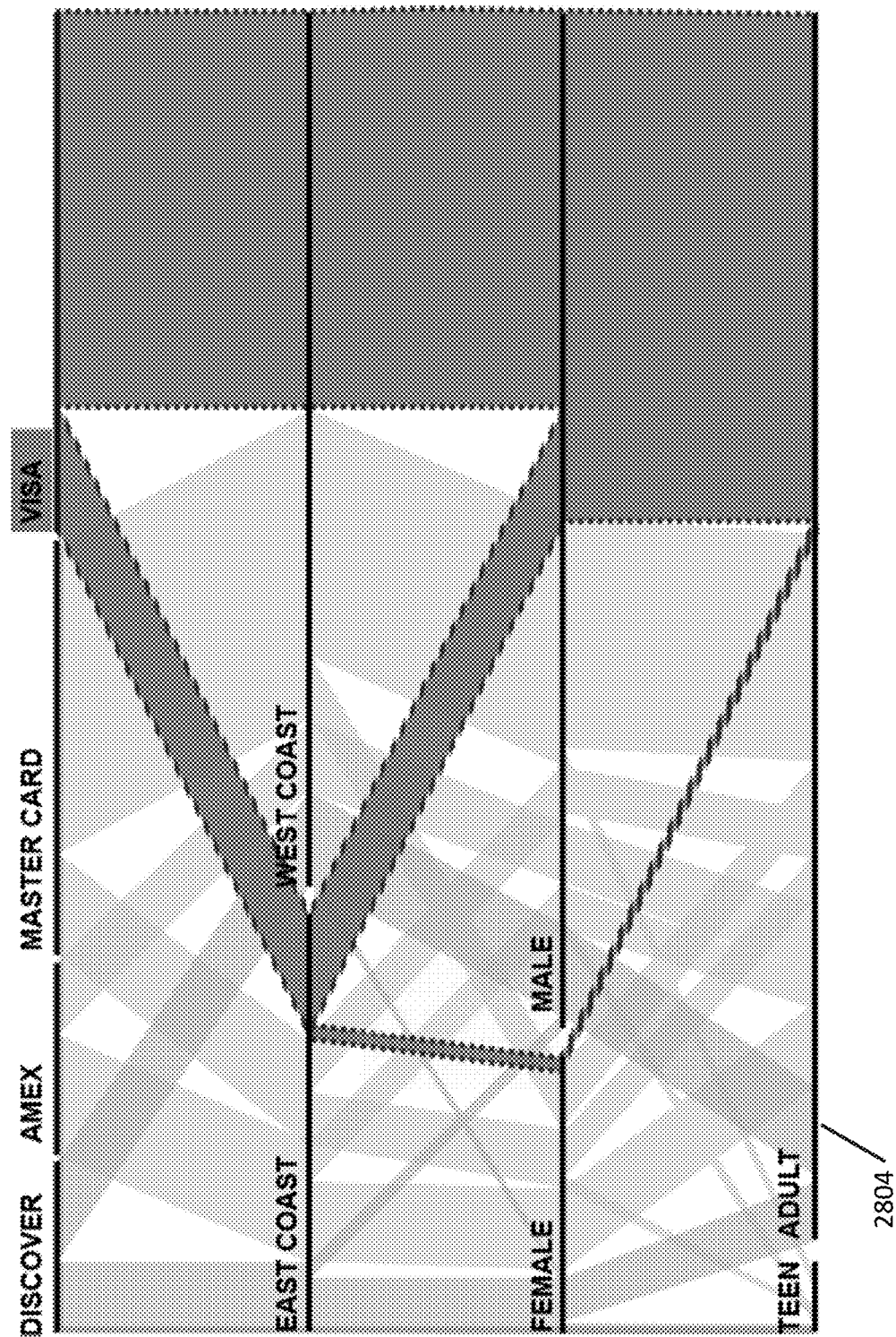
FIG. 28B illustrates the selection of the VISA categorical data value in the inverted parallel set visualization, resulting in the selection of all regions corresponding to VISA, including downstream regions between other categorical columns.

FIG. 28B illustrates the selection of the VISA categorical data value in the inverted parallel set visualization 2804, resulting in the selection of all regions corresponding to VISA, including downstream regions between other categorical columns.

The inverted parallel set visualization is populated with k categorical variables as follows:

The N variables are displayed along a stack of N parallel axis, one variable for each axis, from the top to the bottom axis of the stack (see FIG. 2.1).

In each axis, the k categories of the corresponding variable are represented by k visually differentiated rectangles/parallelograms (e.g., differentiated by color or pattern of the area). The rectangles/parallelograms have fixed width and variable length, along the axis. The length represents the amount of missing data of the corresponding category in relation to the expected amount of data. The categories that have more than expected data are not represented on the axis.

Between two adjacent axis, a rectangle/parallelogram on the axis above is connected with one or more rectangles/parallelograms on the axis below (adjacent) via bands or parallelograms (e.g., also differentiated by color or pattern of the area, similarly to the rectangle where they originate, above). Each parallelogram has fixed height (which corresponds to the fixed distance between adjacent axes) and variable base length. The length of the base represents the amount of missing data of pairs of values in the two corresponding categories (i.e., the categories of the two rectangle connected between the two axes).

The user interactively adjusts the expected value using the slider. The slider in the user interface allows the user to define the threshold for what defines sufficient data in each combination of categories. The threshold varies between 0, or frequencies that lack 100% of the expected value (missing values only) and frequencies that lack 1% of the expected value (insufficient and missing values).

Another visualization that can be generated to illustrate missing data is the radar chart. In this case, generating a visualization comprising one or more regions corresponding to the one or more locations of missing data can include generating a radar chart comprising a plurality of spokes, each spoke in the plurality of spokes corresponding to a categorical column in the plurality of categorical columns, each spoke being divided into a plurality of segments corresponding to a plurality of categorical data values in that categorical column, and a size of each segment corresponding to a quantity associated with each categorical data value and generating the one or more regions corresponding to the one or more locations of missing data as one or more areas linking two or more spokes, each region linking a first segment in a first spoke with a second segment in a second spoke and an area of each region corresponding to a quantity of missing data associated with a unique group of categorical data values corresponding to that region.

Figure 29A:
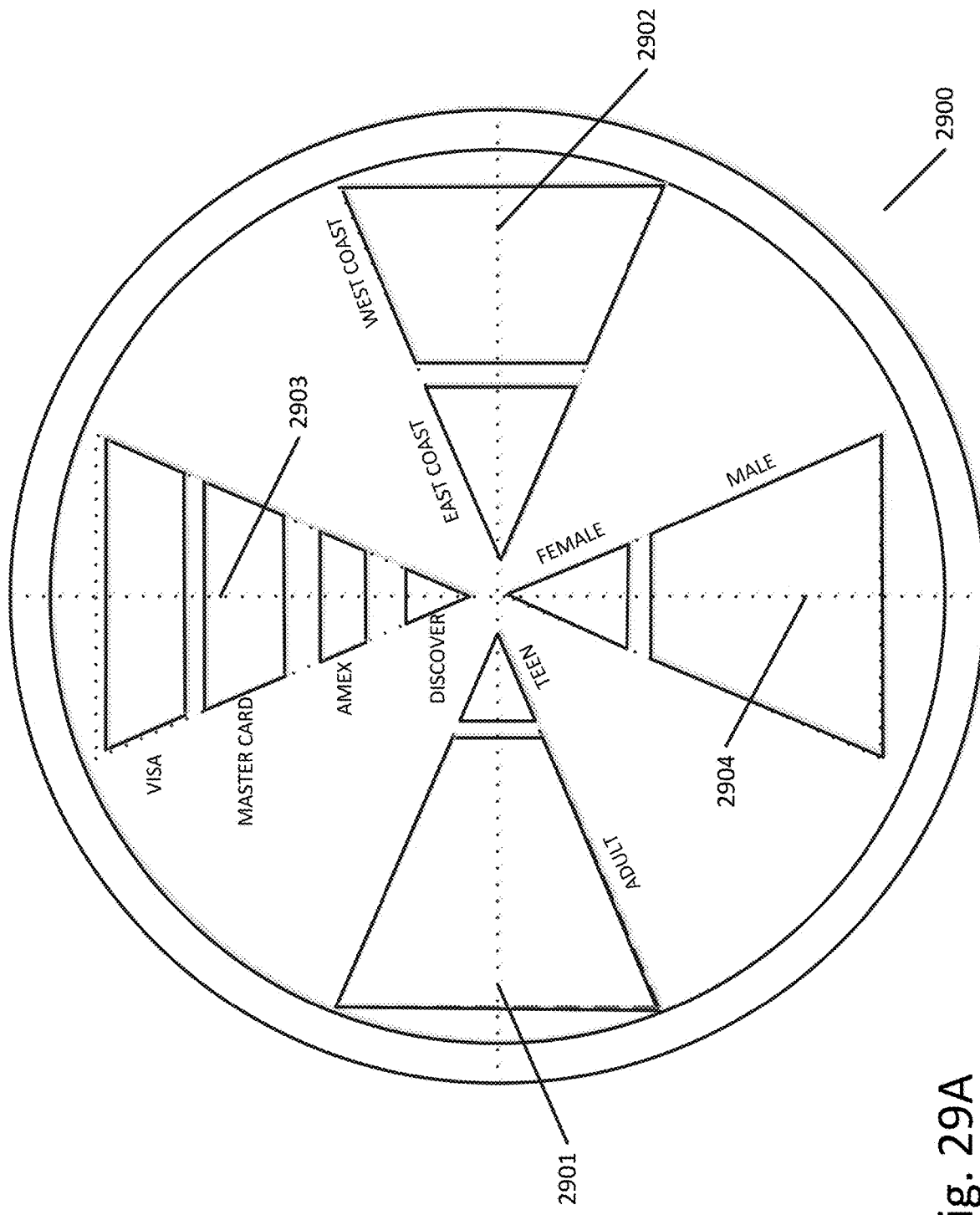
FIG. 29A illustrates an example of the radar chart without the one or more regions being shown (for clarity).

FIG. 29A illustrates an example of the radar chart 2900 without the one or more regions being shown (for clarity). As shown in FIG. 29A, the radar chart includes four spokes, 2901, 2902, 2903, and 2904, indicated by dashed lines. The dashed lines are just for illustration and reference purposes and would not be part of the actual visualization. Each of the spokes corresponds to a different categorical column. For example, spoke 2903 corresponds to a Card Issuer Network categorical column.

Figure 29B:
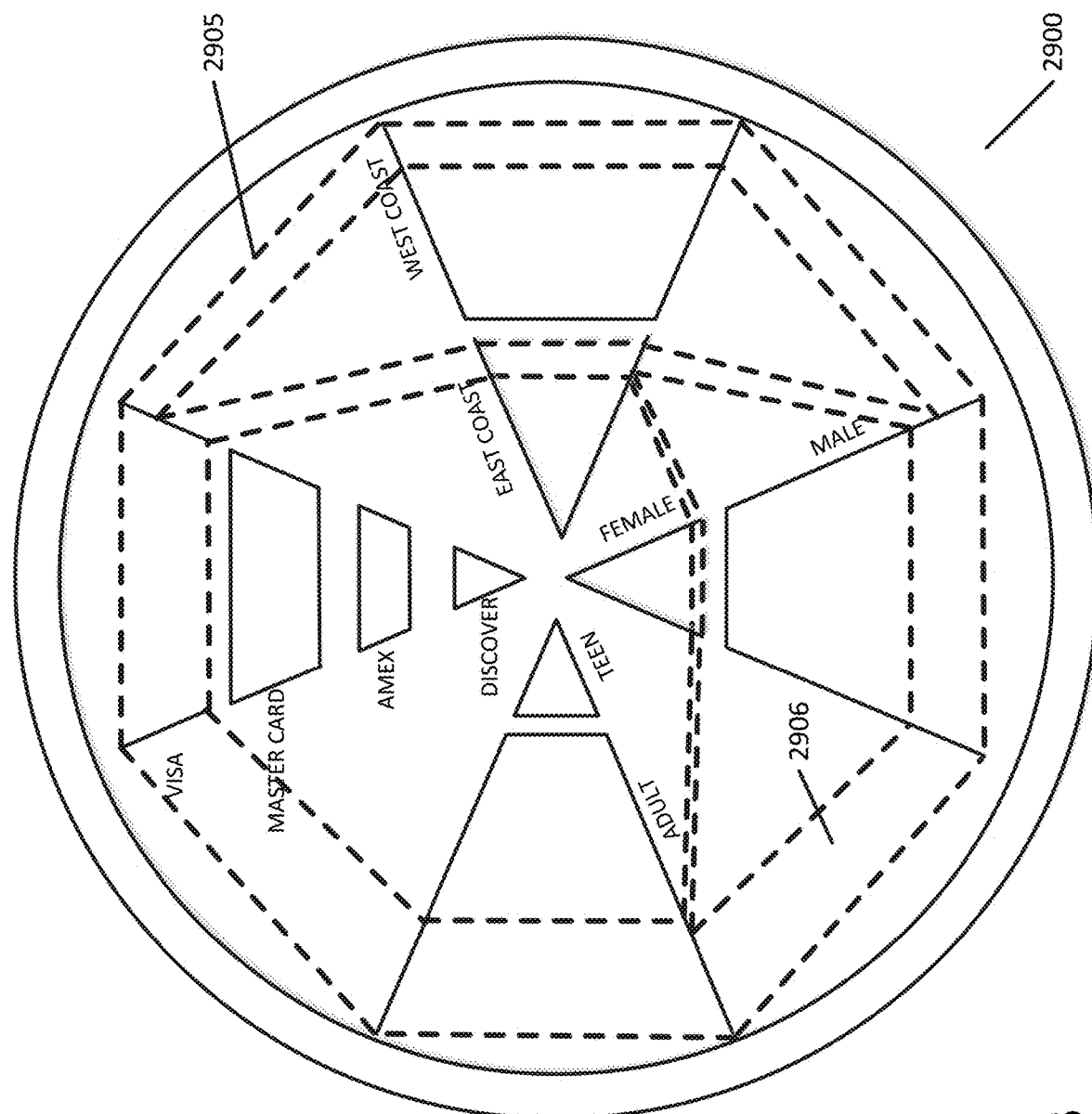
FIG. 29B illustrates an example of the radar chart with only the regions corresponding to the VISA categorical data value being shown using dashed lines.

FIG. 29B illustrates an example of the radar chart 2900 with only the regions corresponding to the VISA categorical data value being shown using dashed lines. The remaining regions are not shown for clarity purposes. For example, region 2905 links the VISA segment of the Card Issuer Network spoke with the West Coast segment of the Coastal Region spoke. The size of region 2905 indicates the quantity of missing data corresponding to this unique pair of categorical values {VISA, West Coast}. Additionally, as shown in FIG. 29B, the data corresponding to VISA can be tracked to other spokes and other regions between other spokes. This means, for example, that the size of region 2906 indicates the quantity of missing data corresponding to the unique pair of categorical values {Adult, Male} as well as the categorical value {VISA}.

Figure 30A:
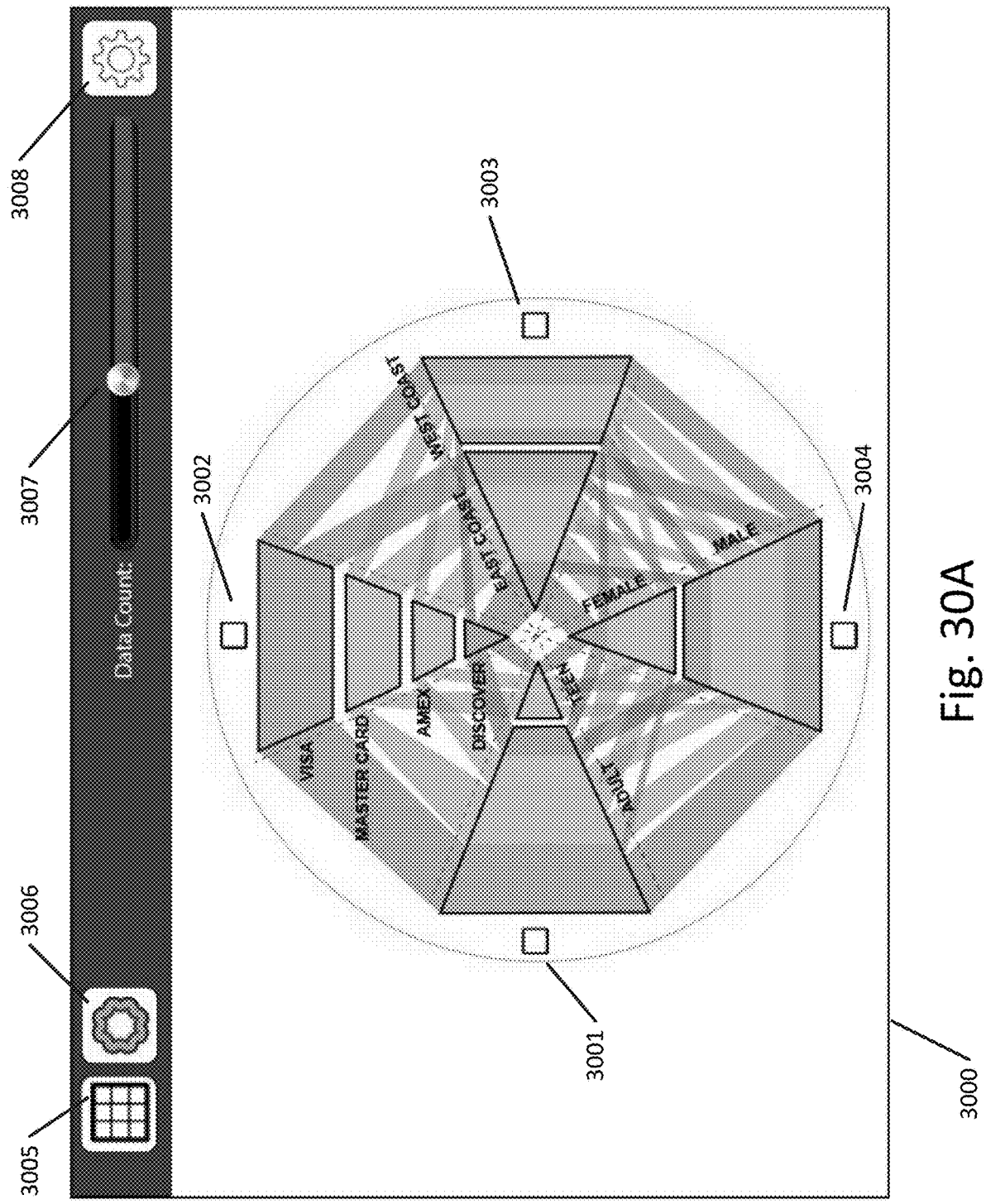
FIG. 30A illustrates another example of the radar chart, including icon to switch to a grid view, icon to switch to an inverted parallel set visualization, slider to adjust threshold, and settings icon for settings.

FIG. 30A illustrates another example of the radar chart 3000, including icon 3005 to switch to a grid view, icon 3006 to switch to an inverted parallel set visualization, slider 3007 to adjust threshold, and settings icon 3008 for settings. FIG. 30A also illustrates selection boxes 3001, 3002, 3003, and 3004 corresponding to four spokes. A user can select these boxes to filter the visualization and to switch to another visualization, such as the grid, with the filtered set.

Figure 30B:
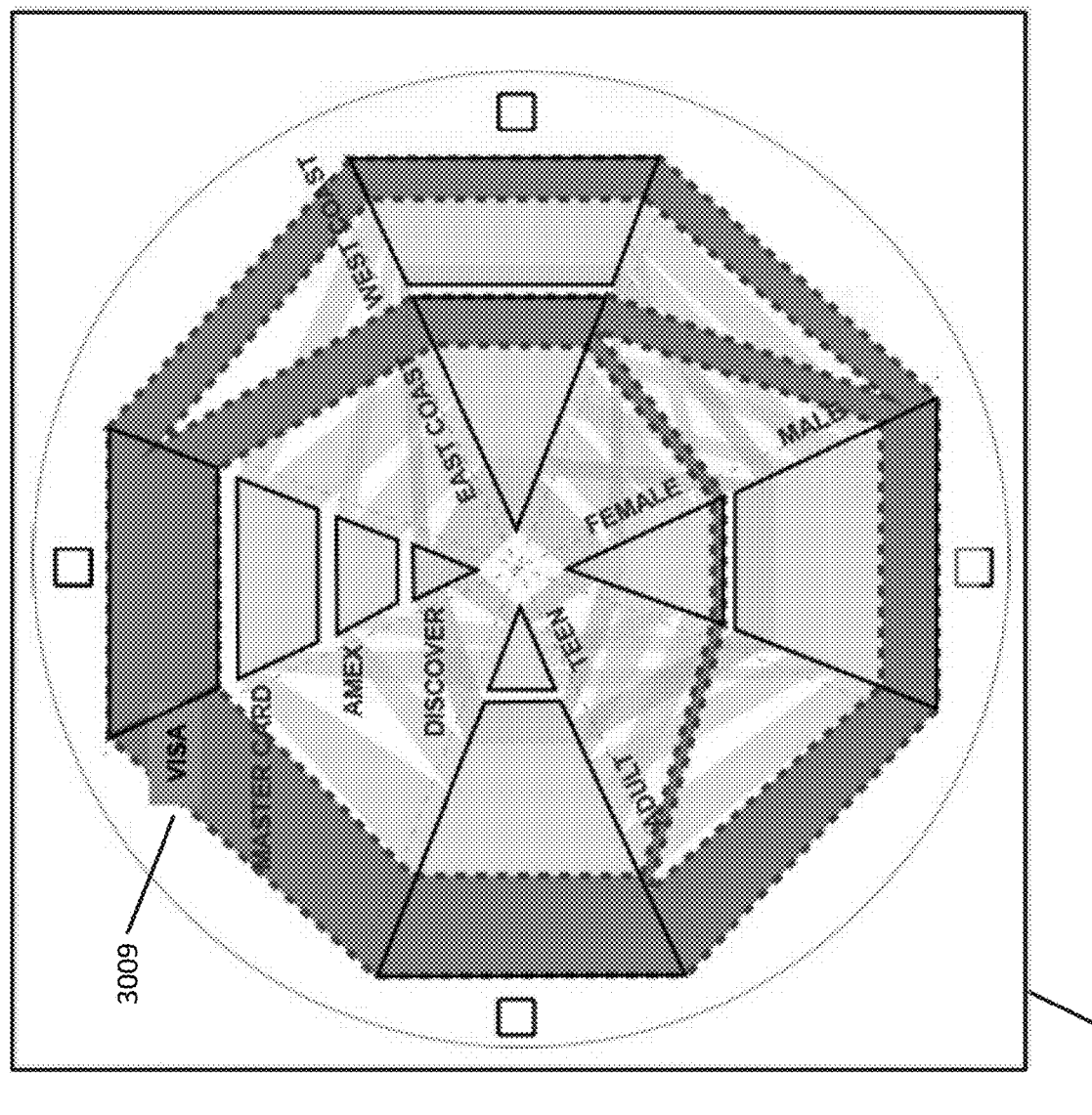
FIG. 30B illustrates the radar chart with the user selecting the VISA categorical data value. This results in all VISA related data being selected, as indicated by the dashed lines.

FIG. 30B illustrates the radar chart 3000 with the user selecting the VISA 3009 categorical data value. This results in all VISA related data being selected, as indicated by the dashed lines.

Figure 30C:
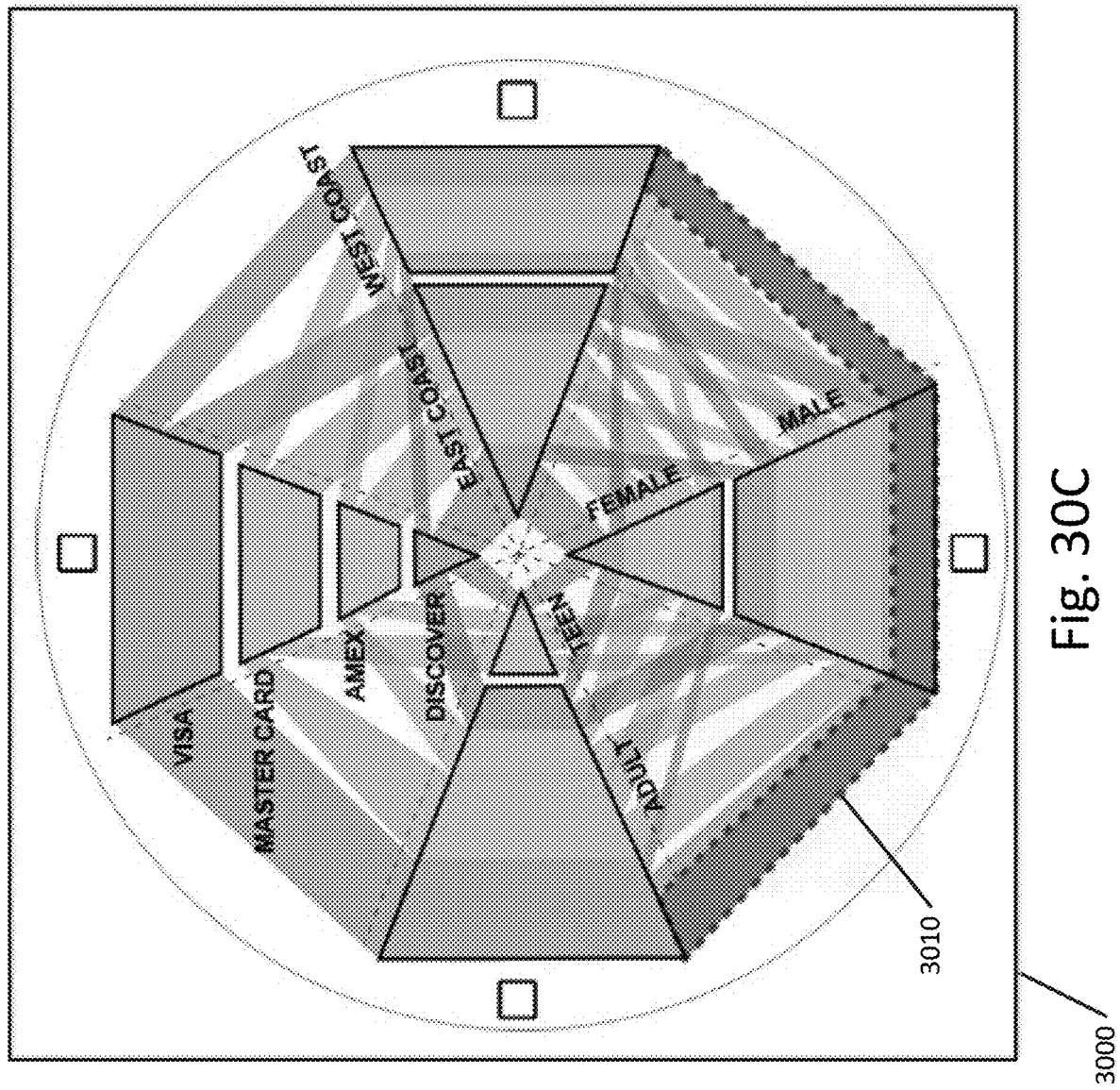
FIG. 30C illustrates the radar chart with the user selecting two categorical columns as start and end points, resulting in the selection of section, indicated by dashed lines.

FIG. 30C illustrates the radar chart 3000 with the user selecting two categorical columns as start and end points, resulting in the selection of section 3010, indicated by dashed lines.

Figure 30D:
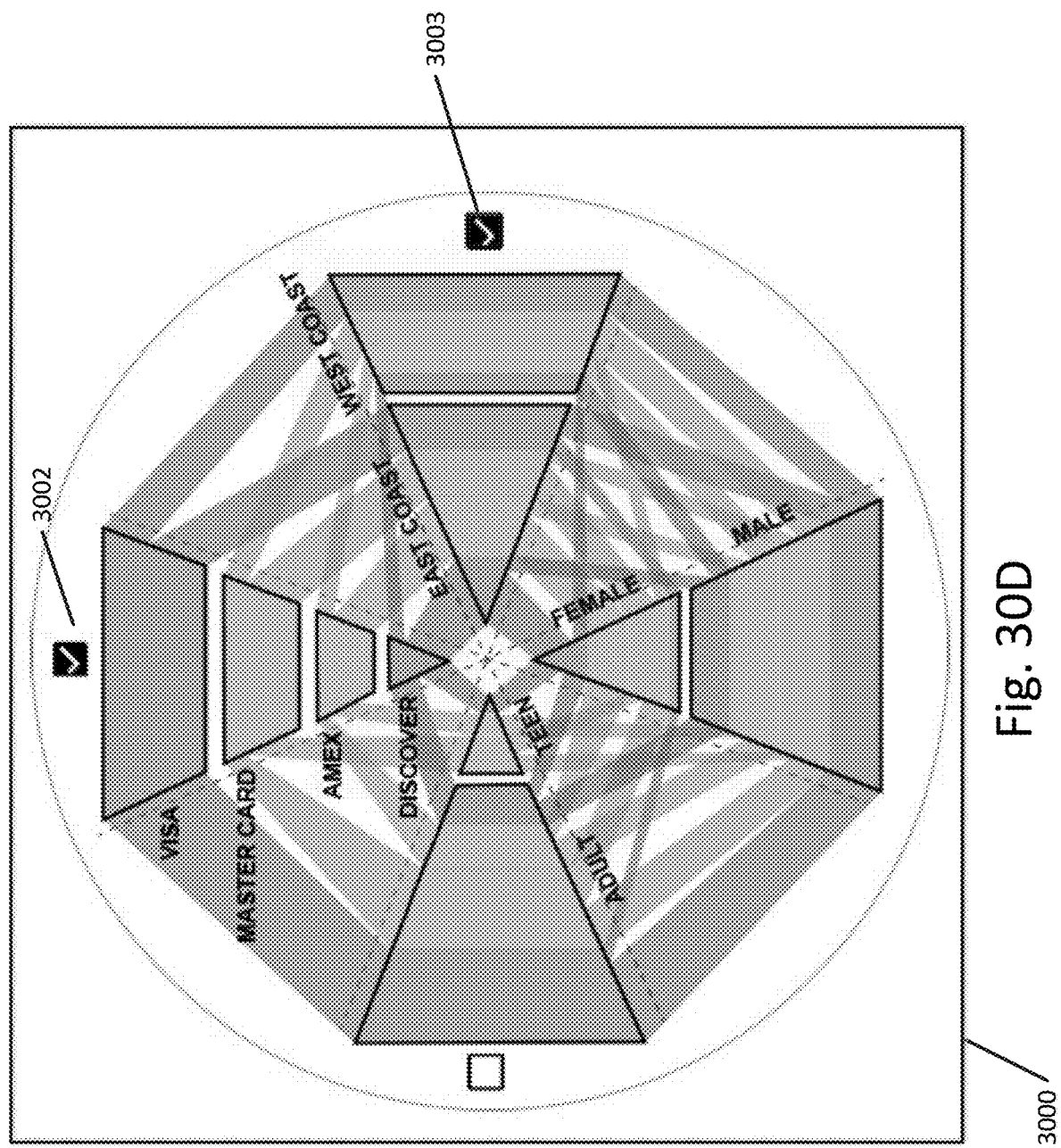
FIG. 30D illustrates the radar chart with the user selecting two boxes and corresponding to two spokes.

FIG. 30D illustrates the radar chart 3000 with the user selecting two boxes 3002 and 3003 corresponding to two spokes. The user can subsequently select the grid to display a grid visualization involving the two categorical columns corresponding to boxes 3002 and 3003.

The radar chart is an alternative visualization to the inverted parallel set described in the previous section. The traditional radar chart is a graphical method to display multivariate data, where the variables are represented by radial axes that starting from the same point, at the center. In the traditional chart, the axes represent frequencies or counts of values for each variable.

Similarly to the inverted parallel set method and system, the inverted radar chart visualization can:

Show a large number of variables at once.

Highlight the combinations of values across the variables that are missing most data and then give the user features to generate these missing data.

Be the starting point for the user to first select a subset of variables of interest and then to transition into the grid visualization showing these variables only.

Differently from the inverted parallel set, the inverted radar chart:

Progressively magnifies, within each sector or variable, the size of the segments as we move from the center of the chart to the periphery. This is a bias introduced by design: the most external intervals visually highlight what categories in that variable have the largest proportion of missing values (i.e., is missing in the largest number of value combinations).

Assures that each variable has always two adjacent variables (this is not the case for the top and bottom variables or axes in the inverted parallel set)

The driving variable is in the 12 o'clock position (whereas in the inverted parallel set is the one at the top)

The user interaction supported is the rotation one or more variables around the center (whereas in the inverted parallel set the interaction involves moving one or more variables vertically up or down) to reorder the variables.

A first version of the radar chart visualization, with N variables, would represent all the possible tuples of values as color-coded bands that connect all the N axes in a closed shape. In this case, similarly to the inverted parallel set, each axis is segmented into intervals, with the largest intervals next to the center and the smallest next to the periphery. In this case the interactions supported resemble closely those supported in the inverted parallel set visualization. The principle to order the axis assumes that the 12 o'clock. The axes are sorted in clockwise order so that the first axis (the 12 o'clock axis) has the largest number of missing values or the minimum number of values (on that axis) for one or more combinations (9-value tuples).

The second version of the radar chart visualization, with N variables, would represent all the possible tuples of values as closed color-coded lines that connect all the N axes in a closed shape. In this version the axis can either have its maximum at the periphery, or vice versa.

The above-described methods enable a user to identify locations of missing data in large data sets. Applicants have also discovered a method for generation of missing data that preserves the consistency of the data set and can generate new data either from scratch or by re-allocating records from locations that have excess data above a minimum threshold.

Figure 31:
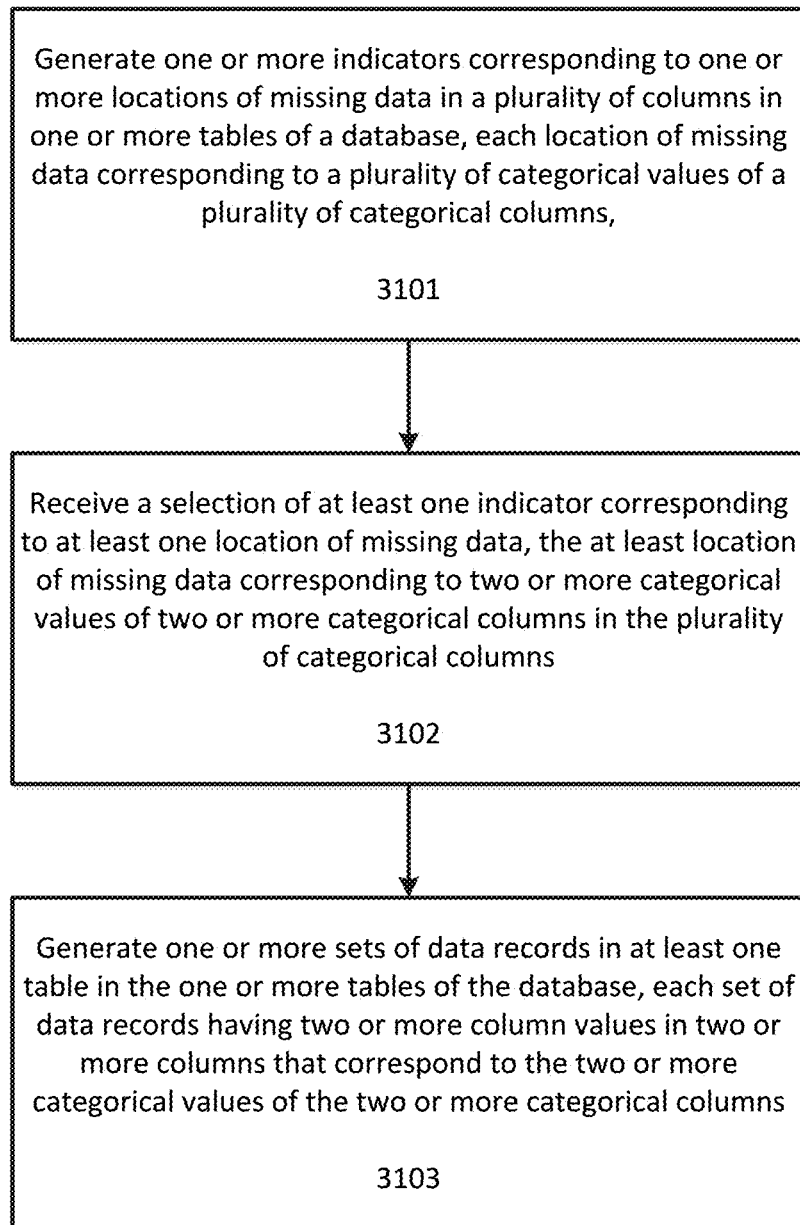
FIG. 31 illustrates a method for generation of missing data according to an exemplary embodiment.

FIG. 31 illustrates a method for generation of missing data according to an exemplary embodiment. At step 301 one or more indicators corresponding to one or more locations of missing data in a plurality of columns in one or more tables of a database are transmitted.

As discussed previously with regard to the interfaces shown in FIGS. 23A-30D, each location of missing data corresponds to a plurality of categorical values of a plurality of categorical columns. The plurality of categorical values in the plurality of categorical columns are generated by transforming a plurality of data values in the plurality of columns into the plurality of categorical values, as described with respect to FIGS. 8A-13B. Additionally, as explained with respect to FIGS. 14-22, each location of missing data is identified based at least in part on an expected count of data values at the corresponding location.

The step of transmitting one or more indicators corresponding to one or more locations of missing data in a plurality of columns in one or more tables of a database can include transmitting a visualization comprising one or more regions corresponding to the one or more locations of missing data. The visualization can take the form described in any of the above-mentioned interfaces disclosed with regard to identification of missing data.

The visualization can include a grid comprising a plurality of regions, with each region in the plurality of regions corresponding to a unique group of categorical data values in the two or more categorical columns and a visual attribute of the one or more regions that correspond to the one or more locations of missing data being modified to be distinct from other regions in the plurality of regions. Examples of this grid visualization are shown in FIGS. 22-23C and 25-26.

The visualization can include two or more parallel axes corresponding to the two or more categorical columns and one or more parallelograms corresponding to the one or more locations of missing data, with each parallel axis being divided into a plurality of lines corresponding to a plurality of categorical data values in a corresponding categorical column, a length of each line corresponding to a quantity associated with each categorical data value, each parallelogram linking a first line in a first parallel axis with a second line in a second parallel axis, and an area of each parallelogram corresponding to a quantity of missing data associated with a unique group of categorical data values corresponding to that parallelogram. Examples of this inverted parallel set visualization are shown in FIGS. 27A-28B.

The visualization can include a radar chart comprising two or more spokes corresponding to the two or more categorical columns and the one or more regions corresponding to the one or more locations of missing data, each spoke being divided into a plurality of segments corresponding to a plurality of categorical data values in a corresponding categorical column, a size of each segment corresponding to a quantity associated with each categorical data value, each region linking a first segment in a first spoke with a second segment in a second spoke, and an area of each region corresponding to a quantity of missing data associated with a unique group of categorical data values corresponding to that region. Examples of this radar chart visualization are shown in FIGS. 29A-30D.

The locations of missing data can be identified using any of the methods described herein. For example, the method described with respect to FIG. 1 can be used to identify the one or more locations of missing data.

Returning to FIG. 31, at step 3102 a selection of at least one indicator corresponding to at least one location of missing data is received, the at least location of missing data corresponding to two or more categorical values of two or more categorical columns in the plurality of categorical columns. When the above-mentioned visualizations are used to display the indicators, this step can include receiving a selection of at least one region in the one or more regions.

Figure 32:
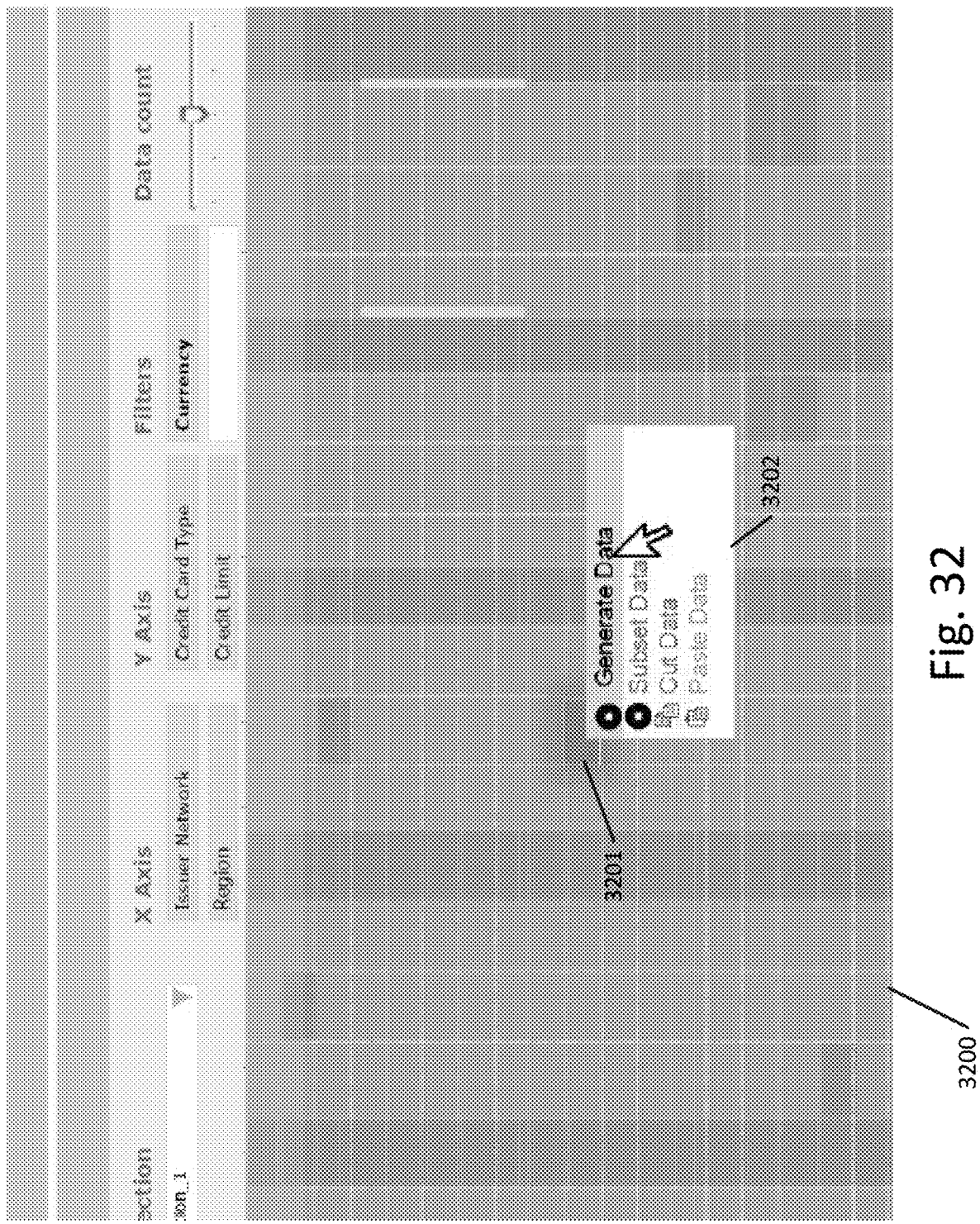
FIG. 32 illustrates a grid visualization interface in which each region is a cell and the user has selected cell corresponding to a location of missing data according to an exemplary embodiment.

FIG. 32 illustrates a grid visualization interface 3200 in which each region is a cell and the user has selected cell 3201 corresponding to a location of missing data. As shown in the figure, this selection can prompt a menu 3202 that allows the user to select an option to generate the missing data for that location.

A user can also specify one or more specific locations from which to generate the missing data. For example, certain locations corresponding to two or more categorical values of two or more categorical columns in the plurality of categorical columns may have excess data above a minimum threshold deemed sufficient (which, as discussed previously, can be based on an expected count of co-occurrence at each location). In this case, a user can select which locations they would like to use to fill in the missing data at the location that is missing data.

Figure 33A:
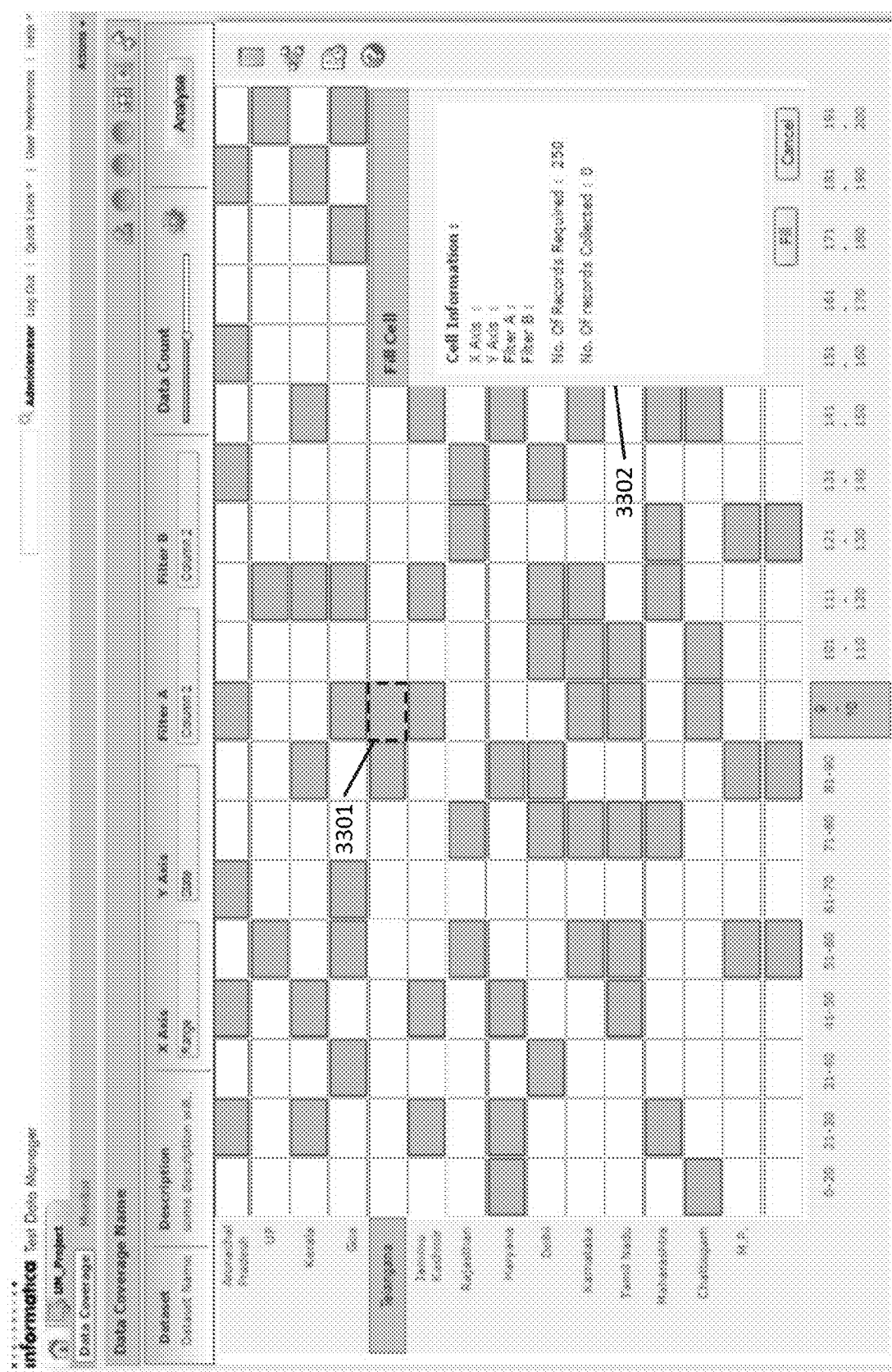
FIGS. 33A-33C illustrate an example of selecting locations of sufficient or excess data from which to generate missing data according to an exemplary embodiment.
Figure 33B:
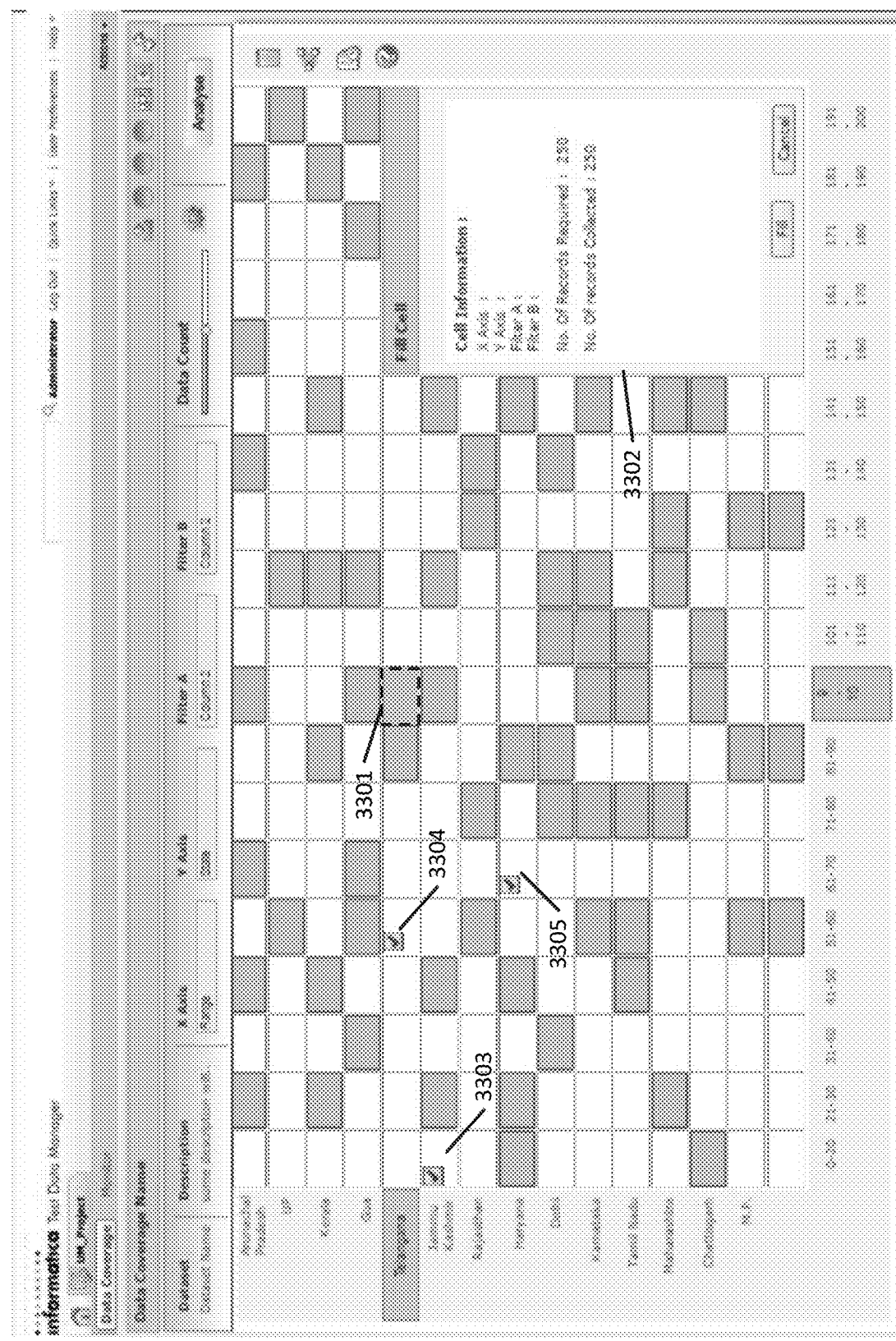
Figure 33C:
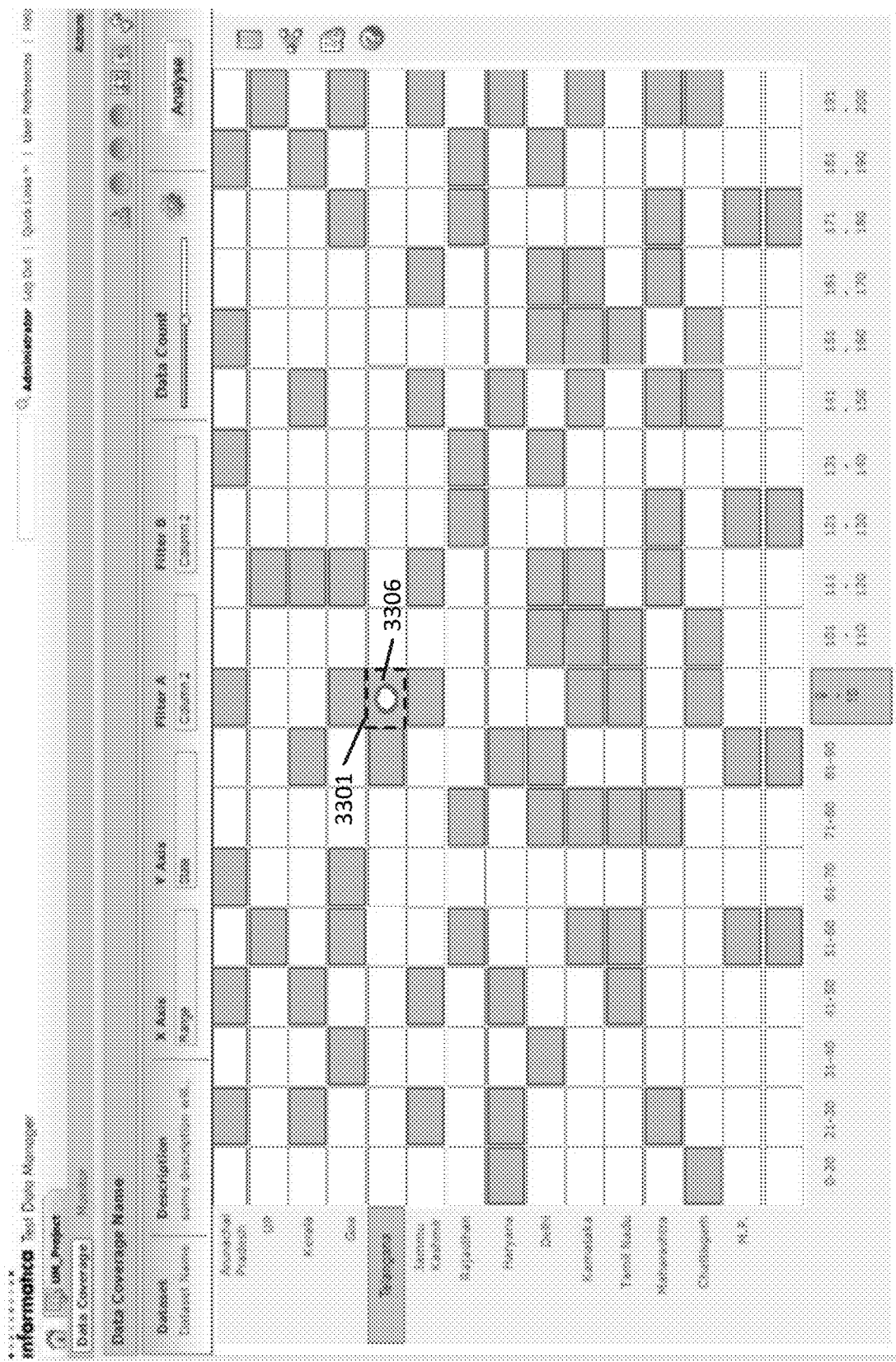

FIGS. 33A-33C illustrate an example of selecting locations of sufficient or excess data from which to generate missing data according to an exemplary embodiment. As shown in the interface 3300, the user has selected cell 3301 corresponding to a location of missing data. This selection results in the display of a fill cell window 3302 which indicates the number of records required for that cell to have sufficient data, as well as the number of records collected from other cells. As shown in FIG. 33B, the user can then select cells that have sufficient, excess, or even insufficient (missing) data from which to fill in the missing data. These selections are referred to as filler locations or filler regions. In this case, the user has selected cells 3303, 3304, and 3305. Excess records from these cells are then used to fill in the missing data for cell 3301. As shown in window 3302, 250 records have been collected from these cells. FIG. 33C illustrates the interface during the fill process. As shown in FIG. 33C, a fill indicator 3306 can be used to indicate that the fill process is taking place for the cell with missing data. The fill indicator 3306 is shown as a white circle, but any visual graphical or textual element can be used.

Returning to FIG. 31, at step 3013 one or more sets of data records are generated in at least one table in the one or more tables of the database, each set of data records having two or more column values in two or more columns that correspond to the two or more categorical values of the two or more categorical columns. As discussed earlier, the two or more categorical values correspond to the at least location of missing data corresponding to the selected indicator.

Figure 34:
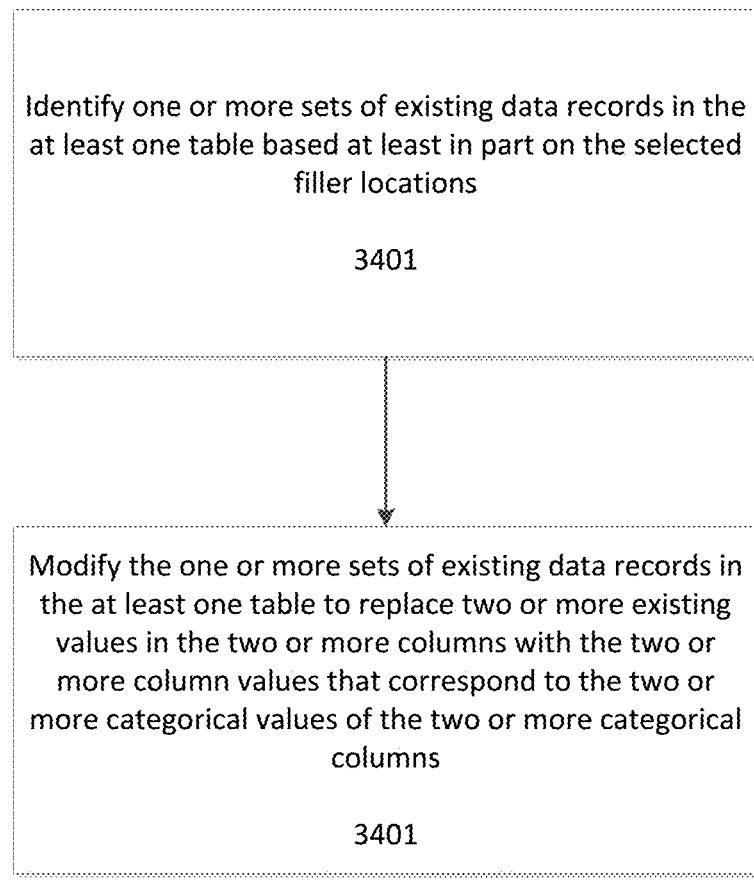
FIG. 34 illustrates a flowchart for generating the one or more sets of data records when a fill process is used to generate the sets of data records from other selected locations that have sufficient or excess data according to an exemplary embodiment.

FIG. 34 illustrates a flowchart for generating the one or more sets of data records when a fill process is used to generate the sets of data records from other selected locations that have sufficient or excess data. At step 3401 one or more sets of existing data records in at least one table are identified based at least in part on selected filler locations (such as the cells having excess data, although other cells with missing data can also be selected as filler locations). At step 3402 the one or more sets of existing data records in the at least one table are modified to replace two or more existing values in two or more columns with two or more column values that correspond to the two or more categorical values of the two or more categorical columns of the selected location of missing data.

Figure 35:
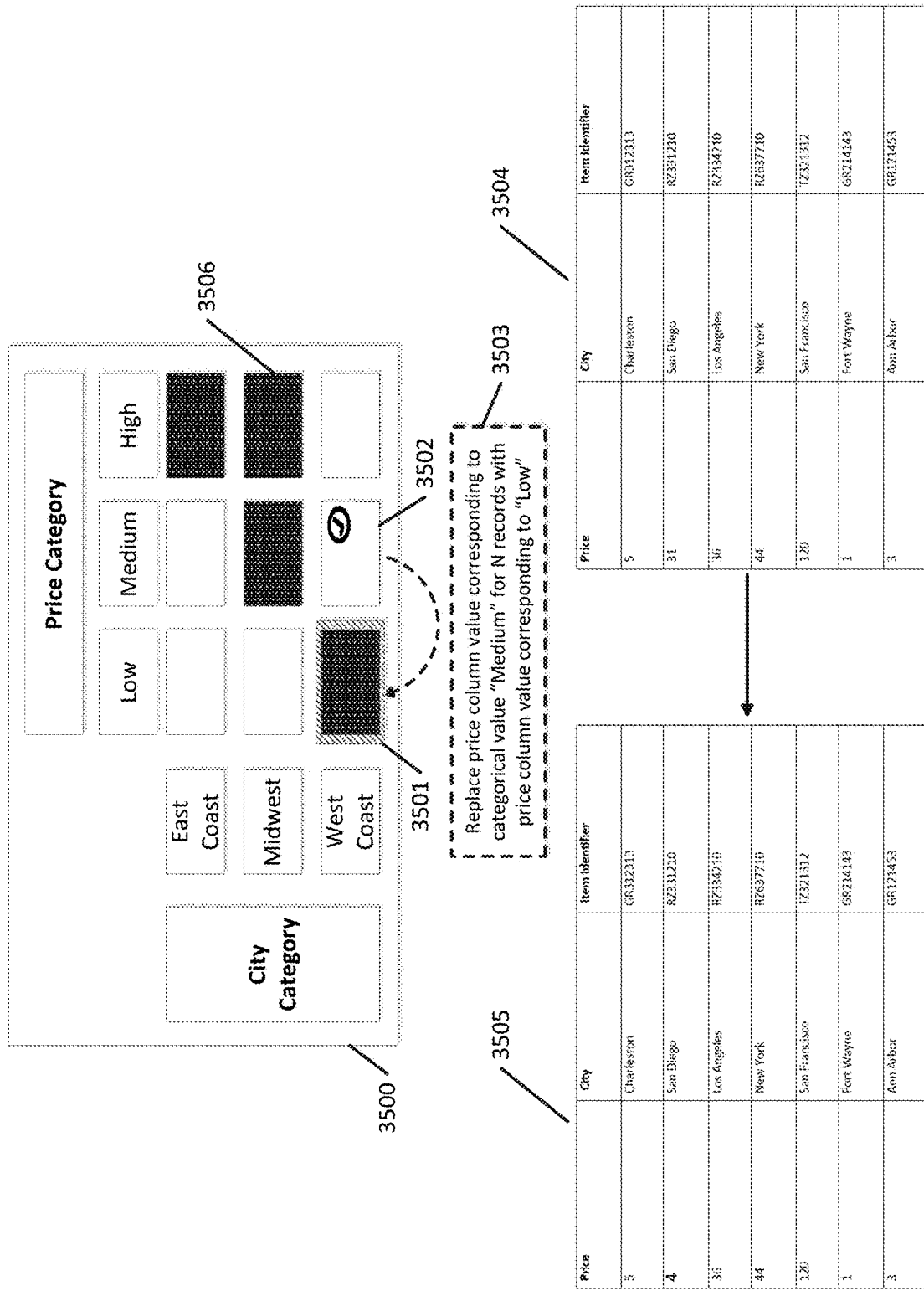
FIG. 35 illustrates an example of missing data generation when using filler locations according to an exemplary embodiment.

FIG. 35 illustrates an example of missing data generation when using filler locations. Interface 3500 illustrates a grid in which locations of missing data are shown as black boxes and locations of sufficient or excess data are shown as white boxes. The user has selected cell 3501 as a location of missing data that they would like to fill with data from another location. In this case, the user has selected cell 3502 as the filler location. Box 3503 illustrates the process that occurs during data generation. As shown in box 3503, when the data generation occurs, a price column value corresponding to categorical value "Medium" in the categorical column "Price Category" (corresponding to the filler location) for N records is replaced with a price column value corresponding to categorical value "Low" in the categorical column "Price Category" (corresponding to the missing data location). In this case, both the filler location and the missing data location have a city category value of "West Coast" so the city column value does not need to be replaced within the records. However, if the user had selected a different filler location, such as cell 3506, then a city column value corresponding to categorical value "Midwest" would be replaced with a city column value corresponding to categorical value "West Coast." The replacement value for the column values being replaced can be generated randomly within the appropriate range of values, set of values, or single corresponding to the category, as described with respect to FIG. 37 below.

The number of records, N, that have the corresponding categorical values replaced can be set by a user or determined automatically. For example, the user can indicate that they want 100 records used to fill in the missing data, or the system can calculate the number of records that would be required for the missing data cell to have a sufficient number of data records.

Underlying data table 3504 illustrates the data set prior to the missing data generation process and underlying data table 3505 illustrates the data set after the missing data generation process. As shown in these tables, the second record has been modified to replace the price column value of "31" (corresponding to category "Medium") with the price column value of "4" (corresponding to category "Low"). The second record is the record that corresponds to the filler location, in this case, Price Category=Medium & City Category=West Coast. Any other column values other than those corresponding to the two categorical values for the missing data location, such as "Item Identifier" are not modified.

Of course, this example is provided for illustration only, and the missing data generation process using filler locations can be performed in a variety of ways on a variety of underlying data tables. For example, if the two categorical values corresponded to categories in two different tables, then records in both tables can be updated accordingly.

In addition to using filler locations to generate missing data at a missing data location, users can also generate new data records to fill gaps in data (rather than using existing records in other locations). An example of a user selecting this option is shown in FIG. 32.

Figure 36:
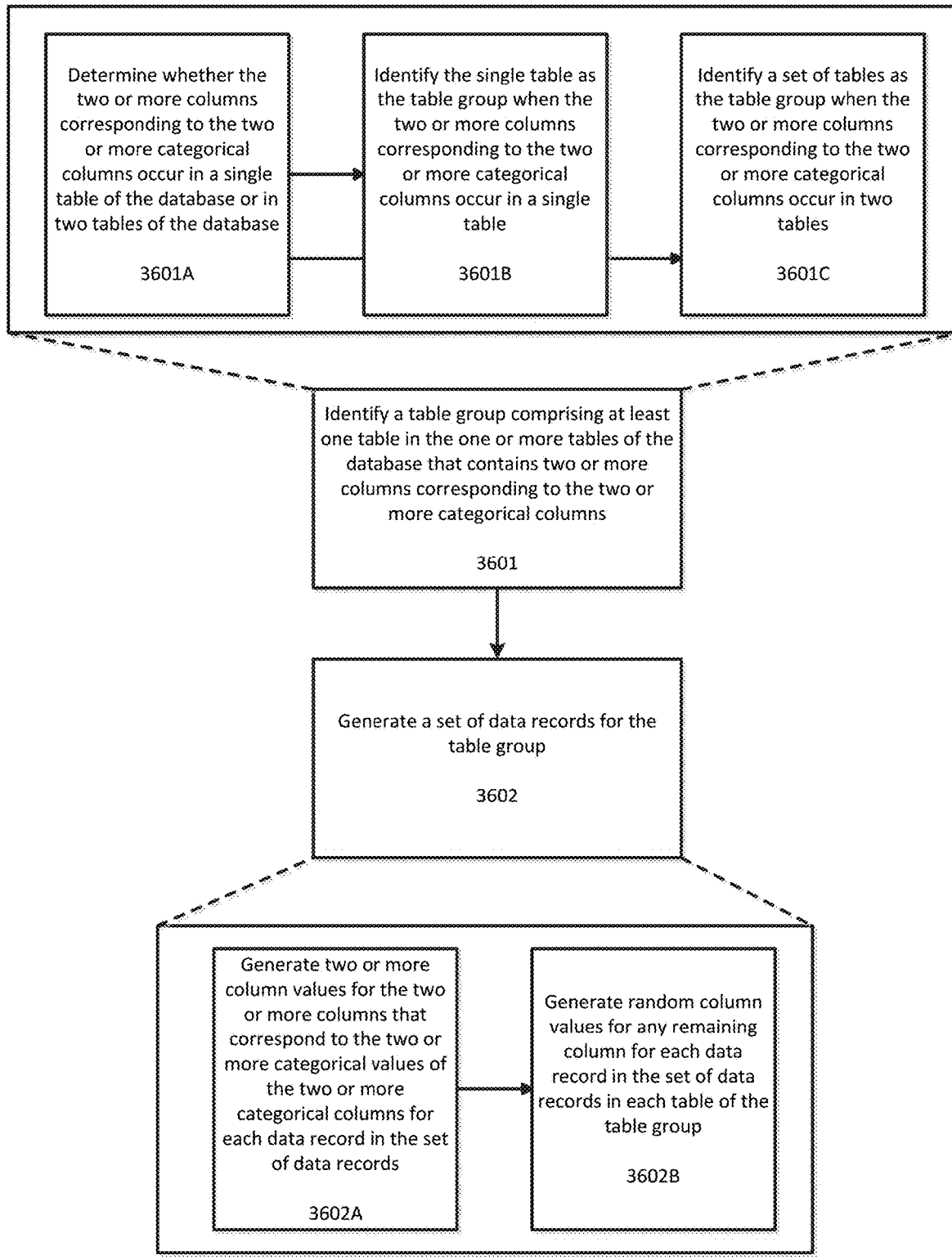
FIG. 36 illustrates a flowchart for generating the one or more sets of data records when creating new data records according to an exemplary embodiment.

FIG. 36 illustrates a flowchart for generating the one or more sets of data records when creating new data records. At step 3601 a table group comprising at least one table in the one or more tables of the database that contains two or more columns corresponding to the two or more categorical columns is identified. The table group is the list of one or more tables for which new data records are required to be created. This step can include one or more of steps 3601A-3601C, discussed below.

At step 3601 a determination is made regarding whether the two or more columns corresponding to the two or more categorical columns occur in a single table of the database or in two tables of the database. This step can include querying the database or metadata associated with the database, such as the schema. This step can also include checking column names of one or more tables in the database against the two or more columns to determine whether the two or more columns occur in a single table. As discussed earlier, the co-occurrence of column values for two columns in different tables can used to identify locations of missing data. In this case, the two columns would be determined as being in two different tables.

If the two or more columns corresponding to the two or more categorical columns occur in a single table of the database, then the single table is identified as the table group in step 3601B. Otherwise, if the two or more columns corresponding to the two or more categorical columns occur in two or more tables, then a set of tables is identified as the table group in step 3601C.

Step 3601C can include identifying one or more intermediary tables in the database from which the two or more tables are reachable by traversing one or more foreign key references and then identifying the two or more tables and the one or more intermediary tables as the table group. If two tables are linked (such as by foreign key), but not by any additional intermediate tables, then the two tables are identified as the table group.

At step 3602 a set of data records is generated for the table group. The quantity of data records in the set of data records that is generated can be determined automatically or indicated by a user. For example, the user can specify how many data records to create or the system can compute the quantity of data records required for a particular location to meet a certain expected co-occurrence and therefore no longer be designated as missing data. Step 3602 includes sub-steps 3602A and 3602B.

At step 3602A two or more column values are generated for the two or more columns that correspond to the two or more categorical values of the two or more categorical columns for each data record in the set of data records. The step of generating two or more column values for the two or more columns that correspond to the two or more categorical values of the two or more categorical columns for each data record can include, for each column value corresponding to a categorical value of a categorical column, classifying the categorical value as corresponding to a range of numerical values, a plurality of possible values, or a single value, and generating the column value based at least in part on the classification of the categorical value.

An example of this process is explained with reference to the tables shown in FIG. 14. If the missing data location corresponded to categorical value "Low" in the "Price Category" categorical column and categorical value "East Coast" in the "City Category" categorical column as shown in table 1402 of FIG. 14, then two or more column values would be generated for each added data record in columns "Price" and "City" in table 1401 of FIG. 14. Since the categorical value "Low" in table 1402 corresponds to a range of prices in the "Price" column in table 1401, then the generated column value in the "Price" column would be some value that falls within the "Low" category (such as, in this example, "4"). Similarly, since the categorical value "East Coast" corresponds to a set of cities in the "City" column, then the generated column value in the "City" column would be a city that falls in the "East Coast" category (such as "New York").

Figure 37:
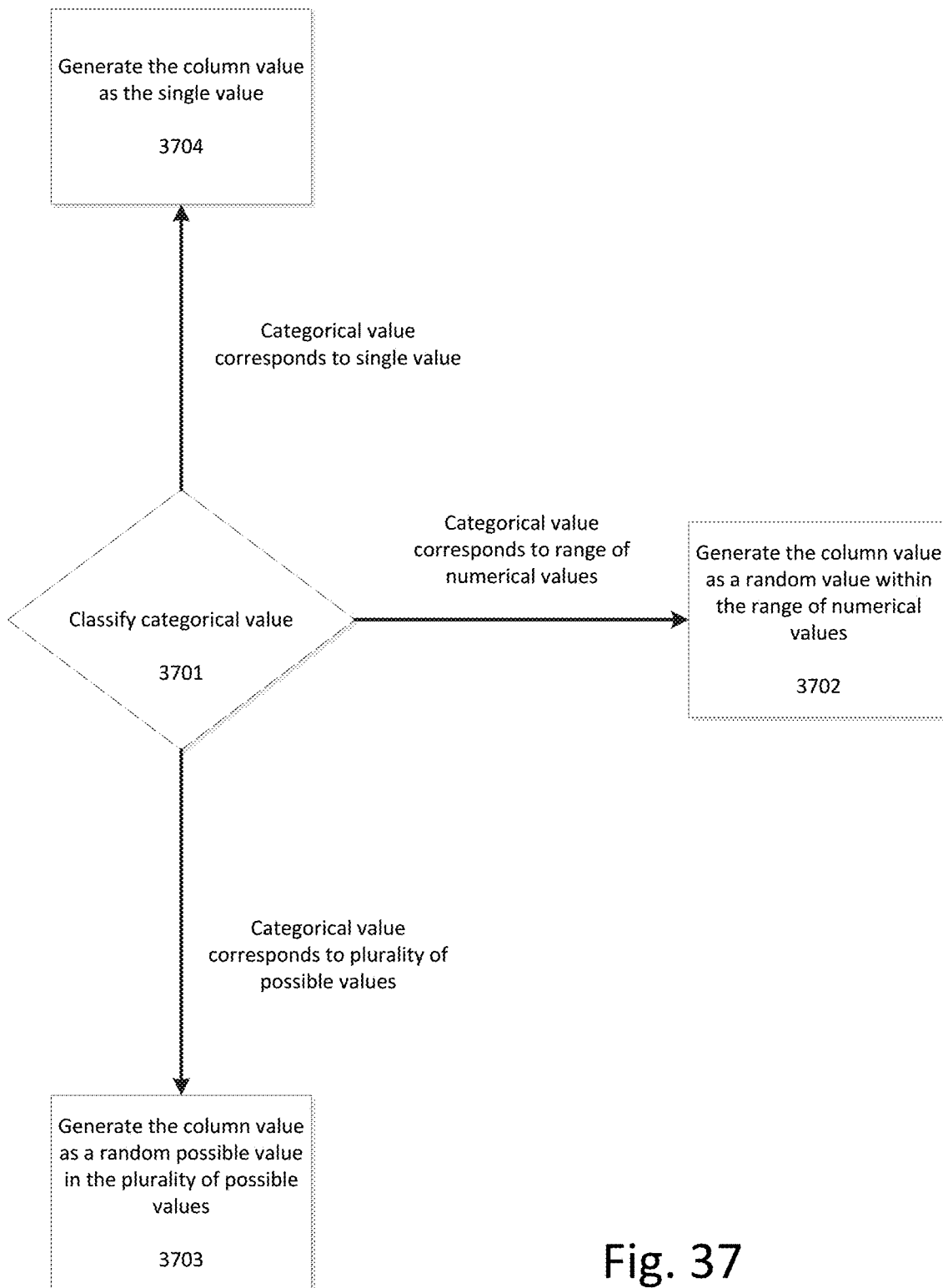
FIG. 37 illustrates a flowchart for generating the column value based at least in part on the classification of the categorical value according to an exemplary embodiment.

FIG. 37 illustrates a flowchart for generating the column value based at least in part on the classification of the categorical value according to an exemplary embodiment.

At step 3701 the categorical value is classified as corresponding to a range of numerical values, a plurality of possible values, or a single value. For example, a categorical value of "Low" in a price category could correspond to a range of numerical values such as $1-$10 in an underlying price column. Additionally, a categorical value of "West Coast" in a city category could correspond to a plurality of possible values {Oakland, San Diego, Los Angeles, San Francisco, Seattle, Portland, Santa Barbara} in an underlying city column. Furthermore, when the underlying column is itself a category, then a particular categorical value can correspond to a single value of that category. For example, a categorical value of "Married" in a marital status category can correspond to the single value "Married" in a marital status column.

When the categorical value corresponds to a range of numerical values, then at step 3702 a column value can be generated as a random or pseudorandom value within the range of numerical values. Using the above example, if the categorical value of "Low" corresponds to the range of numerical values between $1-$10, a random value in that range can be generated as the column value.

When the categorical value corresponds to a plurality of possible values, then at step 3703 a column value can be generated as a random or pseudorandom possible value selected from the plurality of possible values. Using the above example, if a categorical value of "West Coast" corresponds to a plurality of possible cities {Oakland, San Diego, Los Angeles, San Francisco, Seattle, Portland, Santa Barbara}, then a city can be selected at random from the possible cities and generated as the column value.

When the categorical value corresponds to a single value, then at step 3704 the column value can be generated as the single value. Using the above example, if a categorical value of "Married" corresponds to the single value "Married," then column value would be generated as "Married."

Returning to FIG. 36, at step 3602B random column values are generated for any remaining column for each data record in the set of data records in each table of the table group. For example, if new data records were added to table 1401 in FIG. 14 and the only pertinent column values for generation of missing data were "Price" and "City," then each generated data record would have a random value created for each column value in the column "Item Identifier." Note that this step is distinct from the process described in FIG. 37, as the random values generated for columns that are not part of the missing data analysis are not required to fall within any range or be selected from a specific subset of values corresponding to some categorical value.

As will be understood from the above description, the data generation process can include generation of one or more data records in multiple tables of a database. For example, if a location of missing data corresponds to two categorical values in two categorical columns that themselves correspond to two columns in two different tables linked by three intermediate tables, then data records would be generated for the two tables as well as the intermediate tables. If an intermediate table did not include any columns corresponding to the two categorical columns, then random values would be generated for each of the column values in the data records of that table.

Figure 38:
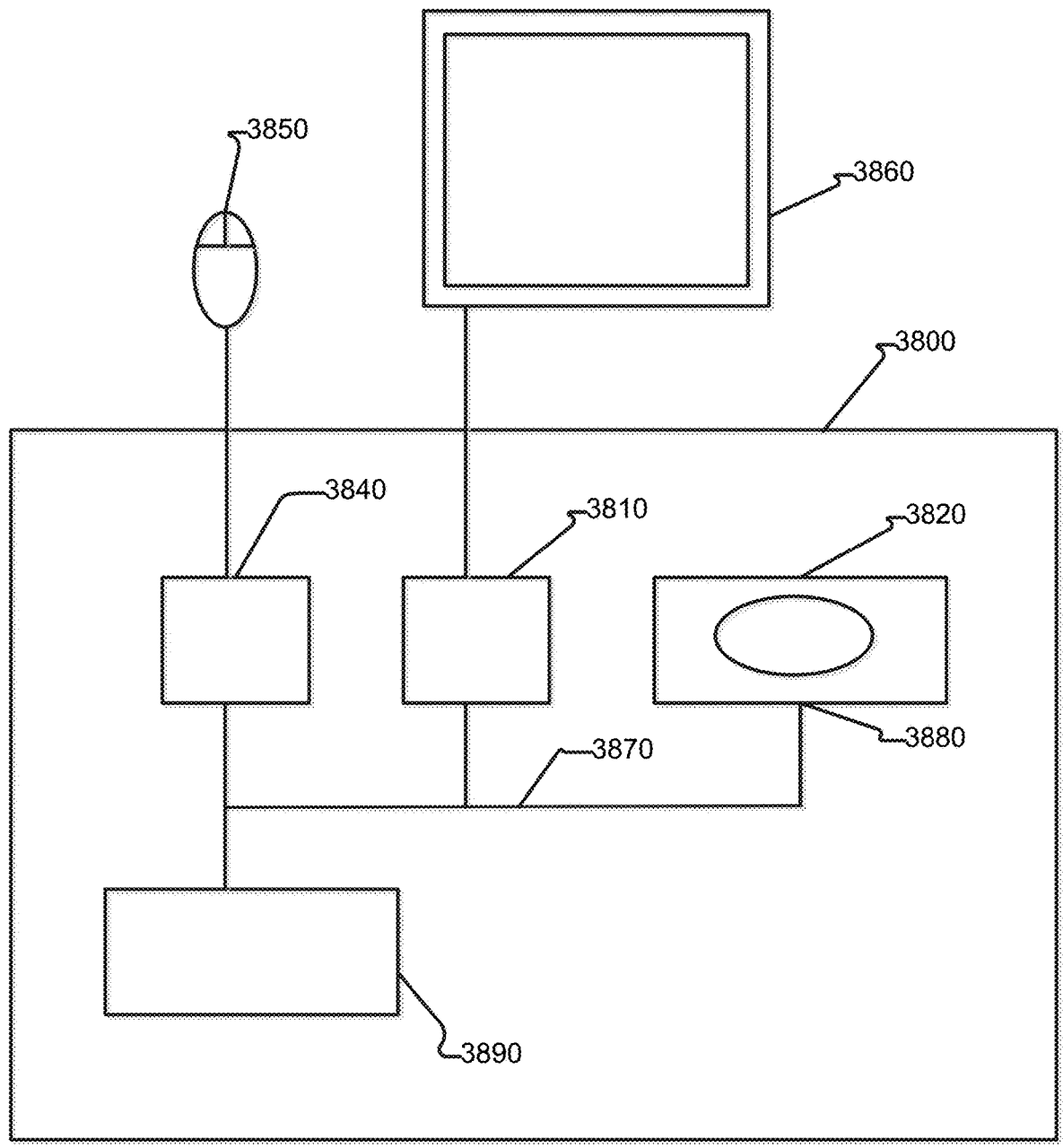
FIG. 38 illustrates an exemplary computing environment that can be used to carry out the methods for missing data identification and missing data generation.

One or more of the above-described techniques can be implemented in or involve one or more special-purpose computer systems having computer-readable instructions loaded thereon that enable the computer system to implement the above-described techniques. FIG. 38 illustrates an example of a computing environment 3800. The computing environment 3800 is not intended to suggest any limitation as to scope of use or functionality of a described embodiment(s).

With reference to FIG. 38, the computing environment 3800 includes at least one processing unit 3810 and memory 3820. The processing unit 3810 executes computer-executable instructions and can be a real or a virtual processor. In a multi-processing system, multiple processing units execute computer-executable instructions to increase processing power. The memory 3820 can be volatile memory (e.g., registers, cache, RAM), non-volatile memory (e.g., ROM, EEPROM, flash memory, etc.), or some combination of the two. The memory 3820 can store software 3880 implementing described techniques.

A computing environment can have additional features. For example, the computing environment 3800 includes storage 3840, one or more input devices 3850, one or more output devices 3860, and one or more communication connections 3890. An interconnection mechanism 3870, such as a bus, controller, or network interconnects the components of the computing environment 3800. Typically, operating system software or firmware (not shown) provides an operating environment for other software executing in the computing environment 3800, and coordinates activities of the components of the computing environment 3800.

The storage 3840 can be removable or non-removable, and includes magnetic disks, magnetic tapes or cassettes, CD-ROMs, CD-RWs, DVDs, or any other medium which can be used to store information and which can be accessed within the computing environment 3800. The storage 3840 can store instructions for the software 3880.

The input device(s) 3850 can be a touch input device such as a keyboard, mouse, pen, trackball, touch screen, or game controller, a voice input device, a scanning device, a digital camera, remote control, or another device that provides input to the computing environment 3800. The output device(s) 3860 can be a display, television, monitor, printer, speaker, or another device that provides output from the computing environment 3800.

The communication connection(s) 3890 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 3800, computer-readable media include memory 3820, storage 3840, communication media, and combinations of any of the above.

Of course, FIG. 38 illustrates computing environment 3800, display device 3860, and input device 3850 as separate devices for ease of identification only. Computing environment 3800, display device 3860, and input device 3850 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 3800 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices for identification of missing data within a relational database, the method comprising:
   connecting, by at least one of the one or more computing devices, to one or more data stores hosting the relational database;
   identifying, by at least one of the one or more computing devices, a plurality of columns in a plurality of tables of the relational database for missing data assessment based at least in part on a determination of related tables in the database and identification of a traversal path through the related tables;
   generating, by at least one of the one or more computing devices, a plurality of categorical columns of categorical data by transforming a subset of data values extracted from the plurality of columns on the one or more data stores into categorical data values, the subset of data values being extracted based at least in part on the traversal path through the related tables;
   generating, by at least one of the one or more computing devices, at least one co-occurrence matrix corresponding to at least one pair of categorical columns in the plurality of categorical columns, wherein the at least one co-occurrence matrix comprises a count of co-occurrence of each unique pair of categorical data values in the at least one pair of categorical columns;
   determining, by at least one of the one or more computing devices, an expected frequency of co-occurrence corresponding to each unique pair of categorical data values in the at least one pair of categorical columns based at least in part on a plurality of marginal totals corresponding to a plurality of categorical data values in the at least one co-occurrence matrix; and
   identifying, by at least one of the one or more computing devices, one or more locations of missing data within the plurality of columns based at least in part on the count of co-occurrence of each unique pair of categorical data values in the at least one pair of categorical columns and the expected frequency of co-occurrence corresponding to each unique pair of categorical data values in the at least one pair of categorical columns.

2. The method of claim 1, wherein identifying a plurality of columns in a plurality of tables of the relational database based at least in part on a determination of related tables in the database and identification of at least one traversal path through the related tables comprises:
   receiving a selection of a start table and an end table; and identifying a traversal path in the database from the start table to the end table, the traversal path comprising a plurality of tables and a plurality of columns connecting the plurality of tables in the traversal path.

3. The method of claim 1, further comprising:
storing, by at least one of the one or more computing devices, a tree corresponding to one or more traversal paths through the plurality of tables, wherein the tree comprises a root node corresponding to a first table in the plurality of tables, one or more child nodes corresponding to one or more child tables in the plurality of tables, and one or more edges corresponding to one or more relationships between the plurality of tables.

4. The method of claim 3, wherein generating a plurality of categorical columns of categorical data by transforming a subset of data values extracted from the plurality of columns on the one or more data stores into categorical data values comprises:
extracting one or more subsets of data values from the plurality of columns, each subset of data values being extracted based at least in part on a traversal path in the one or more traversal paths; and
transforming the one or more subsets of data values into categorical data values to generate the plurality of categorical columns of categorical data.

5. The method of claim 4, wherein extracting one or more subsets of data values from the plurality of columns corresponding to the one or more traversal paths comprises, for each subset of data values:
performing one or more join operations between the plurality of tables based at least in part on a corresponding traversal path in the one or more traversal paths to generate one or more joined tables; and
extracting the subset of data values from the one or more joined tables based at least in part on a range of values for at least one column in the plurality of columns.

6. The method of claim 4, wherein transforming the one or more subsets of data values into categorical data values to generate the plurality of categorical columns of categorical data comprises one or more of:
converting one or more numerical data values in the one or more subsets of data values into one or more first categorical data values by assigning each numerical value to a first categorical data value corresponding to a numerical range that includes that numerical data value;
converting one or more string data values in the one or more subsets of data values into one or more second categorical data values by processing each of the string data values using one or more transformation rules; or
converting one or more categorical data values in the one or more subsets of data values into one or more third categorical data values by mapping each categorical data value to a third categorical data value.

7. The method of claim 1, wherein generating at least one co-occurrence matrix corresponding to at least one pair of categorical columns in the plurality of categorical columns comprises, for each pair of categorical columns in the least one pair of categorical columns:
identifying a pair of columns in the plurality of columns corresponding to that pair of categorical columns; and
determining whether the pair of columns correspond to a single table in the one or more tables or whether the pair of columns correspond to more than one table; and either:
generating a co-occurrence matrix corresponding to that pair of categorical columns based on a single categorical table corresponding to the single table when the pair of columns corresponds to a single table in the one or more tables; or
generating a co-occurrence matrix corresponding to that pair of categorical columns based on a joined categorical table corresponding to a table generated by joining multiple tables in the one or more tables when the pair of columns correspond to more than one table.

8. The method of claim 1, wherein determining an expected frequency of co-occurrence corresponding to each unique pair of categorical data values in the at least one pair of categorical columns based at least in part on a plurality of marginal totals corresponding to a plurality of categorical data values in the at least one co-occurrence matrix comprises, for each pair of categorical columns in the at least one pair of categorical columns:
determining a first set of marginal totals corresponding to a first set of categorical data values in a first categorical column of the pair of categorical columns;
determining a second set of marginal totals corresponding to a second set of categorical data values in a second categorical column of the pair of categorical columns;
determining a marginal product corresponding to each unique pair of categorical data values in the pair of categorical columns by multiplying a first marginal total in the first set of marginal totals with a second marginal total in the second set of marginal totals; and
determining an expected frequency of co-occurrence corresponding to each unique pair of categorical data values in the pair of categorical columns based at least in part on the marginal product corresponding to that unique pair of categorical data values and a marginal total sum, wherein the marginal total sum comprises a sum of either the first set of marginal totals or the second set of marginal totals.

9. The method of claim 8, wherein determining an expected frequency of co-occurrence corresponding to each unique pair of categorical data values in the pair of categorical columns based at least in part on the marginal product corresponding to that unique pair of categorical data values and a marginal total sum comprises:
determining an expected frequency of co-occurrence corresponding to each unique pair of categorical data values by dividing the marginal product corresponding to that unique pair of categorical data values by the marginal total sum.

10. The method of claim 1, wherein identifying one or more locations of missing data within the plurality of columns based at least in part on the count of co-occurrence of each unique pair of categorical data values in the at least one pair of categorical columns and the expected frequency of co-occurrence corresponding to each unique pair of categorical data values in the at least one pair of categorical columns comprises, for each unique pair of categorical data values in the at least one pair of categorical columns:
determining a difference between the count of co-occurrence of that unique pair of categorical data values and the expected frequency of co-occurrence corresponding to that unique pair of categorical data values;
determining a ratio of the difference to the expected frequency of co-occurrence corresponding to that unique pair of categorical data values; and
designating a location corresponding to that unique pair of categorical data values as missing data based at least in part on a determination that the ratio exceeds a predetermined threshold.

11. The method of claim 1, further comprising:
generating, by at least one of the one or more computing devices, a visualization of missing data within a user interface, the visualization comprising one or more regions corresponding to the one or more locations of missing data.

12. The method of claim 11, wherein generating a visualization of missing data within a user interface comprises one of:
generating a grid comprising a plurality of regions, each region in the plurality of regions corresponding to a unique group of categorical data values in two or more categorical columns, and modifying a visual attribute of the one or more regions that correspond to the one or more locations of missing data to be distinct from other regions in the plurality of regions;
generating two or more parallel axes corresponding to two or more categorical columns, each parallel axis being divided into a plurality of lines corresponding to a plurality of categorical data values in a corresponding categorical column and a length of each line corresponding to a quantity associated with each categorical data value, and generating the one or more regions corresponding to the one or more locations of missing data as one or more parallelograms linking the two or more parallel axes, each region linking a first line in a first parallel axis with a second line in a second parallel axis and an area of each region corresponding to a quantity of missing data associated with a unique group of categorical data values corresponding to that region; or
generating a radar chart comprising a plurality of spokes, each spoke in the plurality of spokes corresponding to a categorical column in the plurality of categorical columns, each spoke being divided into a plurality of segments corresponding to a plurality of categorical data values in that categorical column, and a size of each segment corresponding to a quantity associated with each categorical data value and generating the one or more regions corresponding to the one or more locations of missing data as one or more areas linking two or more spokes, each region linking a first segment in a first spoke with a second segment in a second spoke and an area of each region corresponding to a quantity of missing data associated with a unique group of categorical data values corresponding to that region.

13. A system for identification of missing data within a relational database, the system comprising:
one or more processors; and
one or more memories operatively coupled to at least one of the one or more processors and having instructions stored thereon that, when executed by at least one of the one or more processors, cause at least one of the one or more processors to:
connect to one or more data stores hosting the relational database;
identify a plurality of columns in a plurality of tables of the relational database based at least in part on a determination of related tables in the database and identification of at least one traversal path through the related tables;
generate a plurality of categorical columns of categorical data by transforming a subset of data values extracted from the plurality of columns on the one or more data stores into categorical data values, the subset of data values being extracted based at least in part on the at least one traversal path through the related tables;
generate at least one co-occurrence matrix corresponding to at least one pair of categorical columns in the plurality of categorical columns, wherein the at least one co-occurrence matrix comprises a count of co-occurrence of each unique pair of categorical data values in the at least one pair of categorical columns;
determine an expected frequency of co-occurrence corresponding to each unique pair of categorical data values in the at least one pair of categorical columns based at least in part on a plurality of marginal totals corresponding to a plurality of categorical data values in the at least one co-occurrence matrix; and
identify one or more locations of missing data within the plurality of columns based at least in part on the count of co-occurrence of each unique pair of categorical data values in the at least one pair of categorical columns and the expected frequency of co-occurrence corresponding to each unique pair of categorical data values in the at least one pair of categorical columns.

14. The system of claim 13, wherein the instructions that, when executed by at least one of the one or more processors, cause at least one of the one or more processors to generate a plurality of categorical columns of categorical data by transforming a subset of data values extracted from the plurality of columns on the one or more data stores into categorical data values further cause at least one of the one or more processors to:
store a tree corresponding to one or more traversal paths through the plurality of tables, wherein the tree comprises a root node corresponding to a first table in the plurality of tables, one or more child nodes corresponding to one or more child tables in the plurality of tables, and one or more edges corresponding to one or more relationships between the plurality of tables;
extract one or more subsets of data values from the plurality of columns, each subset of data values being extracted based at least in part on a traversal path in the one or more traversal paths; and
transform the one or more subsets of data values into categorical data values to generate the plurality of categorical columns of categorical data.

15. The system of claim 13, wherein the instructions that, when executed by at least one of the one or more processors, cause at least one of the one or more processors to determine an expected frequency of co-occurrence corresponding to each unique pair of categorical data values in the at least one pair of categorical columns based at least in part on a plurality of marginal totals corresponding to a plurality of categorical data values in the at least one co-occurrence matrix further cause at least one of the one or more processors to, for each pair of categorical columns in the at least one pair of categorical columns:
determine a first set of marginal totals corresponding to a first set of categorical data values in a first categorical column of the pair of categorical columns;
determine a second set of marginal totals corresponding to a second set of categorical data values in a second categorical column of the pair of categorical columns;
determine a marginal product corresponding to each unique pair of categorical data values in the pair of categorical columns by multiplying a first marginal total in the first set of marginal totals with a second marginal total in the second set of marginal totals; and determine an expected frequency of co-occurrence corresponding to each unique pair of categorical data values in the pair of categorical columns based at least in part on the marginal product corresponding to that unique pair of categorical data values and a marginal total sum, wherein the marginal total sum comprises a sum of either the first set of marginal totals or the second set of marginal totals.

16. The system of claim 13, wherein the instructions that, when executed by at least one of the one or more processors, cause at least one of the one or more processors to identify one or more locations of missing data within the plurality of columns based at least in part on the count of co-occurrence of each unique pair of categorical data values in the at least one pair of categorical columns and the expected frequency of co-occurrence corresponding to each unique pair of categorical data values in the at least one pair of categorical columns further cause at least one of the one or more processors to, for each unique pair of categorical data values in the at least one pair of categorical columns:
  determine a difference between the count of co-occurrence of that unique pair of categorical data values and the expected frequency of co-occurrence corresponding to that unique pair of categorical data values;
  determine a ratio of the difference to the expected frequency of co-occurrence corresponding to that unique pair of categorical data values; and
  designate a location corresponding to that unique pair of categorical data values as missing data based at least in part on a determination that the ratio exceeds a predetermined threshold.

17. At least one non-transitory computer-readable medium storing computer-readable instructions that, when executed by one or more computing devices, cause at least one of the one or more computing devices to:
  connect to one or more data stores hosting the relational database;
  identify a plurality of columns in a plurality of tables of the relational database based at least in part on a determination of related tables in the database and identification of at least one traversal path through the related tables;
  generate a plurality of categorical columns of categorical data by transforming a subset of data values extracted from the plurality of columns on the one or more data stores into categorical data values, the subset of data values being extracted based at least in part on the at least one traversal path through the related tables;
  generate at least one co-occurrence matrix corresponding to at least one pair of categorical columns in the plurality of categorical columns, wherein the at least one co-occurrence matrix comprises a count of co-occurrence of each unique pair of categorical data values in the at least one pair of categorical columns;
  determine an expected frequency of co-occurrence corresponding to each unique pair of categorical data values in the at least one pair of categorical columns based at least in part on a plurality of marginal totals corresponding to a plurality of categorical data values in the at least one co-occurrence matrix; and
  identify one or more locations of missing data within the plurality of columns based at least in part on the count of co-occurrence of each unique pair of categorical data values in the at least one pair of categorical columns and the expected frequency of co-occurrence corresponding to each unique pair of categorical data values in the at least one pair of categorical columns.

18. The at least one non-transitory computer-readable medium of claim 17, wherein the instructions that, when executed by at least one of the one or more computing devices, cause at least one of the one or more computing devices to generate a plurality of categorical columns of categorical data by transforming a subset of data values extracted from the plurality of columns on the one or more data stores into categorical data values further cause at least one of the one or more computing devices to:
  store a tree corresponding to one or more traversal paths through the plurality of tables, wherein the tree comprises a root node corresponding to a first table in the plurality of tables, one or more child nodes corresponding to one or more child tables in the plurality of tables, and one or more edges corresponding to one or more relationships between the plurality of tables;
  extract one or more subsets of data values from the plurality of columns, each subset of data values being extracted based at least in part on a traversal path in the one or more traversal paths; and
  transform the one or more subsets of data values into categorical data values to generate the plurality of categorical columns of categorical data.

19. The at least one non-transitory computer-readable medium of claim 17, wherein the instructions that, when executed by at least one of the one or more computing devices, cause at least one of the one or more computing devices to determine an expected frequency of co-occurrence corresponding to each unique pair of categorical data values in the at least one pair of categorical columns based at least in part on a plurality of marginal totals corresponding to a plurality of categorical data values in the at least one co-occurrence matrix further cause at least one of the one or more computing devices to, for each pair of categorical columns in the at least one pair of categorical columns:
  determine a first set of marginal totals corresponding to a first set of categorical data values in a first categorical column of the pair of categorical columns;
  determine a second set of marginal totals corresponding to a second set of categorical data values in a second categorical column of the pair of categorical columns;
  determine a marginal product corresponding to each unique pair of categorical data values in the pair of categorical columns by multiplying a first marginal total in the first set of marginal totals with a second marginal total in the second set of marginal totals; and
  determine an expected frequency of co-occurrence corresponding to each unique pair of categorical data values in the pair of categorical columns based at least in part on the marginal product corresponding to that unique pair of categorical data values and a marginal total sum, wherein the marginal total sum comprises a sum of either the first set of marginal totals or the second set of marginal totals.

20. The at least one non-transitory computer-readable medium of claim 17, wherein the instructions that, when executed by at least one of the one or more computing devices, cause at least one of the one or more computing devices to identify one or more locations of missing data within the plurality of columns based at least in part on the count of co-occurrence of each unique pair of categorical data values in the at least one pair of categorical columns and the expected frequency of co-occurrence corresponding to each unique pair of categorical data values in the at least one pair of categorical columns further cause at least one of the one or more computing devices to, for each unique pair of categorical data values in the at least one pair of categorical columns:
   determine a difference between the count of co-occurrence of that unique pair of categorical data values and the expected frequency of co-occurrence corresponding to that unique pair of categorical data values;
   determine a ratio of the difference to the expected frequency of co-occurrence corresponding to that unique pair of categorical data values; and
   designate a location corresponding to that unique pair of categorical data values as missing data based at least in part on a determination that the ratio exceeds a predetermined threshold.

* * * * *